(12) United States Patent
Naiha et al.

(10) Patent No.: US 11,843,126 B2
(45) Date of Patent: Dec. 12, 2023

(54) SEPARATORS FOR ENHANCED FLOODED BATTERIES, BATTERIES, AND RELATED METHODS

(71) Applicant: DARAMIC, LLC, Charlotte, NC (US)

(72) Inventors: Mohammed Naiha, Chatenois (FR); Jörg Deiters, Ettenheim (DE); Ahila Krishnamoorthy, Bangalore (IN); Eric H. Miller, Philpot, KY (US); J. Kevin Whear, Utica, KY (US); Robert W. Saffel, Rockport, IN (US); Naoto Miyake, Newburgh, IN (US); Kanak Kuwelkar, Owensboro, KY (US)

(73) Assignee: Daramic, LLC, Charlotte, NC (US)

(\*) Notice: Subject to any disclaimer, the term of this patent is extended or adjusted under 35 U.S.C. 154(b) by 0 days.

(21) Appl. No.: 17/063,733

(22) Filed: Oct. 6, 2020

(65) Prior Publication Data

US 2021/0020886 A1 Jan. 21, 2021

Related U.S. Application Data

(62) Division of application No. 15/482,293, filed on Apr. 7, 2017, now Pat. No. 10,811,655.

(Continued)

(51) Int. Cl.
*H01M 50/446* (2021.01)
*H01M 10/06* (2006.01)
(Continued)

(52) U.S. Cl.
CPC ......... *H01M 50/446* (2021.01); *H01M 10/06* (2013.01); *H01M 4/68* (2013.01);
(Continued)

(58) Field of Classification Search
CPC .... H01M 50/446; H01M 10/06; H01M 10/08; H01M 10/10; H01M 10/14; H01M 4/68;
(Continued)

(56) References Cited

U.S. PATENT DOCUMENTS 3,967,978 A 7/1976 Honda et al.
4,237,083 A \* 12/1980 Young .................. B01D 39/083
264/41

(Continued)

OTHER PUBLICATIONS

Zhang et al., "Isotactic polypropylene reinforced atactic polyprolylene formation of shish-kebab superstructure," Sep. 30, 2015, Polymer, 78, 120-133. (Year: 2015).\*

(Continued)

*Primary Examiner* — Matthew W Van Oudenaren
(74) *Attorney, Agent, or Firm* — Hammer & Associates, P.C.

(57) ABSTRACT

A battery separator has performance enhancing additives or coatings, fillers with increased friability, increased ionic diffusion, decreased tortuosity, increased wettability, reduced oil content, reduced thickness, decreased electrical resistance, and/or increased porosity. The separator in a battery reduces the water loss, lowers acid stratification, lowers the voltage drop, and/or increases the CCA. The separators include or exhibit performance enhancing additives or coatings, increased porosity, increased void volume, amorphous silica, higher oil absorption silica, higher silanol group silica, reduced electrical resistance, a shish-kebab structure or morphology, a polyolefin microporous membrane containing particle-like filler in an amount of 40% or more by weight of the membrane and ultrahigh molecular weight polyethylene having shish-kebab formations and the average repetition periodicity of the kebab formation from 1 nm to 150 nm, decreased sheet thickness, decreased tortu- (Continued)

osity, separators especially well-suited for enhanced flooded batteries.

8 Claims, 38 Drawing Sheets

Related U.S. Application Data

(60) Provisional application No. 62/319,959, filed on Apr. 8, 2016.

(51) Int. Cl.

| | | |
|---|---|---|
| *H01M 4/68* | (2006.01) | |
| *H01M 10/08* | (2006.01) | |
| *H01M 10/10* | (2006.01) | |
| *H01M 10/12* | (2006.01) | |
| *H01M 50/417* | (2021.01) | |
| *H01M 50/497* | (2021.01) | |
| *H01M 50/409* | (2021.01) | |
| *H01M 50/489* | (2021.01) | |
| *H01M 50/491* | (2021.01) | |
| *H01M 50/406* | (2021.01) | |
| *H01M 50/403* | (2021.01) | |

(52) U.S. Cl.
CPC ............ *H01M 10/08* (2013.01); *H01M 10/10* (2013.01); *H01M 10/12* (2013.01); *H01M 50/403* (2021.01); *H01M 50/406* (2021.01); *H01M 50/409* (2021.01); *H01M 50/417* (2021.01); *H01M 50/489* (2021.01); *H01M 50/491* (2021.01); *H01M 50/497* (2021.01); *H01M 2220/20* (2013.01); *Y02E 60/10* (2013.01); *Y02T 10/70* (2013.01)

(58) Field of Classification Search
CPC ........... H01M 10/0585; H01M 10/121; H01M 10/342; H01M 2220/20; H01M 50/403; H01M 50/406; H01M 50/409; H01M 50/417; H01M 50/489; H01M 50/491; H01M 50/497; H01M 10/12
See application file for complete search history.

(56) References Cited

U.S. PATENT DOCUMENTS

| | | | | |
|---|---|---|---|---|
| 5,605,569 | A * | 2/1997 | Boyer ................. | H01M 10/10 106/482 |
| 5,989,750 | A * | 11/1999 | Ohba ................. | H01M 50/463 429/251 |
| 2003/0022068 | A1 | 1/2003 | Pekala | |
| 2005/0130309 | A1* | 6/2005 | Gjerde ................. | G01N 31/16 436/34 |
| 2009/0305127 | A1* | 12/2009 | Miller ................ | H01M 50/446 429/163 |
| 2011/0293988 | A1* | 12/2011 | Obernyer ............ | H01M 4/73 429/144 |
| 2012/0070713 | A1 | 3/2012 | Whear et al. | |
| 2012/0237832 | A1 | 9/2012 | Nakagari et al. | |
| 2015/0207121 | A1* | 7/2015 | Frenzel .............. | H01M 50/446 429/252 |

OTHER PUBLICATIONS

Somani et al., "Flow-induced shish-kebab precursor structures in entangled polymer melts," Jul. 20, 2005, Polymer, 46, 8587-8623. (Year: 2005).*

Somali et al., "Flow-induced shish-kebab precursor structures in entangled polymer melts," Jul. 2005, Polymer, vol. 46, Issue 20, pp. 8587-8623. (Year: 2005).

* cited by examiner

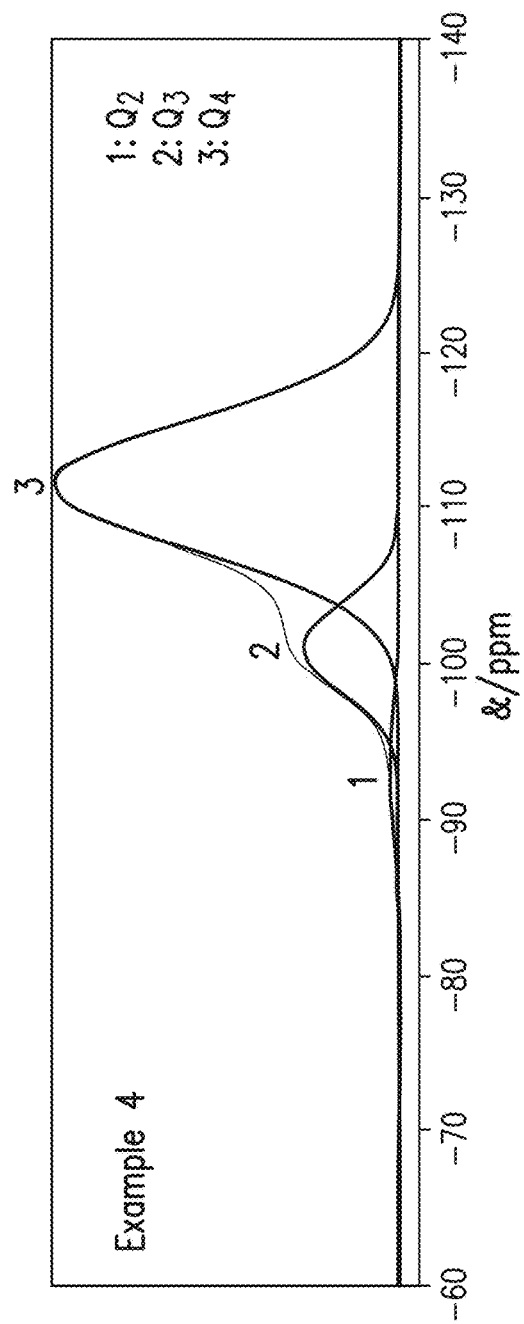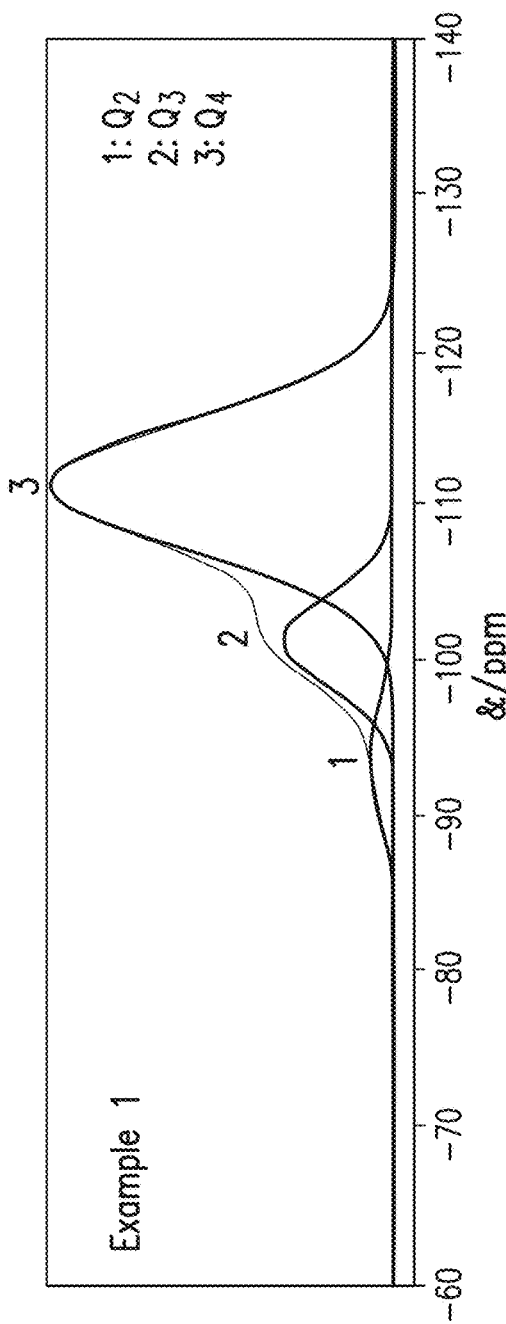

SEPARATORS FOR ENHANCED FLOODED BATTERIES, BATTERIES, AND RELATED METHODS

CROSS REFERENCE TO RELATED APPLICATIONS

This application is a divisional application which claims priority to U.S. Application Ser. No. 15/482,293, filed Apr. 7, 2017; which claims priority to and the benefit of U.S. Provisional Patent App. No. 62/319,959 filed Apr. 8, 2016.

FIELD

In accordance with at least selected embodiments, the present disclosure or invention is directed to novel or improved separators, battery separators, enhanced flooded battery separators, batteries, cells, and/or methods of manufacture and/or use of such separators, battery separators, enhanced flooded battery separators, cells, batteries, systems, methods, and/or vehicles using the same. In accordance with at least certain embodiments, the present disclosure or invention is directed to novel or improved battery separators, flooded lead acid battery separators, or enhanced flooded lead acid battery separators for starting lighting ignition ("SLI") batteries, flooded batteries for deep cycle applications, and enhanced flooded batteries ("EFB") and/or improved methods of making and/or using such improved separators, cells, batteries, systems, vehicles, or any combination thereof. In accordance with at least certain embodiments, the present disclosure or invention is directed to an improved separator for enhanced flooded batteries and/or improved methods of making and/or using such batteries having such improved separators. In accordance with at least selected embodiments, the present disclosure or invention is directed to separators, particularly separators for enhanced flooded batteries having reduced electrical resistance and/or increased cold cranking amps. In addition, disclosed herein are methods, systems, and battery separators for enhancing battery life, reducing water loss, reducing internal resistance, increasing wettability, reducing acid stratification, improving acid diffusion, improving cold cranking amps, improving uniformity, or any combination thereof in at least enhanced flooded batteries. In accordance with at least particular embodiments, the present disclosure or invention is directed to an improved separator for enhanced flooded batteries wherein the separator includes performance enhancing additives or coatings, increased porosity, increased void volume, amorphous silica, higher oil absorption silica, higher silanol group silica, silica with an OH to Si ratio of 21:100 to 35:100, reduced electrical resistance, a shish-kebab structure or morphology, a polyolefin microporous membrane containing particle-like filler in an amount of 40% or more by weight of the membrane and polymer, such as ultrahigh molecular weight polyethylene, having shish-kebab formations with extended chain crystal (shish formation) and folded chain crystal (kebab formation) and the average repetition periodicity of the kebab formation from 1 nm to 150 nm, decreased sheet thickness, decreased tortuosity, and/or the like.

BACKGROUND

Enhanced flooded batteries ("EFB") and absorbent glass-mat ("AGM") batteries have been developed to meet the expanding need for electric power sources in idle start stop applications. EFB systems have similar architecture to traditional flooded lead acid batteries, in which positive and/or negative electrodes are surrounded by a microporous separator and submerged in a liquid electrolyte. AGM systems, on the other hand, do not contain free liquid electrolyte. Instead, the electrolyte is absorbed into a glass fiber mat which is then layered on top of the electrodes. Historically, AGM systems have been associated with higher discharge power, better cycle life, and greater cold cranking amps than flooded battery systems. However, AGM batteries are significantly more expensive to manufacture and are more sensitive to overcharging. As such, EFB systems remain an attractive option for mobile and/or stationary power sources for some markets and applications. Such power source and energy storage applications are as varied as: flat-plate batteries; tubular batteries; vehicle SLI, and hybrid-electric vehicle ISS applications; deep cycle applications; golf car or golf cart, and e-rickshaw batteries; batteries operating in a partial state of charge ("PSOC"); inverter batteries; and storage batteries for renewable energy sources.

EFB systems may include one or more battery separators that separates the positive electrode from the negative electrode within a lead acid battery cell. A battery separator may have two primary functions. First, a battery separator should keep the positive electrode physically apart from the negative electrode in order to prevent any electronic current passing between the two electrodes. Second, a battery separator should permit ionic diffusion between the positive and negative electrodes with the least possible resistance in order to generate a current. A battery separator can be made out of many different materials, but these two opposing functions have been met well by a battery separator being made of a porous nonconductor. With this structure, pores contribute to ionic diffusion between electrodes, and a non-conducting polymeric network prevents electronic shorting.

An EFB battery with increased discharge rate and cold cranking amperes or amps ("CCA") would be able to displace AGM batteries. It is known that cold cranking amps are correlated with the internal resistance of the battery. It is therefore expected that lowering internal resistance of an enhanced flooded battery will increase the cold cranking amps rating. As such, there is a need for new battery separator and/or battery technology to meet and overcome the challenges arising from current lead acid battery systems, especially to lower internal resistance and increase cold cranking amps in enhanced flooded batteries.

SUMMARY

In accordance with at least selected embodiments, the present disclosure or invention may address the above issues or needs. In accordance with at least certain objects, the present disclosure or invention may provide an improved separator and/or battery which overcomes the aforementioned problems, for instance by providing enhanced flooded batteries having reduced internal electrical resistance and increased cold cranking amps.

In accordance with at least selected embodiments, the present disclosure or invention may address the above issues or needs and/or may provide novel or improved separators and/or enhanced flooded batteries. In accordance with at least selected embodiments, the present disclosure or invention is directed to novel or improved separators, battery separators, enhanced flooded battery separators, batteries, cells, and/or methods of manufacture and/or use of such separators, battery separators, enhanced flooded battery separators, cells, and/or batteries. In accordance with at least certain embodiments, the present disclosure or invention is directed to novel or improved battery separators, flooded lead acid battery separators, or enhanced flooded battery separators for automobile applications, for idle start stop ("ISS") batteries, for batteries with high power requirements, such as uninterrupted power supply ("UPS") or valve regulated lead acid ("VRLA"), and/or for batteries with high CCA requirements, and/or improved methods of making and/or using such improved separators, cells, batteries, systems, and/or the like. In accordance with at least certain embodiments, the present disclosure or invention is directed to an improved separator for enhanced flooded batteries and/or improved methods of using such batteries having such improved separators. In addition, disclosed herein are methods, systems and battery separators for enhancing battery performance and life, reducing acid stratification, reducing internal electrical resistance, increasing cold cranking amps, and/or improving uniformity in at least enhanced flooded batteries. In accordance with at least particular embodiments, the present disclosure or invention is directed to an improved separator for enhanced flooded batteries wherein the separator includes decreased electrical resistance, performance enhancing additives or coatings, improved fillers, increased porosity, decreased tortuosity, reduced thickness, reduced oil content, increased wettability, increased acid diffusion, and/or the like.

In accordance with at least one embodiment, a microporous separator with decreased tortuosity is provided. Tortuosity refers to the degree of curvature/turns that a pore takes over its length. Thus, a microporous separator with decreased tortuosity will present a shorter path for ions to travel through the separator, thereby decreasing electrical resistance. Microporous separators in accordance with such embodiments can have decreased thickness, increased pore size, more interconnected pores, and/or more open pores.

In accordance with at least certain selected embodiments, a microporous separator with increased porosity, or a separator with a different pore structure whose porosity is not significantly different from a known separator, and/or decreased thickness is provided. An ion will travel more rapidly though a microporous separator with increased porosity, increased void volume, reduced tortuosity, and/or decreased thickness, thereby decreasing electrical resistance. Such decreased thickness may result in decreased overall weight of the battery separator, which in turn decreases the weight of the enhanced flooded battery in which the separator is used, which in turn decreases the weight of the overall vehicle in which the enhanced flooded battery is used. Such decreased thickness may alternatively result in increased space for the positive active material ("PAM") or the negative active material ("NAM") in the enhanced flooded battery in which the separator is used.

In accordance with at least certain selected embodiments, a microporous separator with increased wettability (in water or acid) is provided. The separator with increased wettability will be more accessible to the electrolyte ionic species, thus facilitating their transit across the separator and decreasing electrical resistance.

In accordance with at least one embodiment, a microporous separator with decreased final oil content is provided. Such a microporous separator will also facilitate lowered ER (electrical resistance) in an enhanced flooded battery or system.

The separator may contain improved fillers that have increased friability, and that may increase the porosity, pore size, internal pore surface area, wettability, and/or the surface area of the separator. In some embodiments, the improved fillers have high structural morphology and/or reduced particle size and/or a different amount of silanol groups than previously known fillers and/or are more hydroxylated than previously known fillers. The improved fillers may absorb more oil and/or may permit incorporation of a greater amount of processing oil during separator formation, without concurrent shrinkage or compression when the oil is removed after extrusion. The fillers may further reduce what is called the hydration sphere of the electrolyte ions, enhancing their transport across the membrane, thereby once again lowering the overall electrical resistance or ER of the battery, such as an enhanced flooded battery or system.

The filler or fillers may contain various species (such as polar species, such as metals) that increase the ionic diffusion, and facilitate the flow of electrolyte and ions across the separator. Such also leads to decreased overall electrical resistance as such a separator is used in a flooded battery, such as an enhanced flooded battery.

The microporous separator further comprises a novel and improved pore morphology and/or novel and improved fibril morphology such that the separator contributes to significantly decreasing the electrical resistance in a flooded lead acid battery when such a separator is used in such a flooded lead acid battery. Such improved pore morphology and/or fibril morphology may result in a separator whose pores and/or fibrils approximate a shish-kebab (or shish kabob) type morphology. Another way to describe the novel and improved pore shape and structure is a textured fibril morphology in which silica nodes or nodes of silica are present at the kebab-type formations on the polymer fibrils (the fibrils sometimes called shishes) within the battery separator. Additionally, in certain embodiments, the silica structure and pore structure of a separator according to the present invention may be described as a skeletal structure or a vertebral structure or spinal structure, where silica nodes on the kebabs of polymer, along the fibrils of polymer, appear like vertebrae or disks (the "kebabs"), and sometimes are oriented substantially perpendicularly to, an elongate central spine or fibril (extended chain polymer crystal) that approximates a spinal column-like shape (the "shish").

In some instances, the improved battery comprising the improved separator with the improved pore morphology and/or fibril morphology may exhibit 20% lower, in some instances, 25% lower, in some instances, 30% lower electrical resistance, and in some instances, even more than a 30% drop in electrical resistance ("ER") (which may reduce battery internal resistance) while such a separator retains and maintains a balance of other key, desirable mechanical properties of lead acid battery separators. Further, in certain embodiments, the separators described herein have a novel and/or improved pore shape such that more electrolyte flows through or fills the pores and/or voids as compared to known separators.

In addition, the present disclosure provides improved enhanced flooded lead acid batteries comprising one or more improved battery separators for an enhanced flooded battery, which separator combines for the battery the desirable features of decreased acid stratification, lowered voltage drop (or an increase in voltage drop durability), and increased CCA, in some instances, more than 8%, or more than 9%, or in some embodiments, more than 10%, or more than 15%, increased CCA. Such an improved separator may result in an enhanced flooded battery whose performance matches or even exceeds the performance of an AGM battery. Such low electrical resistance separator may also be treated so as to result in an enhanced flooded lead acid battery having reduced water loss.

The separator may contain one or more performance enhancing additives, such as a surfactant, along with other additives or agents, residual oil, and fillers. Such performance enhancing additives can reduce separator oxidation and/or even further facilitate the transport of ions across the membrane contributing to the overall lowered electrical resistance for the enhanced flooded battery described herein.

The separator for a lead acid battery described herein may comprise a polyolefin microporous membrane, wherein the polyolefin microporous membrane comprises: polymer, such as polyethylene, such as ultrahigh molecular weight polyethylene, particle-like filler, and processing plasticizer (optionally with one or more additional additives or agents). The polyolefin microporous membrane may comprise the particle-like filler in an amount of 40% or more by weight of the membrane. And the ultrahigh molecular weight polyethylene may comprise polymer in a shish-kebab formation comprising a plurality of extended chain crystals (the shish formations) and a plurality of folded chain crystals (the kebab formations), wherein the average repetition or periodicity of the kebab formations is from 1 nm to 150 nm, preferably, from 10 nm to 120 nm, and more preferably, from 20 nm to 100 nm (at least on portions of the rib side of the separator).

The average repetition or periodicity of the kebab formations is calculated in accordance with the following definition:

- The surface of the polyolefin microporous membrane is observed using a scanning electron microscope ("SEM") after being subjected to metal vapor deposition, and then the image of the surface is taken at, for example 30,000 or 50,000-fold magnification at 1.0 kV accelerating voltage.
- In the same visual area of the SEM image, at least three regions where shish-kebab formations are continuously extended in the length of at least 0.5 μm or longer are indicated. Then, the kebab periodicity of each indicated region is calculated.
- The kebab periodicity is specified by Fourier transform of concentration profile (contrast profile) obtained by projecting in the vertical direction to the shish formation of the shish-kebab formation in each indicated region to calculate the average of the repetition periods.
- The images are analyzed using general analysis tools, for example, MATLAB (R2013a).
- Among the spectrum profiles obtained after the Fourier transform, spectrum detected in the short wavelength region are considered as noise. Such noise is mainly caused by deformation of contrast profile. The contrast profiles obtained for separators in accordance with the present invention appear to generate square-like waves (rather than sinusoidal waves). Further, when the contrast profile is a square-like wave, the profile after the Fourier transform becomes a Sine function and therefore generates plural peaks in the short wavelength region besides the main peak indicating the true kebab periodicity. Such peaks in the short wavelength region can be detected as noise.

In some embodiments, the separator for a lead acid battery described herein comprises a filler selected from the group consisting of silica, precipitated silica, fumed silica, and precipitated amorphous silica; wherein the molecular ratio of OH to Si groups within said filler, measured by $^{29}$Si-NMR, is within a range of from 21:100 to 35:100, in some embodiments, 23:100 to 31:100, in some embodiments, 25:100 to 29:100, and in certain preferred embodiments, 27:100 or higher. Silanol groups change a silica structure from a crystalline structure to an amorphous structure, since the relatively stiff covalent bond network of Si—O has partially disappeared. The amorphous-like silicas such as $Si(-O-Si)_2(-OH)_2$ and $Si(-O-Si)_3(-OH)$ have plenty of distortions, which may function as various oil absorption points. Therefore oil absorbability becomes high when the amount of silanol groups (Si—OH) is increased for the silica. Additionally, the separator described herein may exhibit increased hydrophilicity and/or may have higher void volume and/or may have certain aggregates surrounded by large voids when it comprises a silica comprising a higher amount of silanol groups and/or hydroxyl groups than a silica used with a known lead acid battery separator.

BRIEF DESCRIPTION OF THE DRAWINGS

FIG. 7 includes an SEM image of an embodiment of a separator of the instant invention at 50,000× magnification, while

FIG. 9A is for a control separator, while FIG. 9B is for a low ER separator with desirable mechanical properties according to one embodiment of the present invention. Note that FIG. 9B can also be seen as part of FIG. 1.

In FIG. 10, the bubble flow rate difference is significant in that it is measuring the through-pores of the separator and measuring the ability of such through-pores to functionally transport ions all the way through the separator. While the mean pore size and the minimum pore size are not significantly different, the maximum pore size is greater for the separator according to the present invention, and the bubble flow rate is significantly higher for the separator according to the present invention.

FIGS. 24A and 24B include deconvolution of the component peaks from the spectra of FIGS. 23A and 23B to determine the $Q_2$:$Q_3$:$Q_4$ ratios for the separator samples of CE4 (FIG. 24A) and Example 1 (FIG. 24B), respectively.

FIGS. 34A and 34B depict the particle size distribution of the new silica and standard silica before sonication and after 30 seconds and after 60 seconds of sonication.

DETAILED DESCRIPTION

Composition

Figure 1:
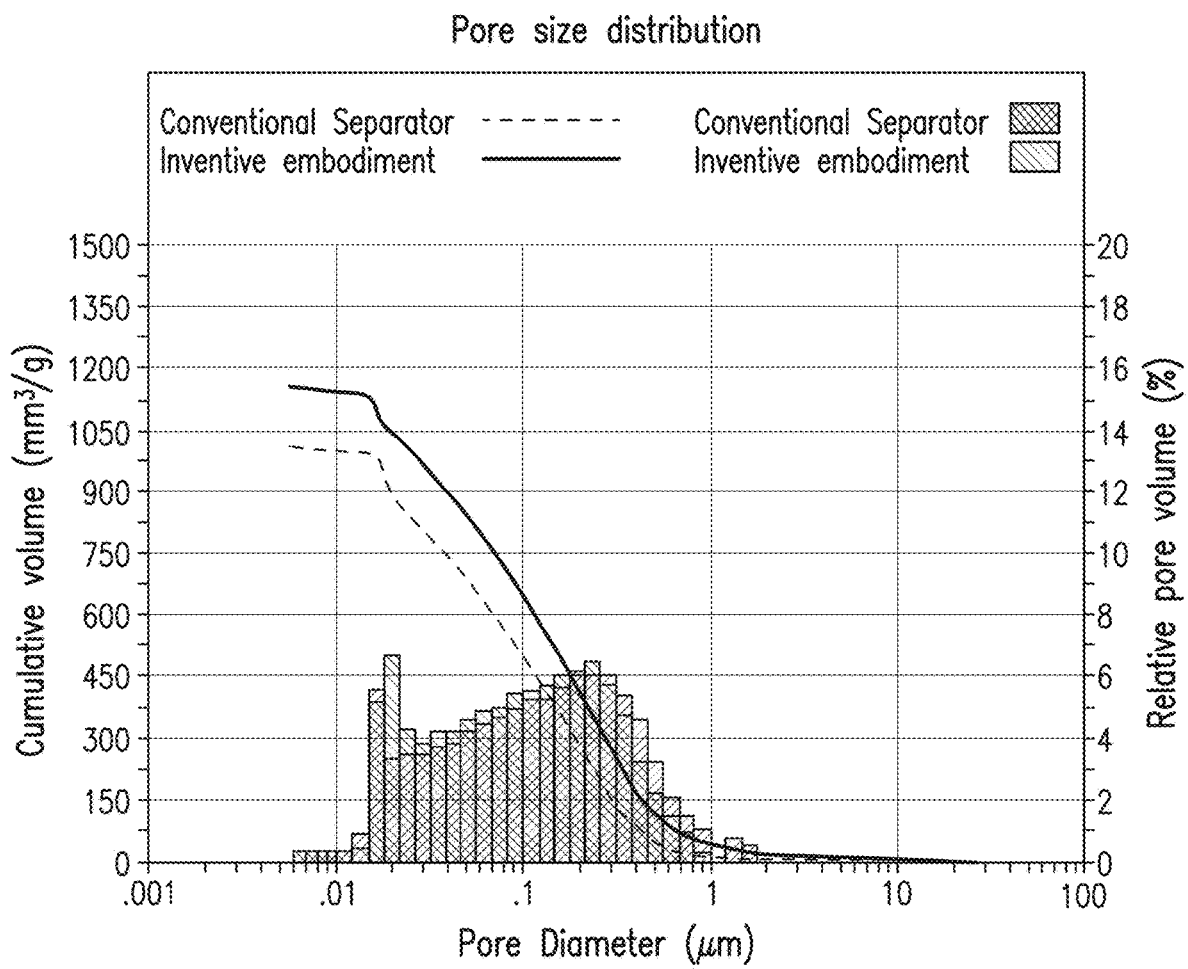
FIG. 1 includes a depiction of the pore size distribution of an embodiment of the instant invention, a lower ER separator, in comparison with a conventional separator.
Figure 2:
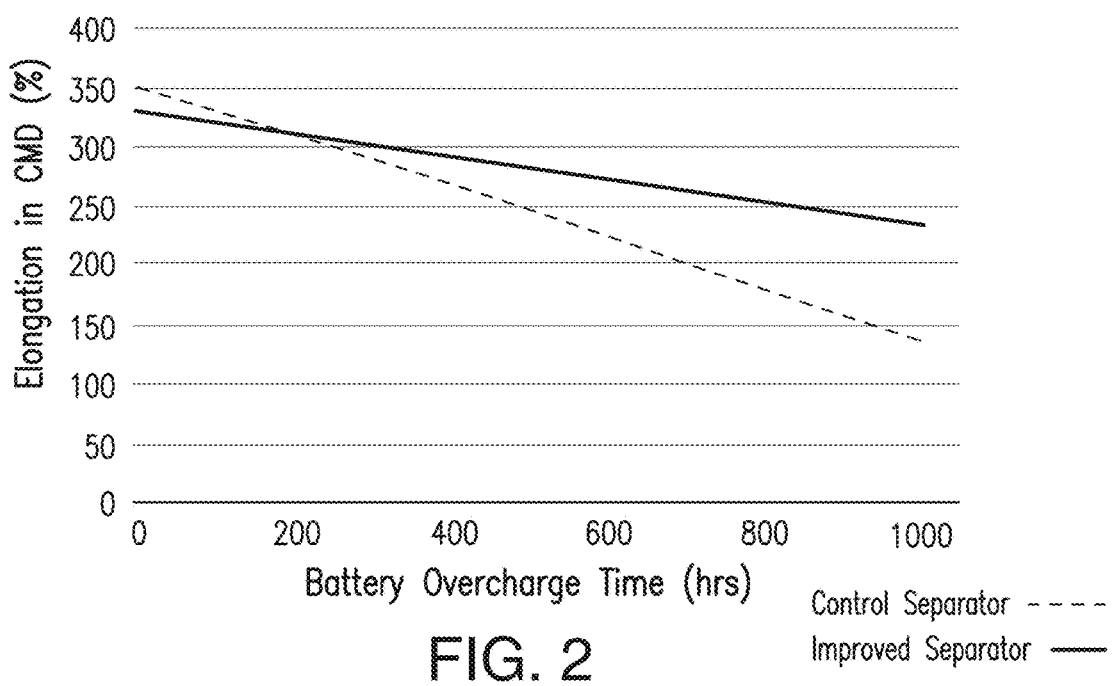
FIG. 2 includes a depiction of the oxidation stability of an embodiment of the instant invention (sometimes referred to as the "EFS" product, an Enhanced Flooded Separator™) in comparison with a conventional separator. In the battery overcharge test, after 1,000 hours, the separator according to the present invention is less brittle than the control separator and thus exhibits higher elongation.
Figure 3:
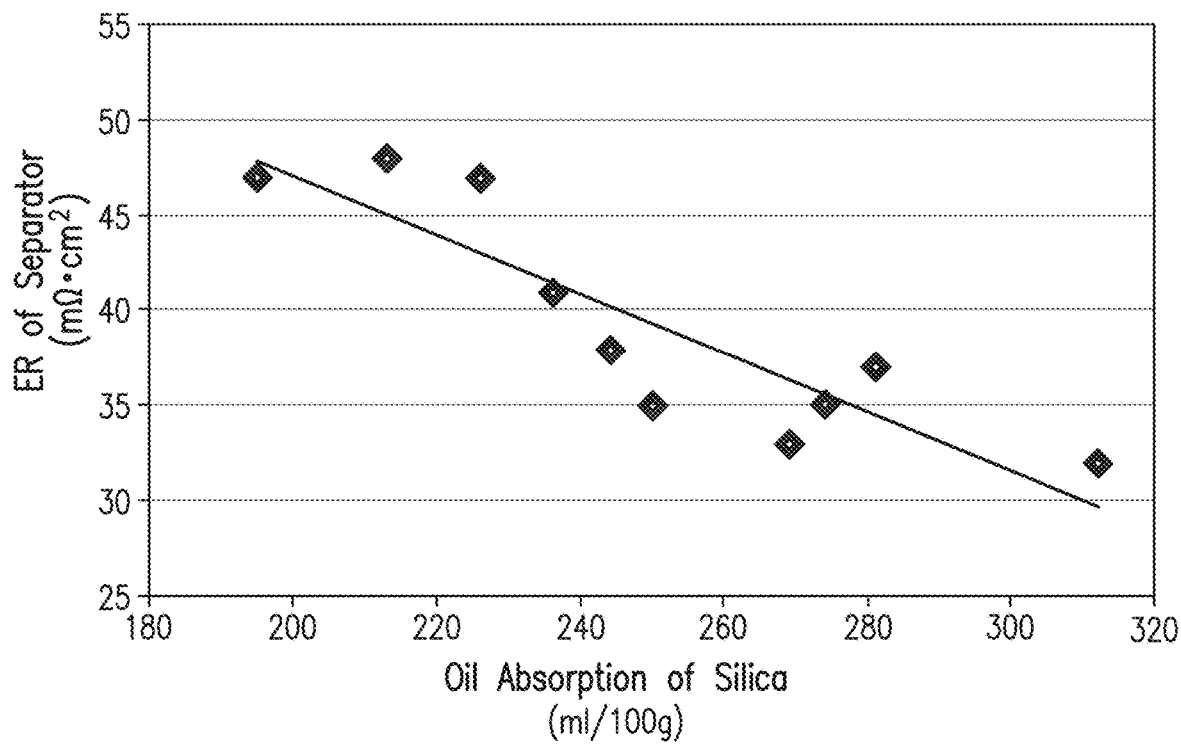
FIG. 3 includes a depiction of the electrical resistance data of separators prepared with different silica fillers. The silica fillers differ in their intrinsic oil absorption. In certain embodiments of the present invention, the improved separator is formed using a silica having an intrinsic oil absorption value of about 175-350 ml/100 g, in some embodiments, 200-350 ml/100 g, in some embodiments, 250-350 ml/100 gm, and in some further embodiments, 260-320 ml/100 g, though other oil absorption values are possible as well.
Figure 4:
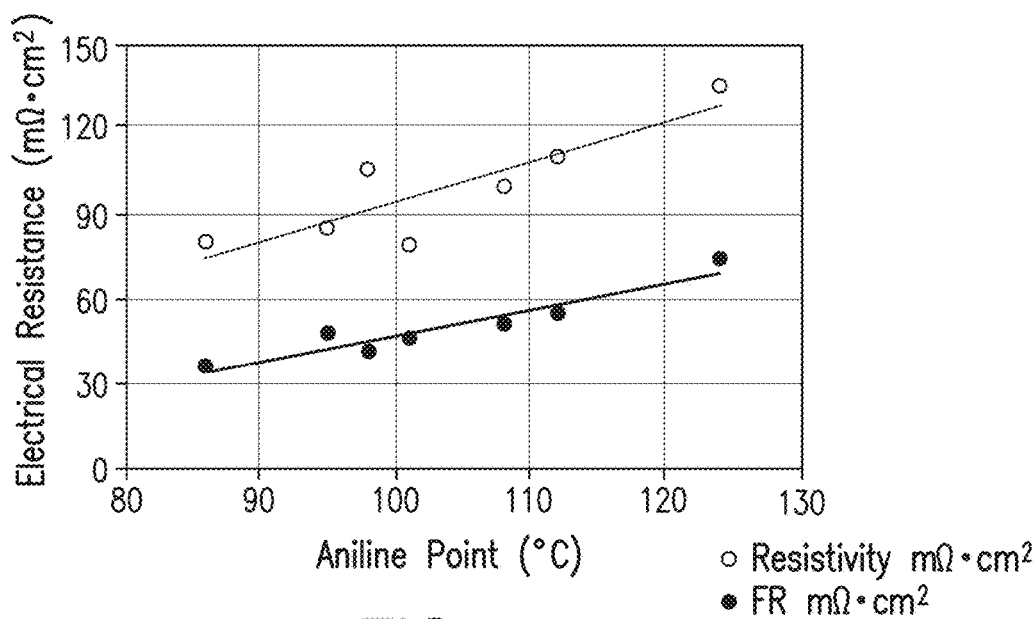
FIG. 4 includes a depiction of the electrical resistance data of separators prepared with different process oils. The oils differ in their aniline point.
Figure 5:
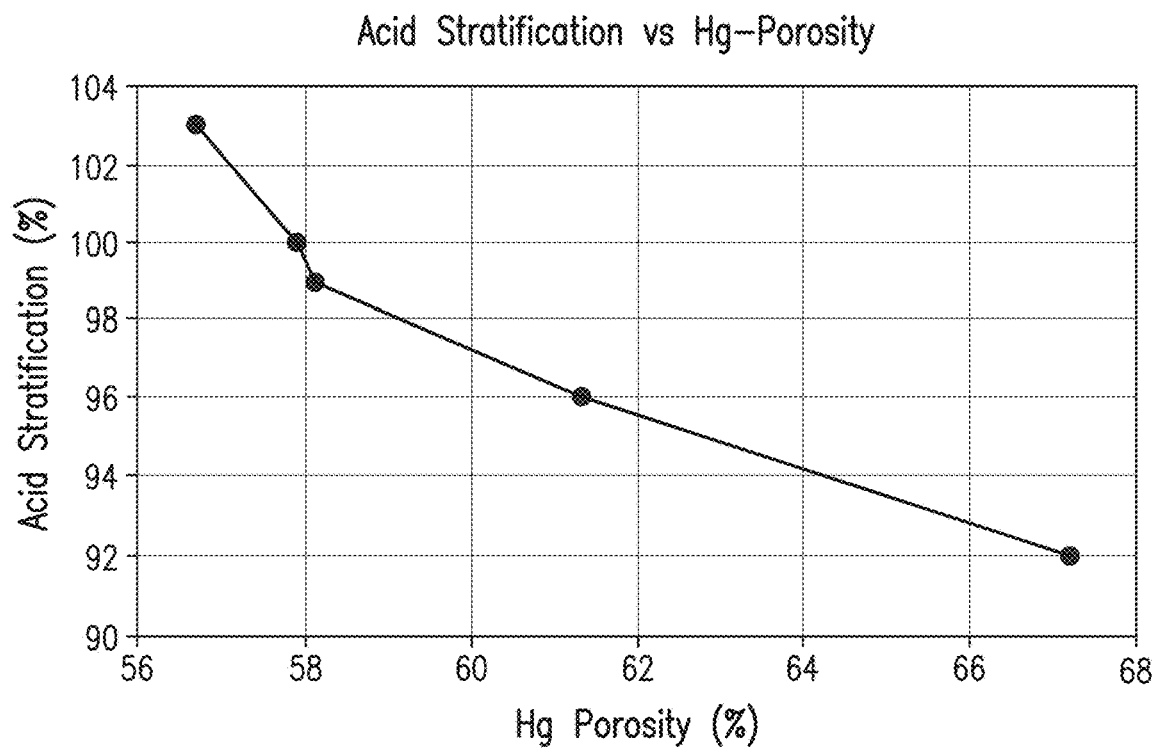
FIG. 5 includes a depiction of acid stratification (%) versus Hg porosity (%) for separators according to the present invention.
Figure 6:
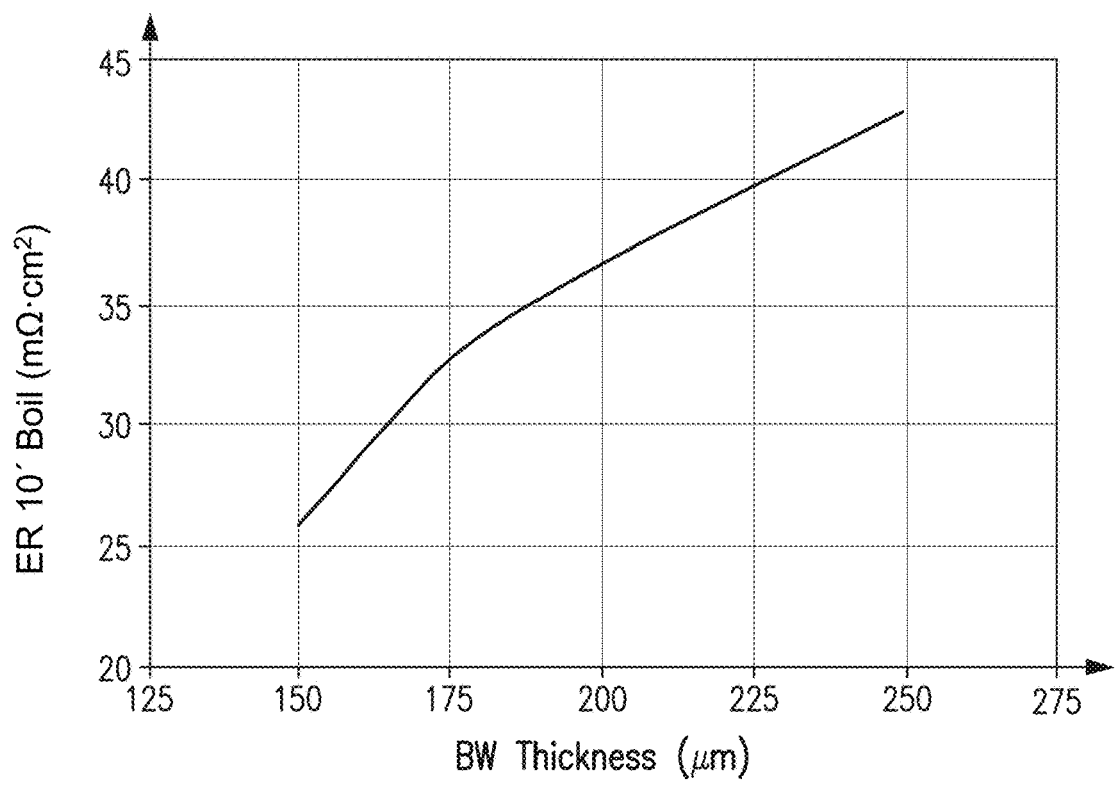
FIG. 6 includes a depiction of ER boil versus backweb thickness.
Figure 7:
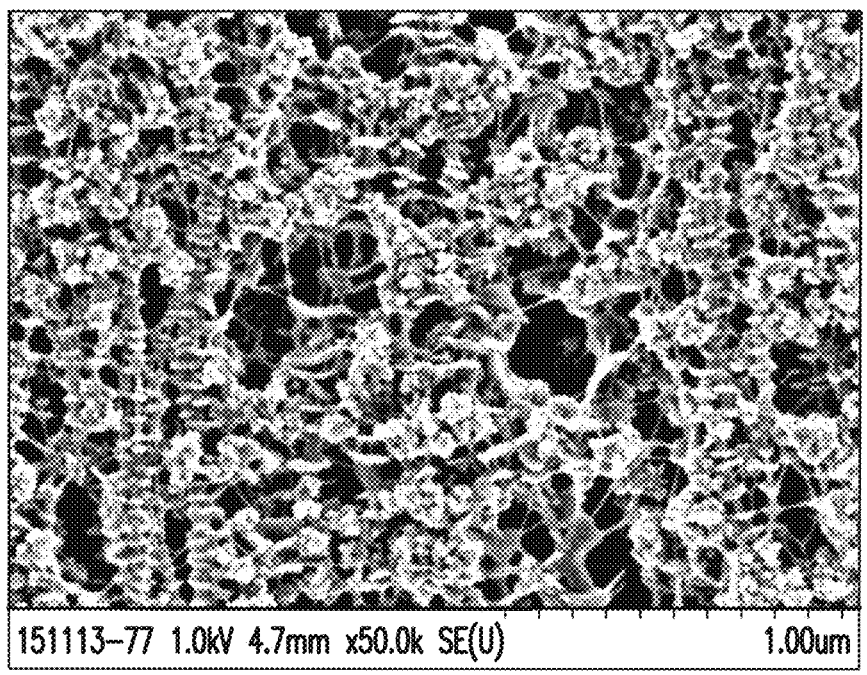
Figure 8A:
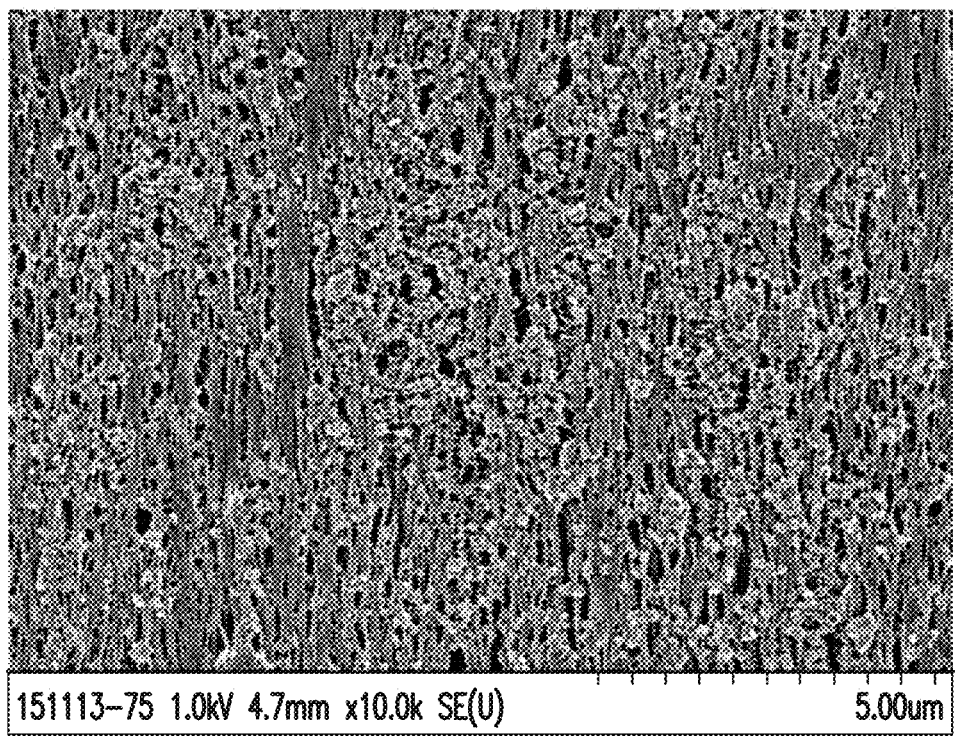
FIGS. 8A and 8B are SEM images of the same separator at 10,000× magnification. In the SEM of FIG. 7, the shish kebab-type morphology or textured fibril-type structure is observed, and the pore and silica structure leaves certain cavities or pores with much less polymer webbing (in some cases almost no polymer webbing) and much fewer thick fibrils or strands of hydrophobic polymer (in some cases almost no or no thick fibrils or strands of hydrophobic polymer). Electrolyte and/or acid, and therefore ions pass much more readily through the pore structure observed in this separator shown in FIGS. 7-8B. The structure of the separator provides free space in which acid freely moves.
Figure 8B:
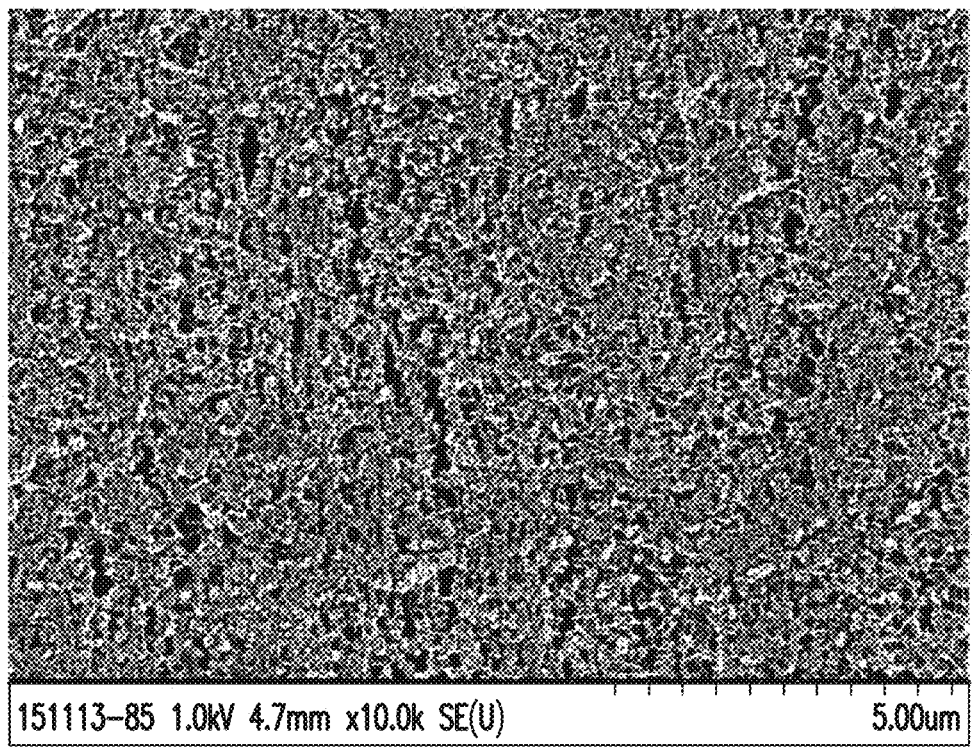
Figure 9A:
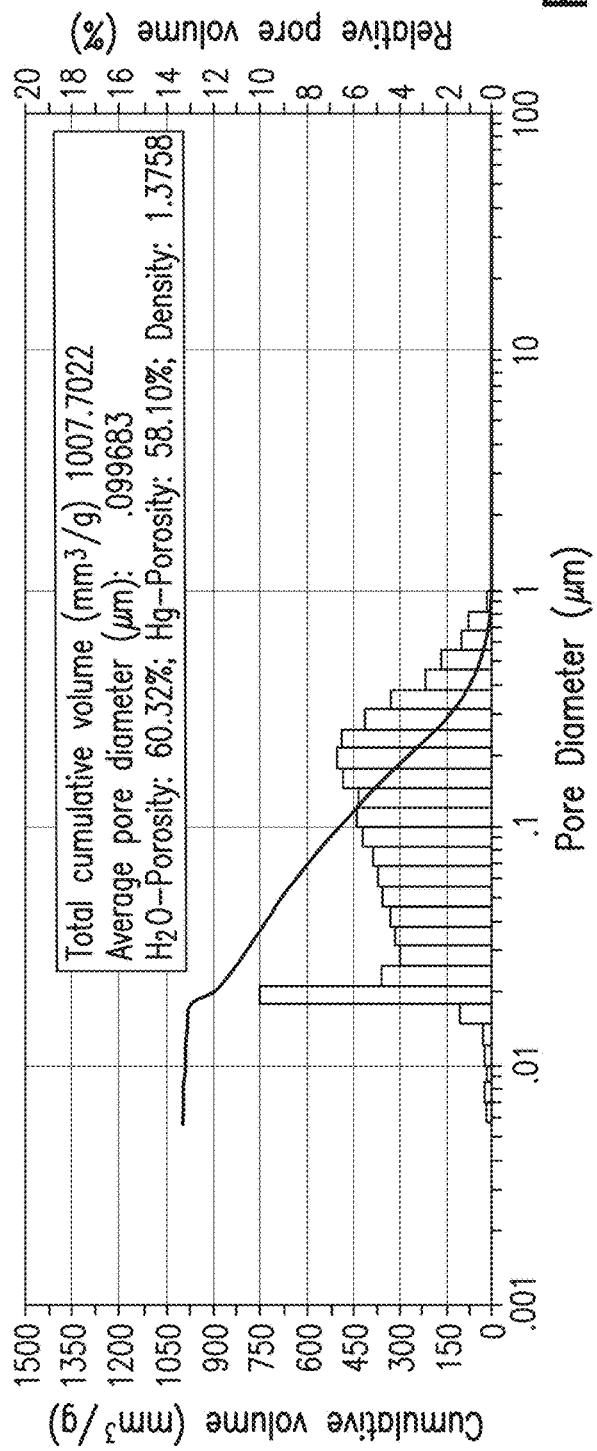
FIGS. 9A and 9B include depictions of the pore size distribution of separator embodiments.
Figure 9B:
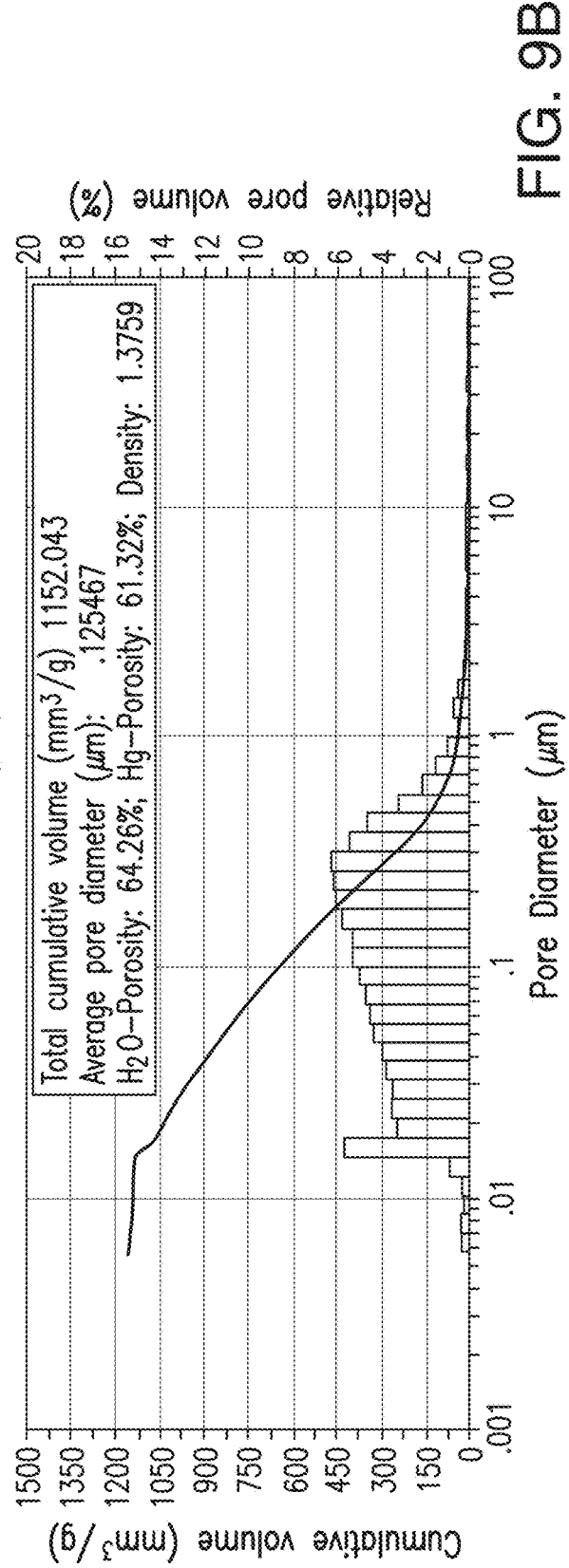
Figure 10:
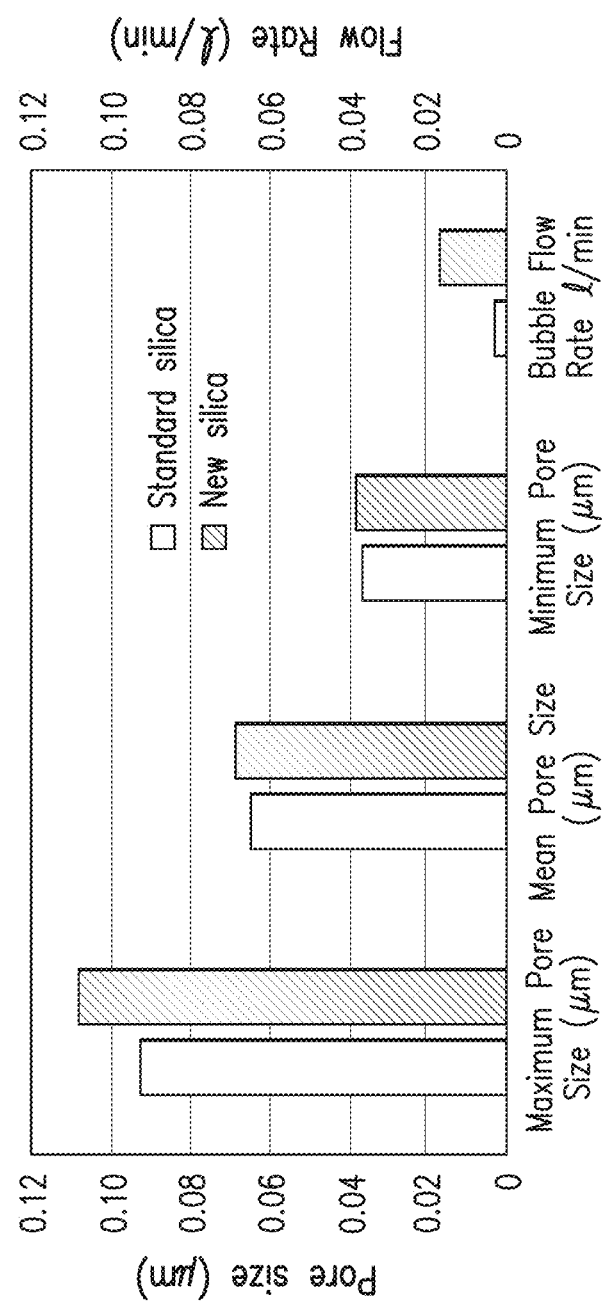
FIG. 10 includes a comparison of various pore size measurements for a separator according to the instant invention with a conventional separator.
Figure 11A:
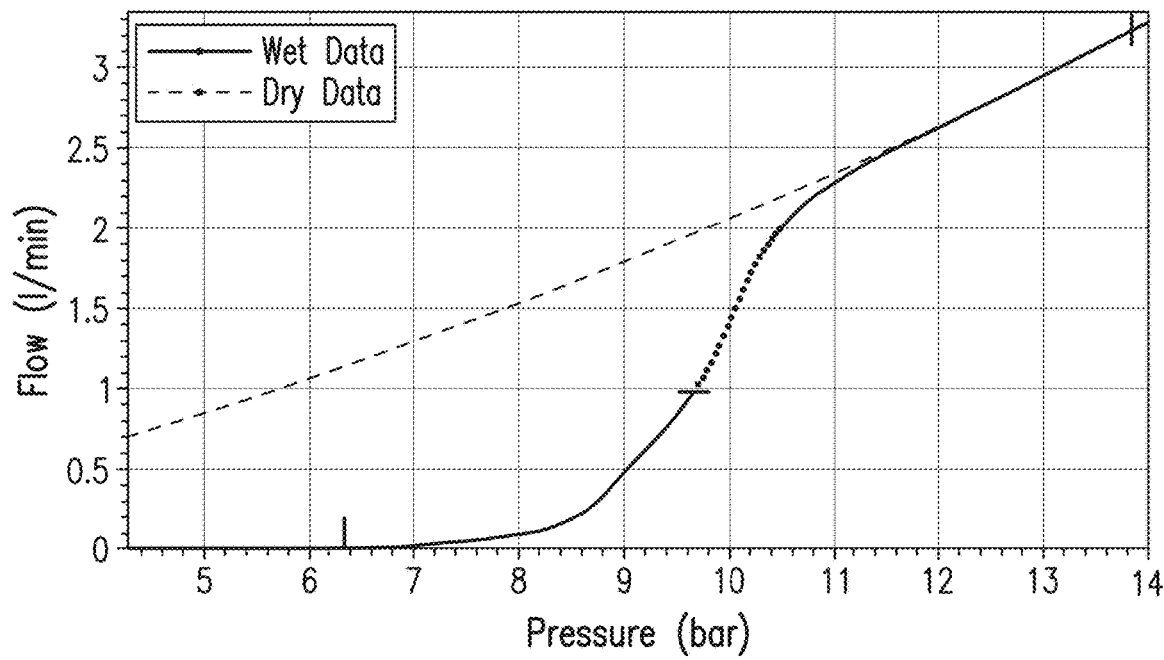
FIGS. 11A and 11B show porometry data and a depiction of the flow of liquid through a separator in accordance with an embodiment of the invention (FIG. 11A) in comparison with flow of liquid through a control separator (FIG. 11B).
Figure 11B:
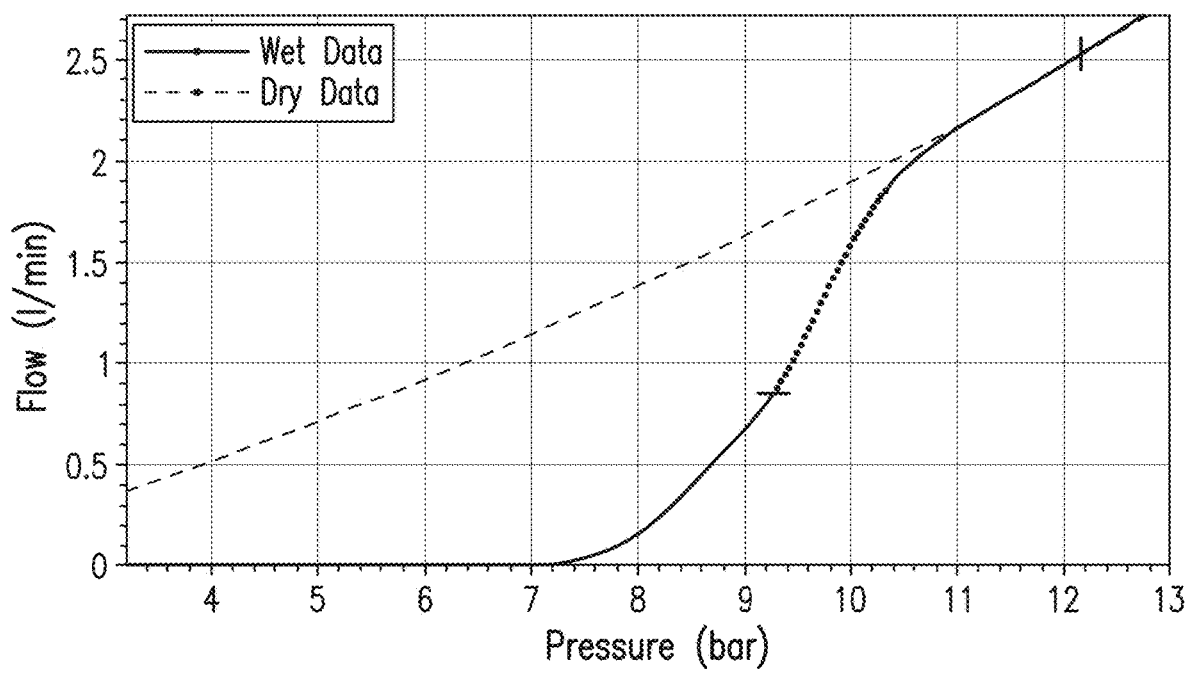
Figure 12A:
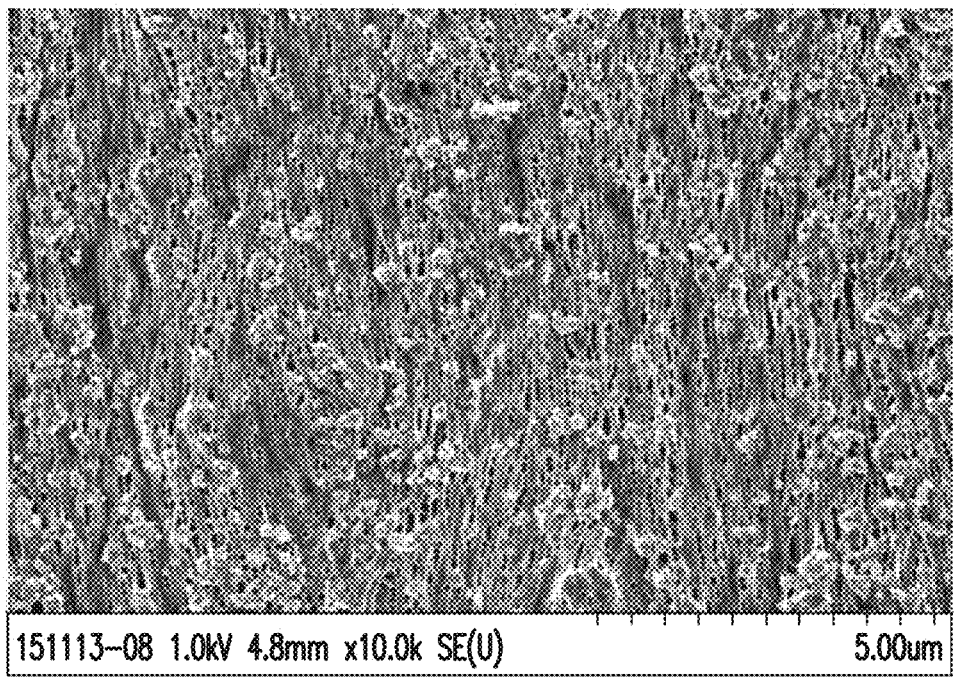
FIGS. 12A and 12B include two SEMs at two different magnifications of a control separator made by Daramic, LLC. In these SEMs, relatively thick fibrils or strands of hydrophobic polymer are observed.
Figure 12B:
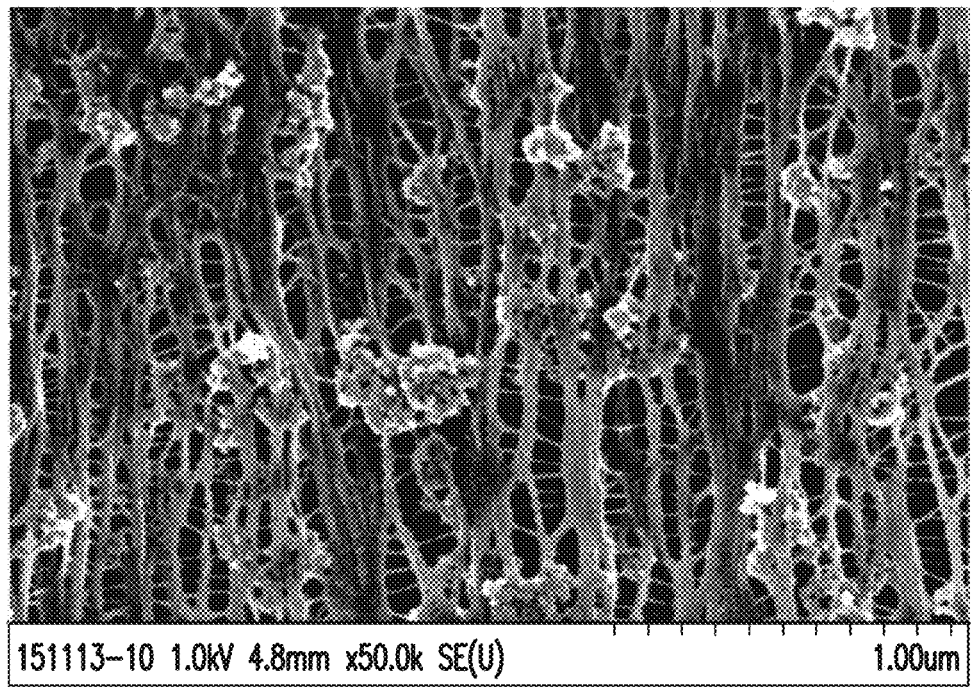
Figure 13A:
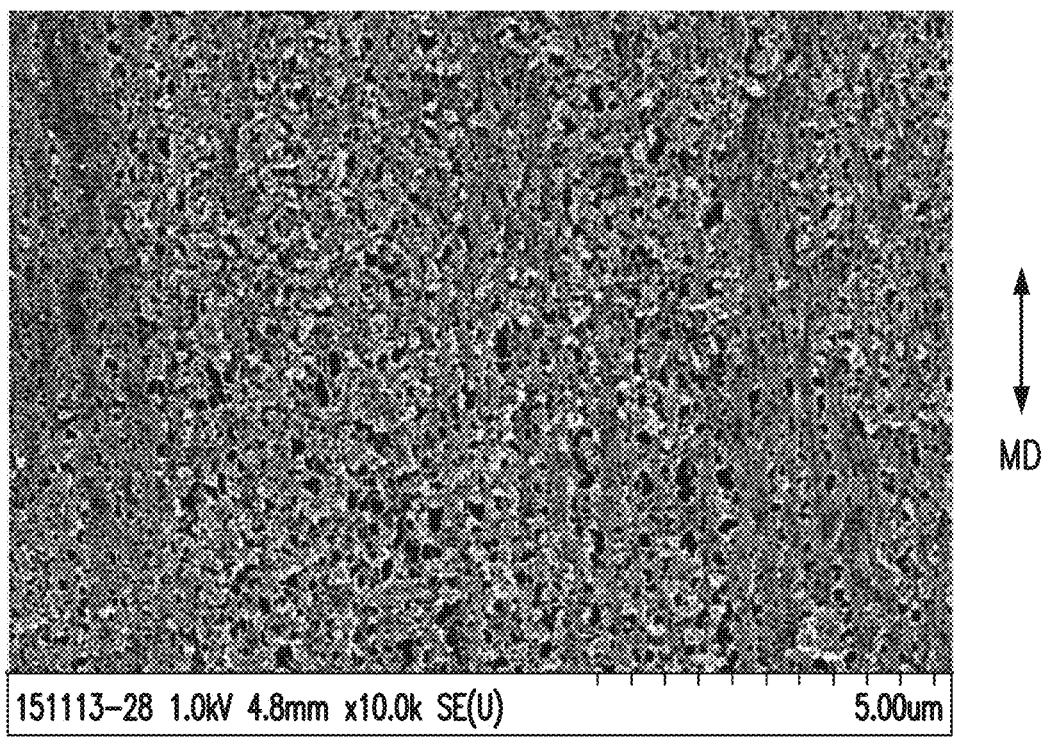
FIGS. 13A and 13B include two SEMs at two different magnifications of another control separator made by Daramic, LLC. In these SEMs, areas that appear to be polymer webbing can be observed.
Figure 13B:
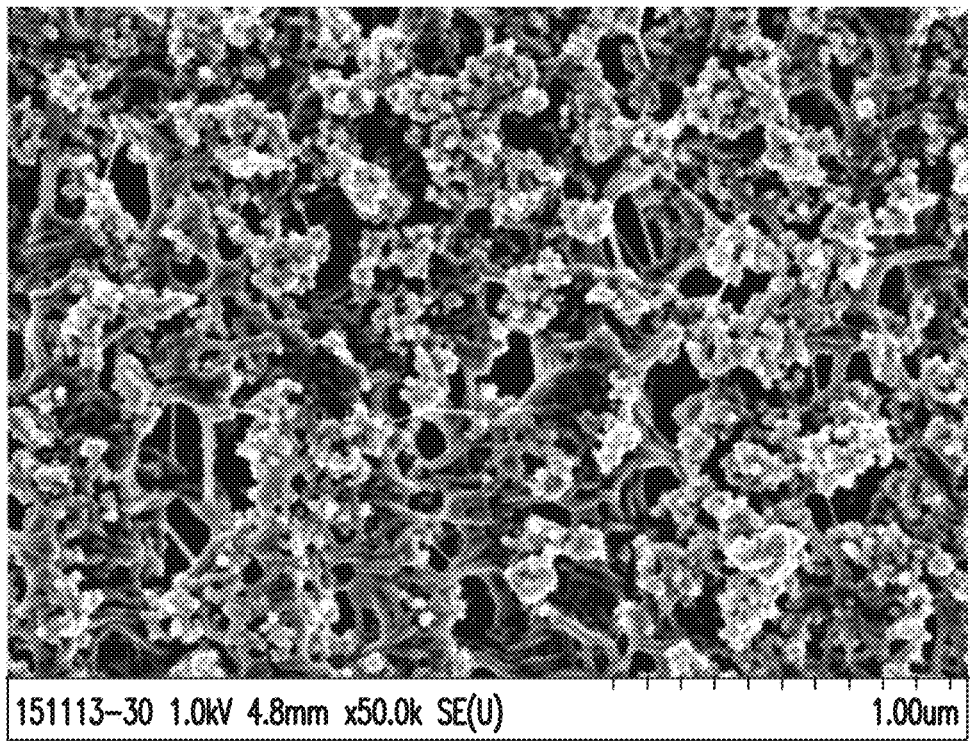
Figure 14A:
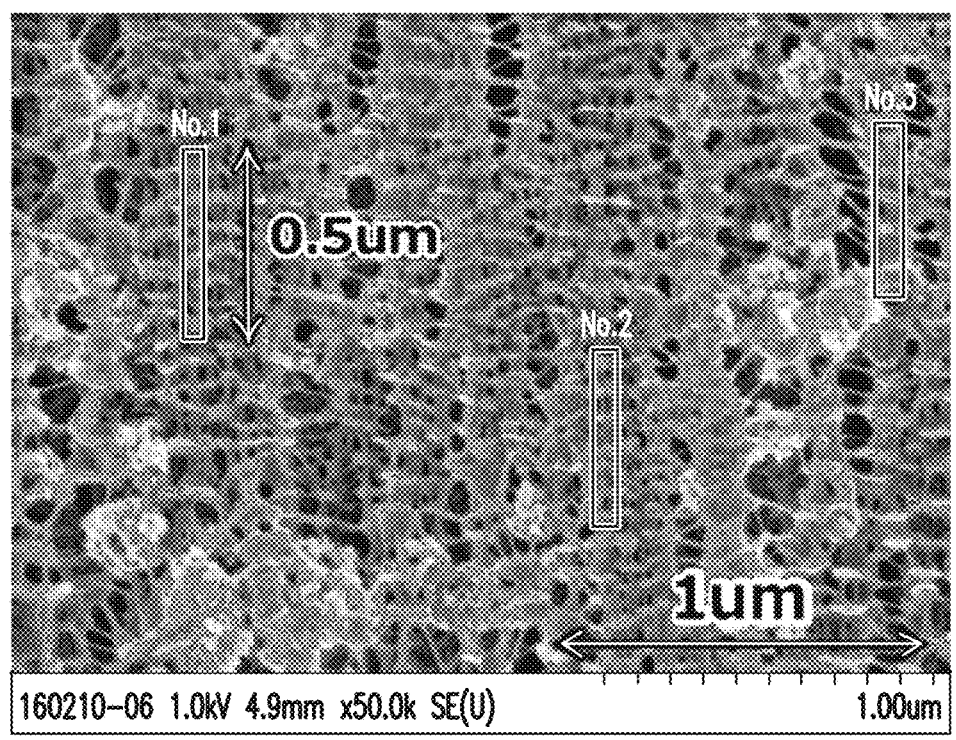
FIG. 14A includes an SEM of a separator formed according to an embodiment of the present invention, wherein the shish-kebab polymer formation(s) are observed.
Figure 14B:
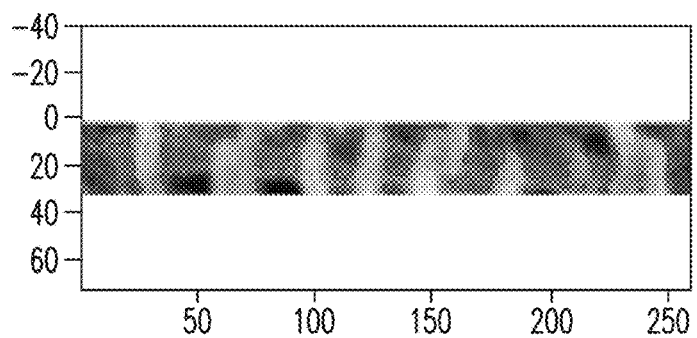
FIGS. 14B and 14C portray how a Fourier transform contrast profile (spectrum at the bottom, FIG. 14C) helps determine the repetition or periodicity of the shish-kebab formations (see shish-kebab formation at the top, FIG. 14B) in the separator.
Figure 14C:
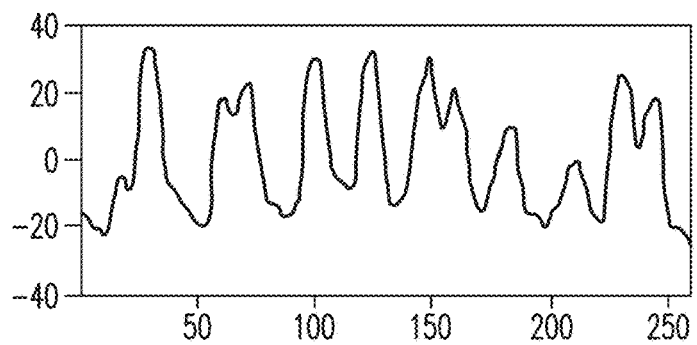

The inventive separator is preferably a porous membrane made of natural or synthetic materials, such as polyolefin, polyethylene, polypropylene, phenolic resin, PVC, rubber, synthetic wood pulp (SWP), glass fibers, synthetic fibers, cellulosic fibers, or combinations thereof, more preferably a microporous membrane made from one or more thermoplastic polymers. The thermoplastic polymer may, in principle, include all acid-resistant thermoplastic materials suitable for use in lead acid batteries. The preferred thermoplastic polymers include polyvinyls and polyolefins. The polyvinyls include, for example, polyvinyl chloride (PVC). The polyolefins include, for example, polyethylene, including ultrahigh molecular weight polyethylene (UHMWPE), and polypropylene. One preferred embodiment may include UHMWPE and a filler. In general, the preferred separator may be made by mixing, in an extruder, filler, thermoplastic polymer, and processing plasticizer. The processing plasticizer may be a processing oil, such as petroleum oil, paraffin-based mineral oil, mineral oil, and any combination thereof.

The microporous separator is preferably made of a polyolefin, such as polypropylene, ethylene-butene copolymer, and preferably polyethylene, more preferably high molecular weight polyethylene, i.e. polyethylene having a molecular weight of at least 600,000, even more preferably ultrahigh molecular weight polyethylene, i.e. polyethylene having a molecular weight of at least 1,000,000, in particular more than 4,000,000, and most preferably 5,000,000 to 8,000,000 (measured by viscosimetry and calculated by Margolie's equation), a standard load melt index of substantially 0 (measured as specified in ASTM D 1238 (Condition E) using a standard load of 2,160 g) and a viscosity number of not less than 600 ml/g, preferably not less than 1,000 ml/g, more preferably not less than 2,000 ml/g, and most preferably not less than 3,000 ml/g (determined in a solution of 0.02 g of polyolefin in 100 g of decalin at 130° C.).

In accordance with at least one embodiment, the separator is made up of an ultrahigh molecular weight polyethylene (UHMWPE) mixed with a processing oil and filler. In accordance with at least one other embodiment, the separator is made up of an ultrahigh molecular weight polyethylene (UHMWPE) mixed with a processing oil, additive and filler.

In certain selected embodiments, the separator can be prepared by combining, by weight, about 5-15% polymer, in some instances, about 10% polymer, about 10-60% filler, in some instances, about 30% filler, and about 30-80% processing oil, in some instances, about 60% processing oil. In other embodiments, the filler content is reduced, and the oil content is higher, for instance, greater than about 61%, 62%, 63%, 64%, 65%, 66%, 67%, 68%, 69% or 70% by weight. The filler:polymer ratio (by weight) can be about (or can be between about these specific ranges) such as 2:1, 2.5:1, 3:1, 3.5:1, 4.0:1. 4.5:1, 5.0:1, 5.5:1 or 6:1. The filler:polymer ratio (by weight) can be from about 1.5:1 to about 6:1, in some instances, 2:1 to 6:1, from about 2:1 to 5:1, from about 2:1 to 4:1, and in some instances, from about 2:1 to about 3:1.

Additives Introduction and Backweb Thickness

The mixture may also include minor amounts of other additives or agents as is common in the separator arts, such as surfactants, wetting agents, colorants, antistatic additives, antioxidants, and/or the like, and any combination thereof. The mixture may be extruded into the shape of a flat sheet, or a sheet having ribs or other protrusions on one or both sides of the sheet. After the separator is extruded, it can be further compressed using either a machine press or calendar stack or roll. The press or calendar may be engraved to impart ribs, grooves, serrations, serrated ribs, embossments and the like into the microporous separator.

According to certain selected embodiments, the separator has a backweb thickness that is less than about 150 µm, 140 µm, 130 µm, 120 µm, 110 µm, 100 µm, 90 µm, 80 µm, 70 µm, 60 µm, 50 µm, or 40 µm. In certain selected embodiments, the backweb thickness is from about 100-500 µm, 150-400 µm, 150-350 µm, 150-300 µm, or 175-300 µm, or 200-300 µm. In some embodiments, the backweb thickness is about 250 µm; in others, the backweb thickness is about 200 µm; in still others, the backweb thickness is about 400 µm. In some selected embodiments, the separator has a backweb thickness from about 200±35 µm, 200-250 µm, 50-150 µm, 75-150 µm, 75-125 µm, 75-100 µm, 100-125 µm, or 50-100 µm.

Ribs

In certain embodiments, the separator can have ribs on at least one face. The ribs can facilitate processing during folding and cutting steps, decrease acid stratification, and/or promote acid mixing and increase acid diffusion through the battery system. In accordance with at least another object of the present invention, there is provided a porous membrane with cross-ribs. Cross-ribs refer to ribs which extend in a direction other than the vertical edges of the separator. In some instances, cross-ribs are perpendicular to, or extend in a direction other than, the direction in which the main ribs of the separator extend. In some embodiments, cross-ribs are present on a separator even when it does not include any main ribs. In some embodiments, main ribs are located on one surface of the microporous membrane separator, while cross-ribs (sometimes referred to as negative cross-ribs) are located on another surface of the microporous membrane separator. In some embodiments of the present invention, the main ribs or major ribs have a height in the range of about 5 µm to about 1.5 mm. In some embodiments of the present invention, the cross-ribs can have a rib height of at least 0.005 mm, 0.01 mm, 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, or 1.0 mm. The separator can have a cross-rib height between 0.005-1.0 mm, 0.01-0.5 mm, 0.025-0.5 mm, 0.05-0.5 mm, 0.075-0.5 mm, 0.1-0.5 mm, 0.2-0.4 mm, 0.3-0.5 mm, 0.4-0.5 mm.

Filler

The separator can contain a filler having a high structural morphology. Exemplary fillers can include: dry finely divided silica; precipitated silica; amorphous silica; highly friable silica; alumina; talc; fish meal; fish bone meal; and the like, and any combination thereof. In certain preferred embodiments, the filler is one or more silicas. High structural morphology refers to increased surface area. The filler can have a high surface area, for instance, greater than 100 $m^2/g$, 110 $m^2/g$, 120 $m^2/g$, 130 $m^2/g$, 140 $m^2/g$, 150 $m^2/g$, 160 $m^2/g$, 170 $m^2/g$, 180 $m^2/g$, 190 $m^2/g$, 200 $m^2/g$, 210 $m^2/g$, 220 $m^2/g$, 230 $m^2/g$, 240 $m^2/g$, or 250 $m^2/g$. In some embodiments, the filler (e.g., silica) can have a surface area from 100-300 $m^2/g$, 125-275 $m^2/g$, 150-250 $m^2/g$, or preferably 170-220 $m^2/g$. Surface area can be assessed using TriStar 3000™ for multipoint BET nitrogen surface area. High structural morphology permits the filler to hold more oil during the manufacturing process. For instance, a filler with high structural morphology has a high level of oil absorption, for instance, greater than about 150 ml/100 g, 175 ml/100 g, 200 ml/100 g, 225 ml/100 g, 250 ml/100 g, 275 ml/100 g, 300 ml/100 g, 325 ml/100 g, or 350 ml/100 g. In some embodiments the filler (e.g., silica) can have an oil absorption from 200-500 ml/100 g, 200-400 ml/100 g, 225-375 ml/100 g, 225-350 ml/100 g, 225-325 ml/100 g, preferably 250-300 ml/100 g. In some instances, a silica filler is used having an oil absorption of 266 ml/100 g. Such a silica filler has a moisture content of 5.1%, a BET surface area of 178 $m^2/g$, an average particle size of 23 µm, a sieve residue 230 mesh value of 0.1%, and a bulk density of 135 g/L.

Silica with relatively high levels of oil absorption and relatively high levels of affinity for mineral oil becomes desirably dispersible in the mixture of polyolefin (such as polyethylene) and mineral oil when forming a lead acid battery separator of the type shown herein. In the past, some separators have experienced the detriment of poor dispersibility caused by silica aggregation when large amounts of silica are used to make such separators or membranes. In at least certain of the inventive separators shown and described herein, the polyolefin, such as polyethylene, forms a shish-kebab structure, since there are few silica aggregations or agglomerates that inhibit the molecular motion of the polyolefin at the time of cooling the molten polyolefin. All of this contributes to improved ion permeability through the resulting separator membrane, and the formation of the shish-kebab structure or morphology means that mechanical strength is maintained or even improved while a lower overall ER separator is produced.

In some selected embodiments, the filler has an average particle size no greater than 25 µm, in some instances, no greater than 22 µm, 20 µm, 18 µm, 15 µm, or 10 µm. In some instances, the average particle size of the filler particles (such as silica) is 15-25 µm. The particle size of the silica filler contributes to the oil absorption of the silica and/or the surface area of the silica filler.

In some preferred embodiments, the silica used to make the inventive separators has an increased amount of or number of surface silanol groups (surface hydroxyl groups) compared with silica fillers used previously to make lead acid battery separators. For example, the silica fillers that may be used with certain preferred embodiments herein may be those silica fillers having at least 10%, at least 15%, at least 20%, at least 25%, at least 30%, or at least 35% more silanol and/or hydroxyl surface groups compared with known silica fillers used to make known polyolefin lead acid battery separators.

The ratio (Si—OH)/Si of silanol groups (Si—OH) to elemental silicon (Si) can be measured, for example, as follows.

1. Freeze-crush a polyolefin microporous membrane (where certain inventive membranes contain a certain variety of oil-absorbing silica according to the present invention), and prepare the powder-like sample for the solid-state nuclear magnetic resonance spectroscopy ($^{29}$Si-NMR).

2. Perform the $^{29}$Si-NMR to the powder-like sample, and observe the spectrums including the Si spectrum strength which is directly bonding to a hydroxyl group (Spectrum: $Q_2$ and $Q_3$) and the Si spectrum strength which is only directly bonding to an oxygen atom (Spectrum: $Q_4$), wherein the molecular structure of each NMR peak spectrum can be delineated as follows:

$Q_2$: $(SiO)_2$—Si*—$(OH)_2$: having two hydroxyl groups
$Q_3$: $(SiO)_3$—Si*—(OH): having one hydroxyl group
$Q_4$: $(SiO)_4$—Si*: All Si bondings are SiO
Where Si* is proved element by NMR observation.

3. The conditions for $^{29}$Si-NMR used for observation are as follows:

Instrument: Bruker BioSpin Avance 500
Resonance Frequency: 99.36 MHz
Sample amount: 250 mg
NMR Tube: 7 my
Observing Method: DD/MAS
Pulse Width: 45°
Repetition time: 100 sec
Scans: 800
Magic Angle Spinning: 5,000 Hz
Chemical Shift Reference: Silicone Rubber as −22.43 ppm (External Ref)

4. Numerically, separate peaks of the spectrum, and calculate the area ratio of each peak belonging to $Q_2$, $Q_3$ and $Q_4$. After that, based on the ratios, calculate the molar ratio of hydroxyl groups (—OH) bonding directly to Si. The conditions for the numerical peak separation is conducted in the following manner:

Fitting region: −80 to −130 ppm
Initial peak top: −93 ppm for $Q_2$, −101 ppm for $Q_3$, −111 ppm for $Q_4$, respectively.
Initial full width half maximum: 400 Hz for $Q_2$, 350 Hz for $Q_3$, 450 Hz for $Q_4$, respectively.
Gaussian function ratio: 80% at initial and 70 to 100% while fitting.

5. The peak area ratios (Total is 100) of $Q_2$, $Q_3$, and $Q_4$ are calculated based on the each peak obtained by fitting. The NMR peak area corresponded to the molecular number of each silicate bonding structure (thus, for the $Q_4$ NMR peak, four Si—O—Si bonds are present within that silicate structure; for the $Q_3$ NMR peak, three Si—O—Si bonds are present within that silicate structure while one Si—OH bond is present; and for the $Q_2$ NMR peak, two Si—O—Si bonds are present within that silicate structure while two Si—OH bonds are present). Therefore each number of the hydroxyl group (—OH) of $Q_2$, $Q_3$, and $Q_4$ is multiplied by two (2) one (1), and zero (0), respectively. These three results are summed. The summed value displays the mole ratio of hydroxyl groups (—OH) directly bonding to Si.

In some selected embodiments, use of the fillers described above permits the use of a greater proportion of processing oil during the extrusion step. As the porous structure in the separator is formed, in part, by removal of the oil after the extrusion, higher initial absorbed amounts of oil results in higher porosity or higher void volume. While processing oil is an integral component of the extrusion step, oil is a non-conducting component of the separator. Residual oil in the separator protects the separator from oxidation when in contact with the positive electrode. The precise amount of oil in the processing step may be controlled in the manufacture of conventional separators. Generally speaking, conventional separators are manufactured using 50-70% processing oil, in some embodiments, 55-65%, in some embodiments, 60-65%, and in some embodiments, about 62% by weight processing oil. Reducing oil below about 59% is known to cause burning due to increased friction against the extruder components. However, increasing oil much above the prescribed amount may cause shrinking during the drying stage, leading to dimensional instability. Although previous attempts to increase oil content resulted in pore shrinkage or condensation during the oil removal, separators prepared as disclosed herein exhibit minimal, if any, shrinkage and condensation during oil removal. Thus, porosity can be increased without compromising pore size and dimensional stability, thereby decreasing electrical resistance.

In certain selected embodiments, the use of the filler described above allows for a reduced final oil concentration in the finished separator. Since oil is a non-conductor, reducing oil content can increase the ionic conductivity of the separator and assist in lowering the ER of the separator. As such, separators having reduced final oil contents can have increased efficiency. In certain selected embodiments are provided separators having a final processing oil content (by weight) less than 20%, for example, between about 14% and 20%, and in some particular embodiments, less than 19%, 18%, 17%, 16%, 15%, 14%, 13%, 12%, 11%, 10%, 9%, 8%, 7%, 6%, or 5%.

Friability

In certain selected embodiments, the filler can be an alumina, talc, silica, or a combination thereof. In some embodiments, the filler can be a precipitated silica, and in some embodiments, the precipitated silica is amorphous silica. In some embodiments, it is preferred to use aggregates and/or agglomerates of silica which allow for a fine dispersion of filler throughout the separator, thereby decreasing tortuosity and electrical resistance. In certain preferred embodiments, the filler (e.g., silica) is characterized by a high level of friability. Good friability enhances the dispersion of the filler throughout the polymer during extrusion of the microporous membrane, enhancing porosity and thus overall ionic conductivity through the separator.

Figures 34A, 34B:
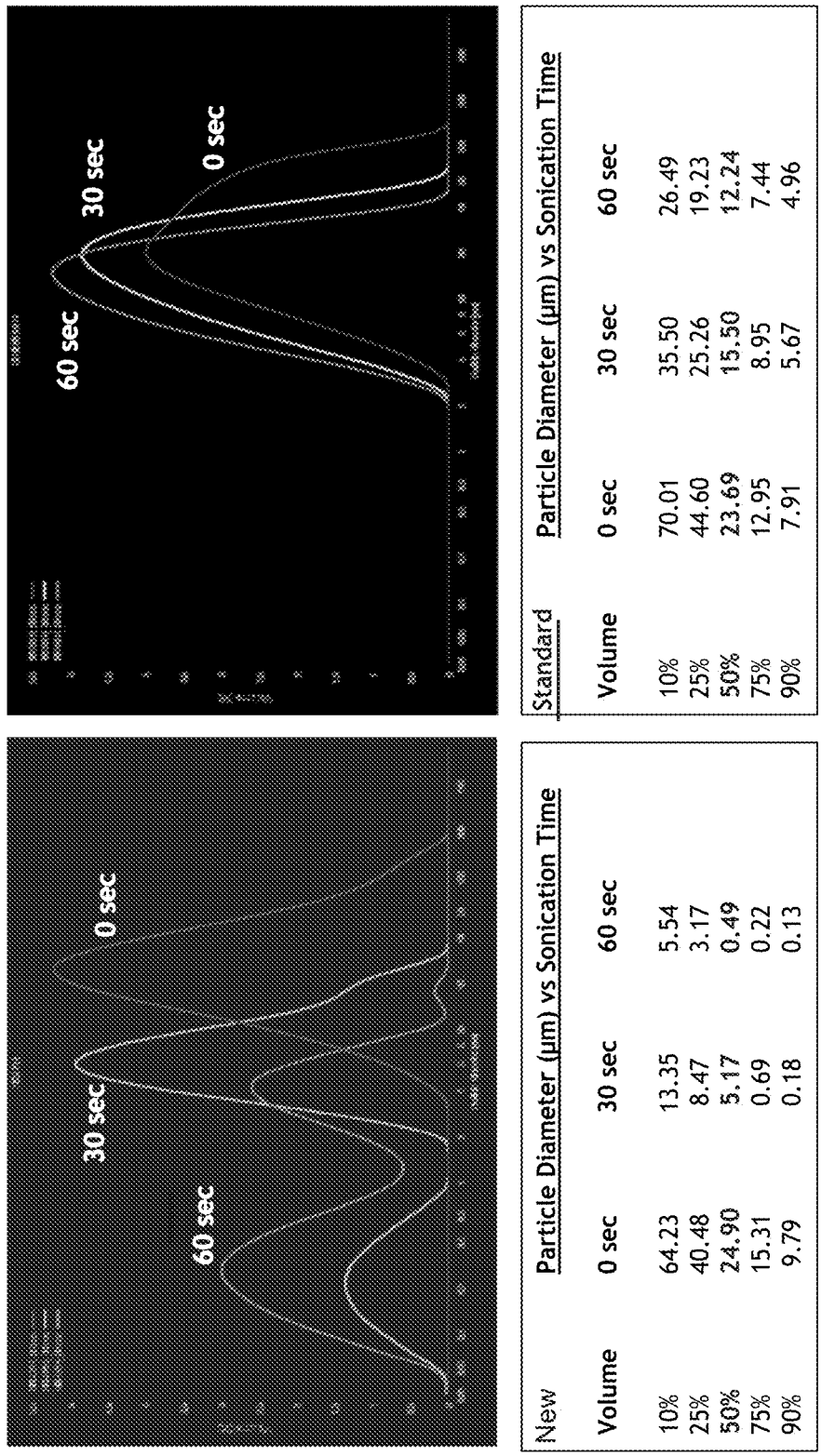
FIGS. 34A and 34B show the silica size before and after sonication.

Friability may be measured as the ability, tendency or propensity of the silica particles or material (aggregates or agglomerates) to be broken down into smaller sized and more dispersible particles, pieces or components. As shown on the left side of FIG. 34, the NEW silica is more friable (is broken down into smaller pieces after 30 seconds and after 60 seconds of sonication) than the STANDARD silica. For example, the NEW silica had a 50% volume particle diameter of 24.90 um at 0 seconds sonication, 5.17 um at 30 seconds and 0.49 um at 60 seconds. Hence, at 30 seconds sonication there was over a 50% reduction in size (diameter) and at 60 seconds there was over a 75% reduction in size (diameter) of the 50% volume silica particles. Hence, one possibly preferred definition of "high friability" may be at least a 50% reduction in average size (diameter) at 30 seconds of sonication and at least a 75% reduction in average size (diameter) at 60 seconds of sonication of the silica particles (or in processing of the resin silica mix to form the membrane). In at least certain embodiments, it may be preferred to use a more friable silica, and may be even more preferred to use a silica that is friable and multi-modal, such as bi-modal or tri-modal, in its friability. With reference to FIG. 34, the STANDARD silica appears single modal in it friability or particle size distribution, while the NEW silica appears more friable, and bi-modal (two peaks) at 30 seconds sonication and tri-modal (three peaks) at 60 seconds sonication. Such friable and multi-modal particle size silica or silicas may provide enhanced membrane and separator properties.

The use of a filler having one or more of the above characteristics enables the production of a separator having a higher final porosity. The separators disclosed herein can have a final porosity greater than 60%, 61%, 62%, 63%, 64%, 65%, 66%, 67%, 68%, 69%, or 70%. Porosity may be measured using gas adsorption methods. Porosity can be measured by BS-TE-2060.

In some selected embodiments, the microporous separator can have a greater proportion of larger pores while maintaining the average pore size no greater than about 1 μm, 0.9 μm, 0.8 μm, 0.7 μm, 0.6 μm, 0.5 μm, or 0.1 μm.

In accordance with at least one embodiment, the separator is made up of polyethylene, such as an ultrahigh molecular weight polyethylene ("UHMWPE"), mixed with a processing oil and filler as well as any desired additive. In accordance with at least one other embodiment, the separator is made up of an ultrahigh molecular weight polyethylene (UHMWPE) mixed with a processing oil and talc. In accordance with at least one other embodiment, the separator is made up of UHMWPE mixed with a processing oil and silica, for instance, precipitated silica, for instance, amorphous precipitated silica. The additive can then be applied to the separator via one or more of the techniques described above.

Besides reducing electrical resistance and increasing cold cranking amps, preferred separators are also designed to bring other benefits. With regard to assembly, the separators are more easily passed through processing equipment, and therefore more efficiently manufactured. To prevent shorts during high speed assembly and later in life, the separators have superior puncture strength and oxidation resistance when compared to standard PE separators. Combined with reduced electrical resistance and increased cold cranking amps, battery manufacturers are likely to find improved and sustained electrical performance in their batteries with these new separators.

Electrical Resistance

In certain selected embodiments, the disclosed separators exhibit decreased electrical resistance, for instance, an electrical resistance no greater than about 200 mΩ·cm², 180 mΩ·cm², 160 mΩ·cm², 140 mΩ·cm², 120 mΩ·cm², 100 mΩ·cm², 80 mΩ·cm², 60 mΩ·cm², 50 mΩ·cm², 40 mΩ·cm², 30 mΩ·cm², or 20 mΩ·cm². In various embodiments, the separators described herein exhibit about a 20% or more reduction in ER compared with a known separator of the same thickness. For example, a known separator may have an ER value of 60 mΩ·cm²; thus, a separator according to the present invention at the same thickness would have an ER value of less than about 48 mΩ·cm².

To test a sample separator for ER testing evaluation in accordance with the present invention, it must first be prepared. To do so, a sample separator is preferably submerged in a bath of demineralized water, the water is then brought to a boil and the separator is then removed after 10 minutes in the boiling demineralized water bath. After removal, excess water is shaken off the separator and then placed in a bath of sulfuric acid having a specific gravity of 1.280 at 27° C.±1° C. The separator is soaked in the sulfuric acid bath for 20 minutes. The separator is then ready to be tested for electrical resistance.

Puncture Resistance

In certain selected embodiments, exemplary separators may be characterized with an increased puncture resistance. For instance a puncture resistance of approximately 9 N or higher, 9.5 N or higher, 10 N or higher, 10.5 N or higher, 11 N or higher, 11.5 N or higher 12 N or higher, 12.5 N or higher, 13 N or higher, 13.5 N or higher, 14 N or higher, 14.5 N or higher, 15 N or higher, 15.5 N or higher, 16 N or higher, 16.5 N or higher, 17 N or higher, 17.5 N or higher, 18 N or higher, 18.5 N or higher, 19 N or higher, 19.5 N or higher, or 20 N or higher. In certain embodiments, exemplary separators may be preferably defined with a puncture resistance of approximately 9 N-20 N or higher, or more preferably approximately 12 N-20 N or higher.

Figure 25:
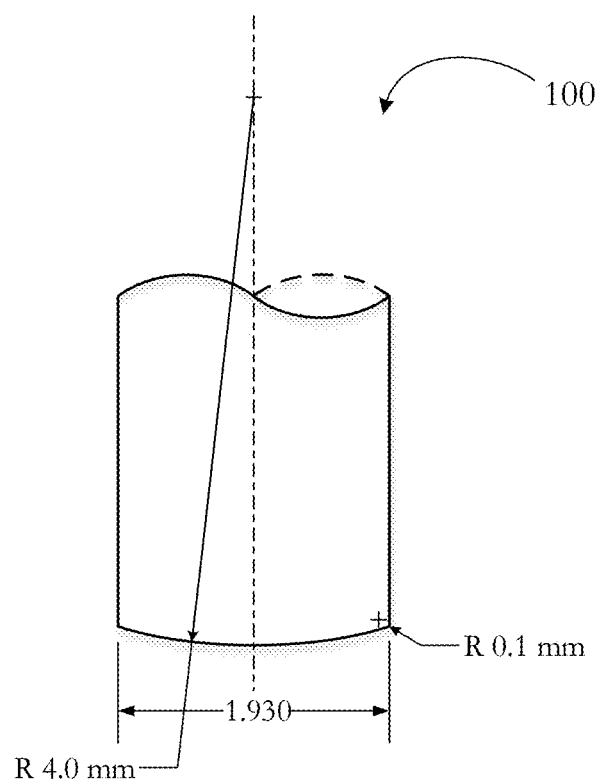
FIG. 25 illustrates a tip used to puncture test separators.
Figure 26A:
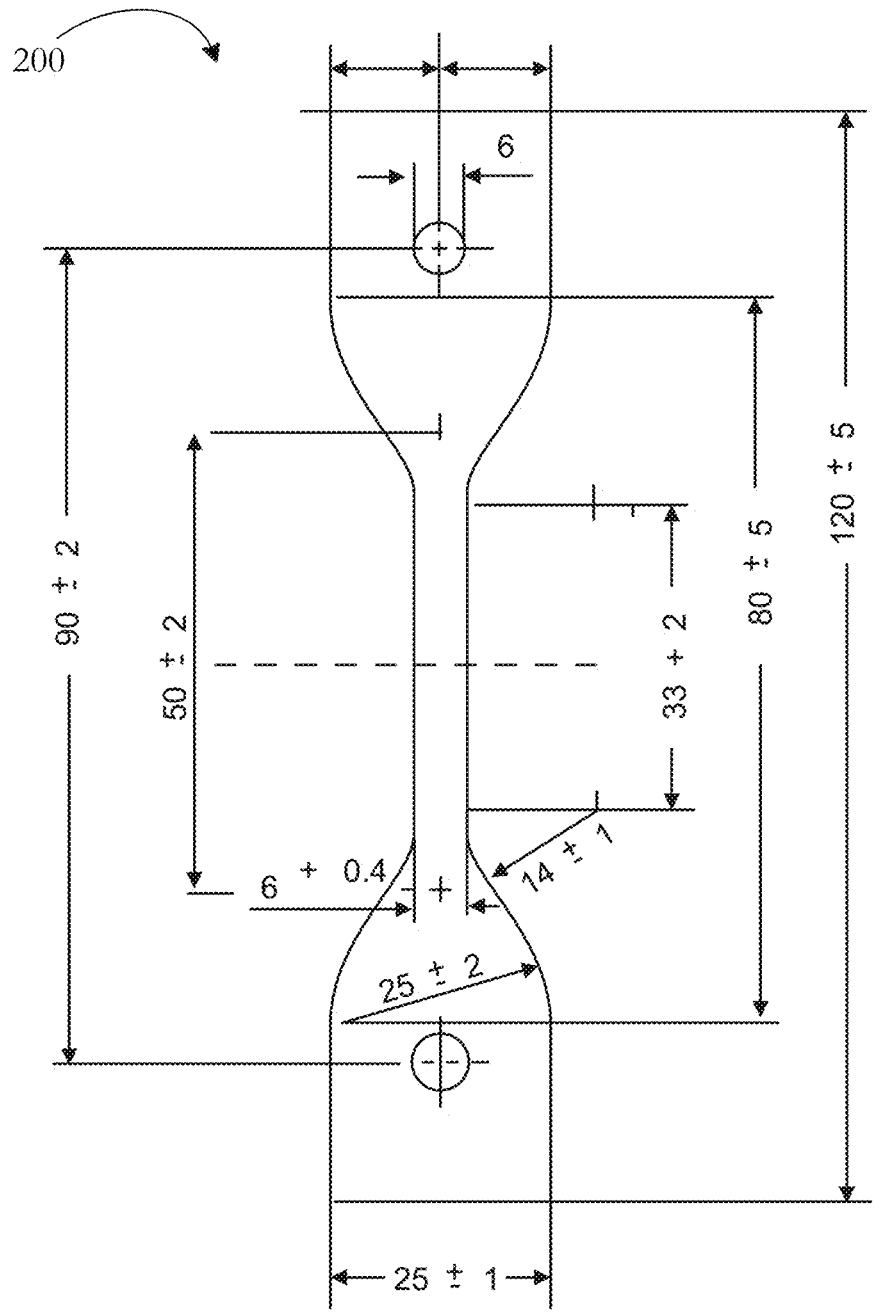
FIG. 26A is a schematic rendering of an elongation test sample.
Figure 26B:
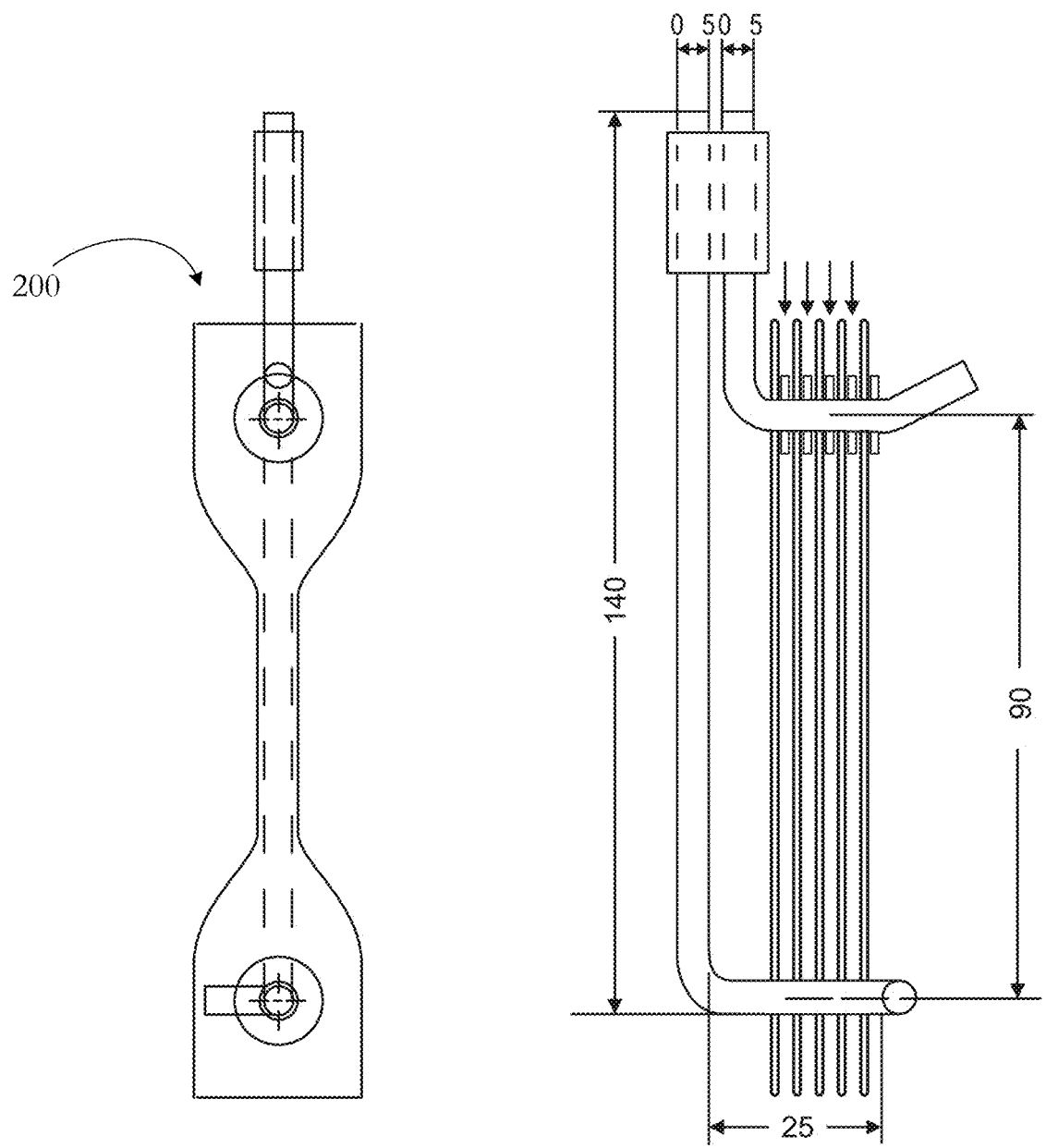
FIG. 26B illustrates a sample holder for an elongation test.

The puncture resistance may be measured as the force required to puncture the porous membrane utilizing the tip 100 as generally depicted in FIG. 25. The puncture base in which the porous membrane is supported while the tip 100 punctures the membrane may generally be described as a base having a 6.5 mm diameter straight hole with a 10 mm depth. The travel limit of the tip may be approximately 4 mm-8 mm below the puncture base surface. The puncture tip 100 is linearly moved into the membrane at a rate of approximately 5 mm/s.

Additives

The separator may contain one or more performance enhancing additives, such as surfactants, wetting agents, colorants, antistatic additives, antioxidants, and/or the like, and any combination thereof. The performance enhancing additive may preferably be a surfactant. Certain suitable surfactants are nonionic while other suitable surfactants are anionic. The use of these certain suitable surfactants in conjunction with the inventive separators described herein can lead to even further improved separators that, when used in a lead acid battery, lead to reduced water loss for that lead acid battery. Suitable surfactants include surfactants such as salts of alkyl sulfates; alkylarylsulfonate salts; alkylphenol-alkylene oxide addition products; soaps; alkyl-naphthalene-sulfonate salts; one or more sulfo-succinates, such as an anionic sulfo-succinate; dialkyl esters of sulfo-succinate salts; quaternary amines; block copolymers of ethylene oxide and propylene oxide; and salts of mono and dialkyl phosphate esters. The additive can be a non-ionic surfactant such as polyol fatty acid esters, polyethoxylated esters, polyethoxylated alcohols, alkyl polysaccharides such as alkyl polyglycosides and blends thereof, amine ethoxylates, sorbitan fatty acid ester ethoxylates, organosilicone based surfactants, ethylene vinyl acetate terpolymers, ethoxylated alkyl aryl phosphate esters and sucrose esters of fatty acids.

The battery separators can be provided in various ways with the additive(s), agent(s), and/or filler(s). The additive or additives can for example be applied to the separator when it is finished (e.g., after the extraction of the plasticizer (e.g., processing oil)) and/or added to the mixture used to extrude and ultimately produce the separator. According to certain preferred embodiments, the additive or a solution of the additive is applied to the surface of the separator. This variant is suitable in particular for the application of non-thermostable additives and additives which are soluble in the solvent used for the subsequent extraction. Particularly suitable as solvents for the additives according to the invention are low-molecular-weight alcohols, such as methanol and ethanol, as well as mixtures of these alcohols with water. The application can take place on the side facing the negative electrode, the side facing the positive electrode or on both sides of the separator. Application can also take place during the extraction of the pore forming agent while in a solvent bath.

Certain embodiments of separators according to the present invention do not incorporate an additive such as a non-ionic surfactant or anionic surfactant. In other embodiments, an additive (such as a non-ionic surfactant, or an anionic surfactant) can be present at a density of at least 0.5 g/m², 1.0 g/m², 1.5 g/m², 2.0 g/m², 2.5 g/m², 3.0 g/m², 3.5 g/m², 4.0 g/m², 4.5 g/m², 5.0 g/m², 5.5 g/m², 6.0 g/m², 6.5 g/m², 7.0 g/m², 7.5 g/m², 8.0 g/m², 8.5 g/m², 9.0 g/m², 9.5 g/m², or 10.0 g/m². The additive can be present on the separator at a density between 0.5-10 g/m², 1.0-10.0 g/m², 1.5-10.0 g/m², 2.0-10.0 g/m², 2.5-10.0 g/m², 3.0-10.0 g/m², 3.5-10.0 g/m², 4.0-10.0 g/m², 4.5-10.0 g/m², 5.0-10.0 g/m², 5.5-10.0 g/m², 6.0-10.0 g/m², 6.5-10.0 g/m², 7.0-10.0 g/m², 7.5-10.0 g/m², 5.0-10.5 g/m², 5.0-11.0 g/m², 5.0-12.0 g/m², or 5.0-15.0 g/m².

The application may also take place by dipping the battery separator in the additive or a solution of the additive (solvent bath addition) and subsequently optionally removing the solvent, e.g. by drying. In this way the application of the additive can be combined for example with the extraction often applied during separator production. Other preferred methods are to spray the surface with additive or roller coat or curtain coat additives on the surface of separator.

Another preferred option is to mix the additive or additives into the mixture of thermoplastic polymer and optionally fillers and other agents or additives which is used to produce the battery separators. The additive-containing homogeneous mixture is then formed into a web-shaped material.

In certain embodiments, exemplary separators may contain one or more performance enhancing additives. The performance enhancing additive may be surfactants, wetting agents, colorants, antistatic additives, UV-protection additives, antioxidants, and/or the like, and any combination thereof.

Certain suitable surfactants are non-ionic while other suitable surfactants are anionic. The additive can be a single surfactant or a mixture of two or more surfactants, for instance two or more anionic surfactants, two or more non-ionic surfactants, or at least one ionic surfactant and at least one non-ionic surfactant. Selected suitable surfactants may have HLB values less than 6, preferably less than 3. The use of these certain suitable surfactants in conjunction with the inventive separators described herein can lead to even further improved separators that, when used in a lead acid battery, lead to reduced water loss, reduced antimony poisoning, improved cycling, reduced float current, reduced float potential, and/or the like, or any combination thereof for that lead acid batteries. Suitable surfactants include surfactants such as salts of alkyl sulfates; alkylarylsulfonate salts; alkylphenol-alkylene oxide addition products; soaps; alkyl-naphthalene-sulfonate salts; one or more sulfo-succinates, such as an anionic sulfo-succinate; dialkyl esters of sulfo-succinate salts; amino compounds (primary, secondary or tertiary amines; quaternary amines; block copolymers of ethylene oxide and propylene oxide; various polyethylene oxides; and salts of mono and dialkyl phosphate esters. The additive can include a non-ionic surfactant such as polyol fatty acid esters, polyethoxylated esters, polyethoxylated alcohols, alkyl polysaccharides such as alkyl polyglycosides and blends thereof, amine ethoxylates, sorbitan fatty acid ester ethoxylates, organosilicone based surfactants, ethylene vinyl acetate terpolymers, ethoxylated alkyl aryl phosphate esters and sucrose esters of fatty acids.

In certain embodiments described herein, a reduced amount of, or even very little to no anionic or non-ionic surfactant is added to the inventive separator. In such instances, the ER of the inventive separator may be slightly higher than an inventive separator comprising more of the anionic or non-ionic surfactant; however, the combination of the lower ER versus known separators combined with the desirable feature of lowered total organic carbons (because of the lower amount of surfactant) may produce a desirable inventive separator according to such embodiment.

In certain embodiments, the additive can be represented by a compound of Formula (I)

in which:
R is a non-aromatic hydrocarbon radical with 10 to 4200 carbon atoms, preferably 13 to 4200, which can be interrupted by oxygen atoms;
$R^1$=H, —$(CH_2)_k COOM^{x+}{}_{1/x}$ or —$(CH_2)_k$—$SO_3M^{x+}{}_{1/x}$, preferably H, where k=1 or 2;
M is an alkali metal or alkaline-earth metal ion, $H^+$ or $NH_4^+$, where not all the variables M simultaneously have the meaning $H^+$;
n=0 or 1;
m=0 or an integer from 10 to 1400; and
x=1 or 2.

The ratio of oxygen atoms to carbon atoms in the compound according to Formula (I) being in the range from 1:1.5 to 1:30 and m and n not being able to simultaneously be 0. However, preferably only one of the variables n and m is different from 0.

By non-aromatic hydrocarbon radicals is meant radicals which contain no aromatic groups or which themselves represent one. The hydrocarbon radicals can be interrupted by oxygen atoms, i.e. contain one or more ether groups.

R is preferably a straight-chain or branched aliphatic hydrocarbon radical which can be interrupted by oxygen atoms. Saturated, uncross-linked hydrocarbon radicals are quite particularly preferred.

Through the use of the compounds of Formula (I) for the production of battery separators, they can be effectively protected against oxidative destruction.

Battery separators are preferred which contain a compound according to Formula (I) in which:
R is a hydrocarbon radical with 10 to 180, preferably 12 to 75 and quite particularly preferably 14 to 40 carbon atoms, which can be interrupted by 1 to 60, preferably 1 to 20 and quite particularly preferably 1 to 8 oxygen atoms, particularly preferably a hydrocarbon radical of formula $R^2$—$[(OC_2H_4)p(OC_3H_6)_q]$—, in which:
$R^2$ is an alkyl radical with 10 to 30 carbon atoms, preferably 12 to 25, particularly preferably 14 to 20 carbon atoms;
P is an integer from 0 to 30, preferably 0 to 10, particularly preferably 0 to 4; and
q is an integer from 0 to 30, preferably 0 to 10, particularly preferably 0 to 4;
compounds being particularly preferred in which the sum of p and q is 0 to 10, in particular 0 to 4;
n=1; and
m=0.

Formula $R^2-[(OC_2H_4)_p(OC_3H_6)_q]-$ is to be understood as also including those compounds in which the sequence of the groups in square brackets differs from that shown. For example according to the invention compounds are suitable in which the radical in brackets is formed by alternating $(OC_2H_4)$ and $(OC_3H_6)$ groups.

Additives in which $R^2$ is a straight-chain or branched alkyl radical with 10 to 20, preferably 14 to 18 carbon atoms have proved to be particularly advantageous. $OC_2H_4$ preferably stands for $OCH_2CH_2$, $OC_3H_6$ for $OCH(CH_3)_2$ and/or $OCH_2CH_2CH_3$.

As preferred additives there may be mentioned in particular alcohols (p=q=0; m=0) primary alcohols being particularly preferred, fatty alcohol ethoxylates (p=1 to 4, q=0), fatty alcohol propoxylates (p=0; q=1 to 4) and fatty alcohol alkoxylates (p=1 to 2; q=1 to 4) ethoxylates of primary alcohols being preferred. The fatty alcohol alkoxylates are for example accessible through reaction of the corresponding alcohols with ethylene oxide or propylene oxide.

Additives of the type m=0 which are not, or only difficulty, soluble in water and sulphuric acid have proved to be particularly advantageous.

Also preferred are additives which contain a compound according to Formula (I), in which:

R is an alkane radical with 20 to 4200, preferably 50 to 750 and quite particularly preferably 80 to 225 carbon atoms;

M is an alkali metal or alkaline-earth metal ion, $H^+$ or $NH_4^+$, in particular an alkali metal ion such as $Li^+$, $Na^+$ and $K^+$ or $H^+$, where not all the variables M simultaneously have the meaning $H^+$;

n=0;

m is an integer from 10 to 1400; and x=1 or 2.

In certain embodiments, suitable additives may include, in particular, polyacrylic acids, polymethacrylic acids and acrylic acid-methacrylic acid copolymers, whose acid groups are at least partly neutralized, such as by preferably 40%, and particularly preferably by 80%. The percentage refers to the number of acid groups. Quite particularly preferred are poly(meth)acrylic acids which are present entirely in the salt form. Suitable salts include Li, Na, K, Rb, Be, Mg, Ca, Sr, Zn, and ammonium ($NR_4$, wherein R is either hydrogen or a carbon functional group). Poly(meth) acrylic acids may include polyacrylic acids, polymethacrylic acids, and acrylic acid-methacrylic acid copolymers. Poly (meth)acrylic acids are preferred and in particular polyacrylic acids with an average molar mass $M_w$ of 1,000 to 100,000 g/mol, particularly preferably 1,000 to 15,000 g/mol and quite particularly preferably 1,000 to 4,000 g/mol. The molecular weight of the poly(meth)acrylic acid polymers and copolymers is ascertained by measuring the viscosity of a 1% aqueous solution, neutralized with sodium hydroxide solution, of the polymer (Fikentscher's constant).

Also suitable are copolymers of (meth)acrylic acid, in particular copolymers which, besides (meth)acrylic acid contain ethylene, maleic acid, methyl acrylate, ethyl acrylate, butyl acrylate and/or ethylhexyl acrylate as comonomer. Copolymers are preferred which contain at least 40% by weight and preferably at least 80% by weight (meth) acrylic acid monomer; the percentages being based on the acid form of the monomers or polymers.

To neutralize the polyacrylic acid polymers and copolymers, alkali metal and alkaline-earth metal hydroxides such as potassium hydroxide and in particular sodium hydroxide are particularly suitable. In addition, a coating and/or additive to enhance the separator may include, for example, a metal alkoxide, wherein the metal may be, by way of example only (not intended to be limiting), Zn, Na, or Al, by way of example only, sodium ethoxide.

The microporous polyolefin can be provided in various ways with the additive or additives. The additives can for example be applied to the polyolefin when it is finished (i.e. after the extraction) or added to the mixture used to produce the polyolefin. According to a preferred embodiment the additive or a solution of the additive is applied to the surface of the polyolefin. This variant is suitable in particular for the application of non-thermostable additives and additives which are soluble in the solvent used for the subsequent extraction. Particularly suitable as solvents for the additives according to the invention are low-molecular-weight alcohols, such as methanol and ethanol, as well as mixtures of these alcohols with water. The application can take place on the side facing the negative electrode, the side facing the positive electrode or on both sides of the separator.

In some embodiments, the microporous polyolefin porous membrane may include a coating on one or both sides of such layer. Such a coating may include a surfactant or other material. In some embodiments, the coating may include one or more materials described, for example, in U.S. Patent Publication No. 2012/0094183, which is incorporated by reference herein. Such a coating may, for example, reduce the overcharge voltage of the battery system, thereby extending battery life with less grid corrosion and preventing dry out and/or water loss.

Diffusion

Figure 27:
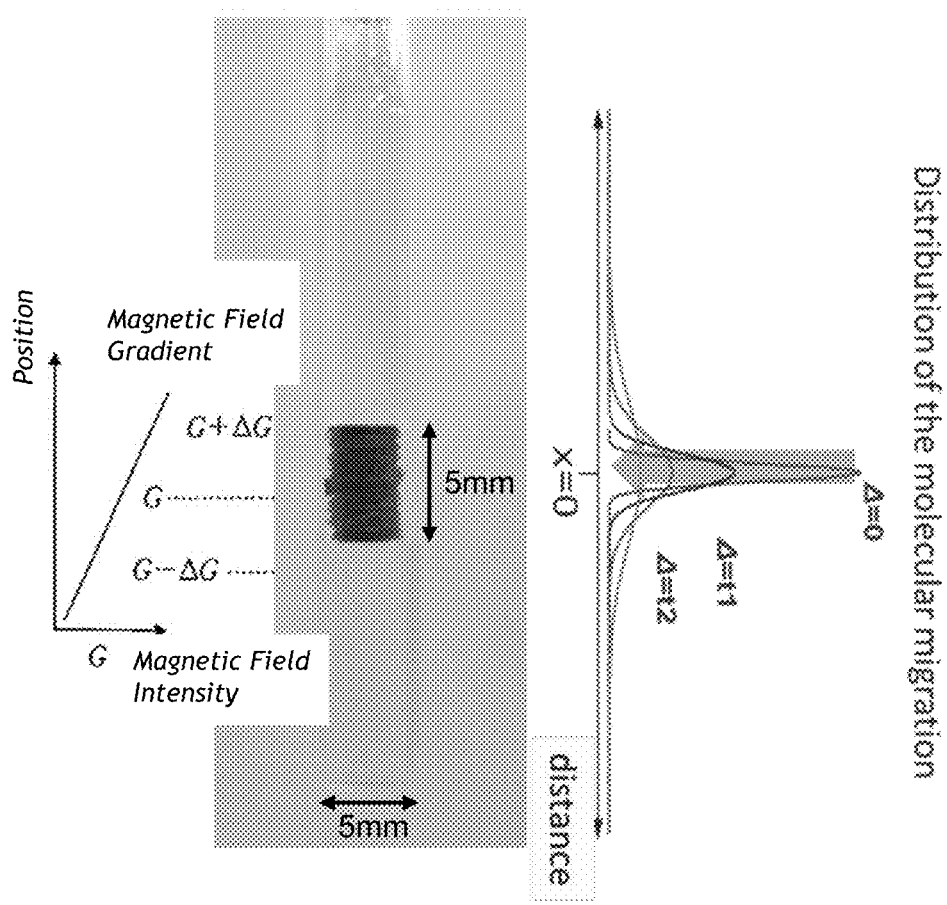
FIG. 27 shows a Nuclear Magnetic Resonance ("NMR") tube with separator samples submerged in $D_2O$.

In certain select embodiments, exemplary separators may be defined as having a higher diffusion rate. The diffusion rate may be measured as the rate at which an ion is able to pass through a separator, thus describing the ionic flow rate through a separator. It is believed that the higher the porosity of a separator, the higher the diffusion coefficient. $D_2O$ diffusion may be analyzed using Pulsed Field Gradient Spin Echo ("PFGSE"). To determine the diffusion coefficient, separator samples are pre-soaked in $D_2O$ with the oil having not been extracted from the separator samples. The separator samples are stacked in a Nuclear Magnetic Resonance ("NMR") tube submerged in $D_2O$ as generally shown in FIG. 27. The NMR tube is placed under a vacuum to remove any air bubbles, and the diffusion coefficient in the vertical direction (through the separator samples) is monitored.

The diffusion may be calculated using the Stejskal Equation, below:

$$E(\delta, g, \Delta) = \ln \frac{E}{E_0} = -\gamma^2 g^2 \delta^2 D(\Delta - \delta/3)$$

where,

E: NMR signal peak intensity
γ: magnetic spin ratio (depends upon nuclides)
g: magnetic field gradient
δ: applying time of field gradient and, $$D_e = \varepsilon/\tau \times D_0$$

where, $D_e$: diffusion coefficient of a molecule inside the separator
$D_0$: diffusion coefficient of a molecule in solution
ε: porosity
τ: index of pore tortuosity.

Table 1, below, shows various diffusion coefficient values at −10° C. and 30° C., for a control separator, an inventive embodiment, and 4 commercially available separators at Δ=20 ms.

TABLE 1

| Sample | −10° C. | 30° C. |
|---|---|---|
| Control Separator | $1.7 \times 10^{-10}$ | $9.1 \times 10^{-10}$ |
| Inventive Embodiment | $1.6 \times 10^{-10}$ | $8.8 \times 10^{-10}$ |
| Commercial Separator #1 | $1.7 \times 10^{-10}$ | $9.0 \times 10^{-10}$ |
| Commercial Separator #2 | $1.8 \times 10^{-10}$ | $9.0 \times 10^{-10}$ |
| Commercial Separator #3 | $2.1 \times 10^{-10}$ | $1.1 \times 10^{-10}$ |
| Commercial Separator #4 | $1.6 \times 10^{-10}$ | $8.6 \times 10^{-10}$ |

Figure 28:
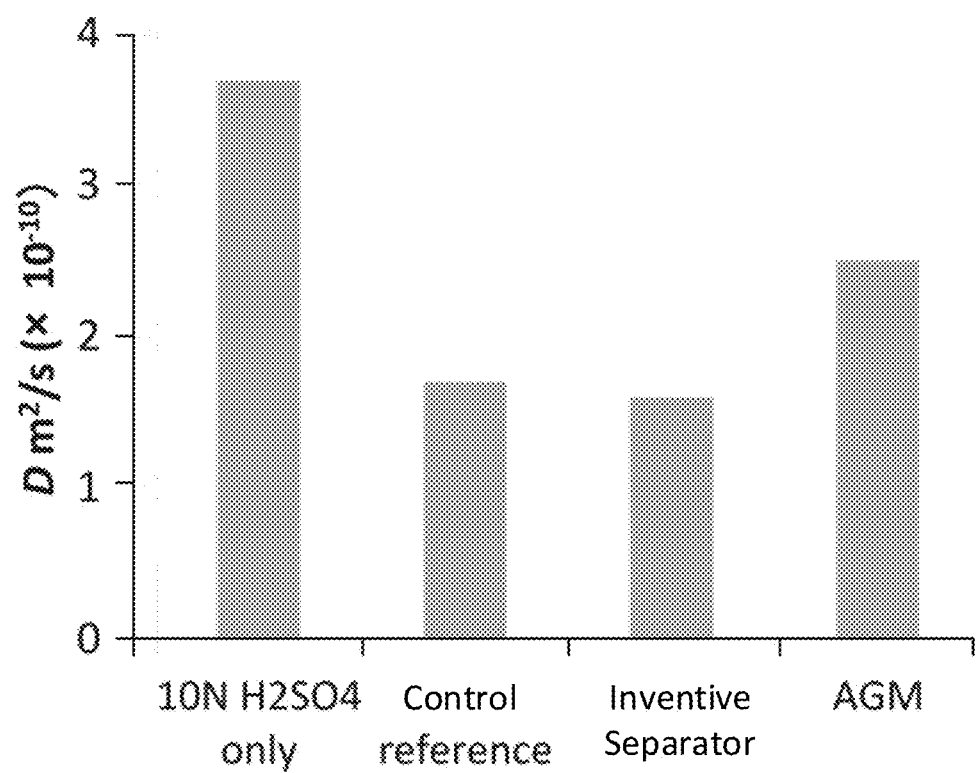
FIG. 28 shows the diffusion coefficients at $-10°$ C. at $\Delta=20$ ms for a solution of $H_2SO_4$ only, a reference separator, an inventive embodiment separator, and an AGM separator.

FIG. 28 shows the diffusion coefficients at −10° C. at Δ=20 ms for a solution of $H_2SO_4$ only, a reference separator, an inventive embodiment separator, and an AGM separator.

Figure 29A:
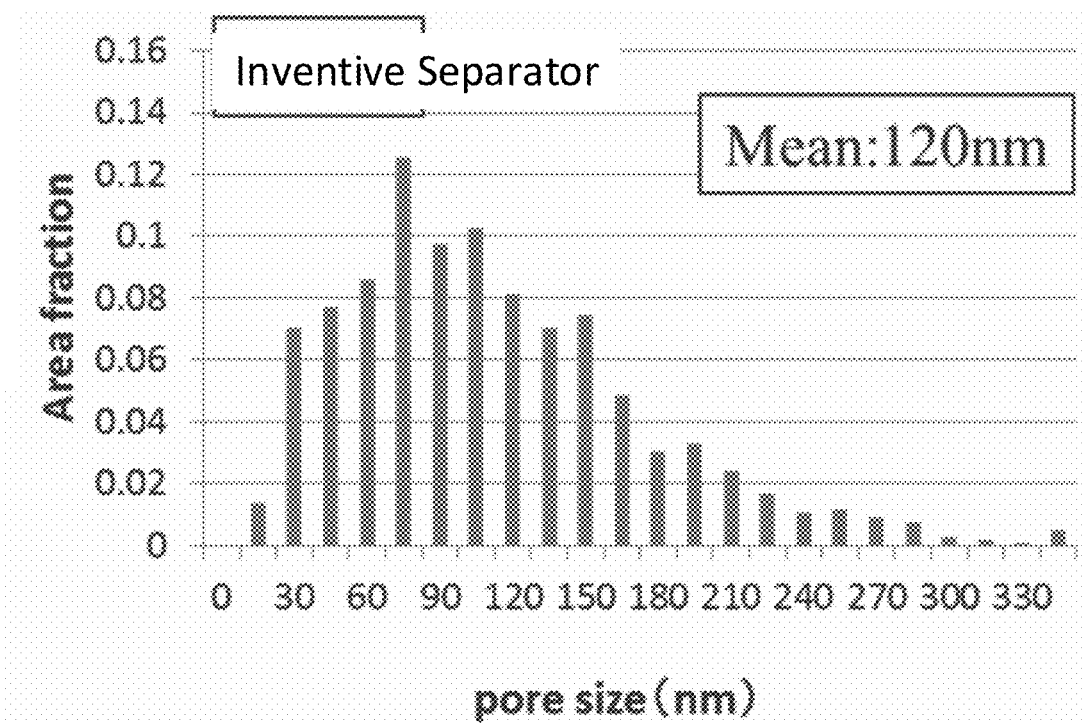
FIGS. 29A and 29B illustrate a pore size distribution of an inventive embodiment compared to that of a commercially available separator.
Figure 29B:
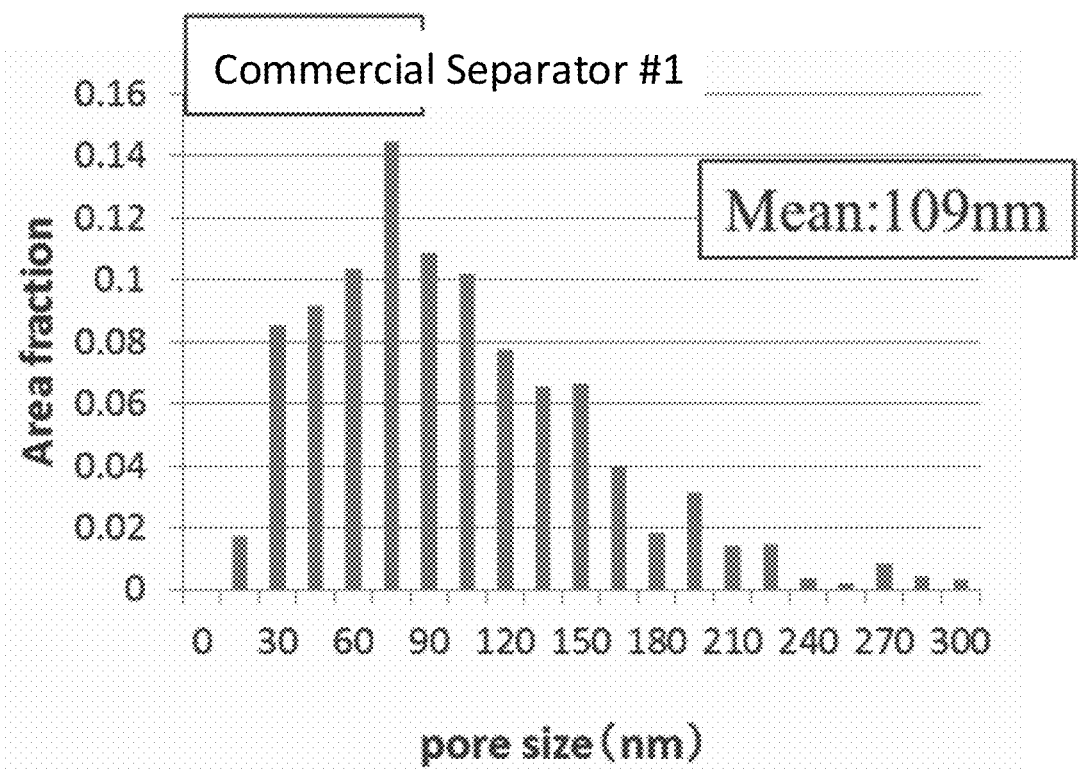

FIG. 29 illustrates a pore size distribution of an inventive embodiment compared to the commercially available separator #1. This shows that the inventive embodiment has a mean pore size of 120 nm, while the commercially available separator has a mean pore size of only 109 nm.

Figure 30:
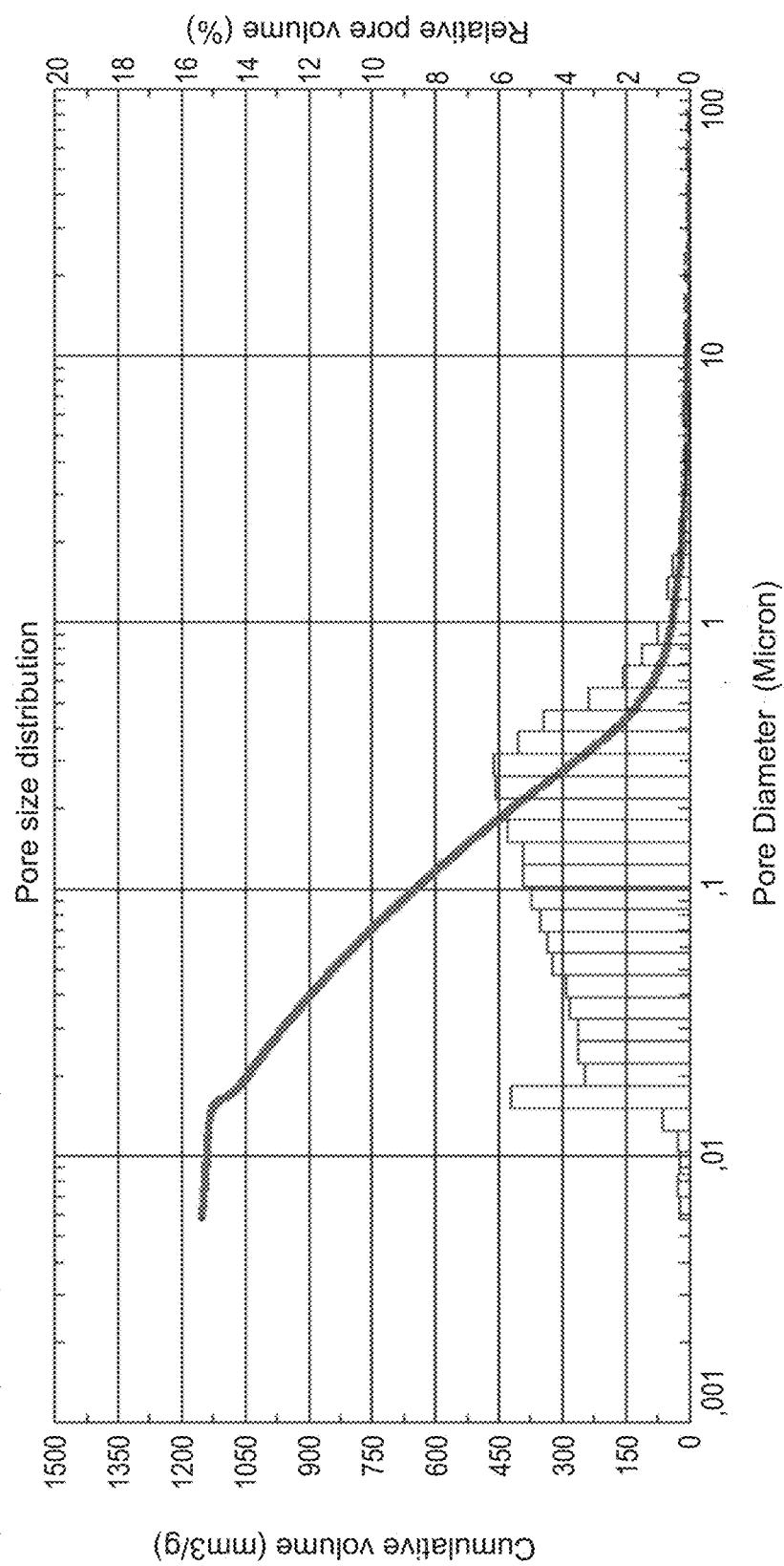
FIG. 30 depicts the pore diameter distribution of an inventive embodiment separator.
Figure 31:
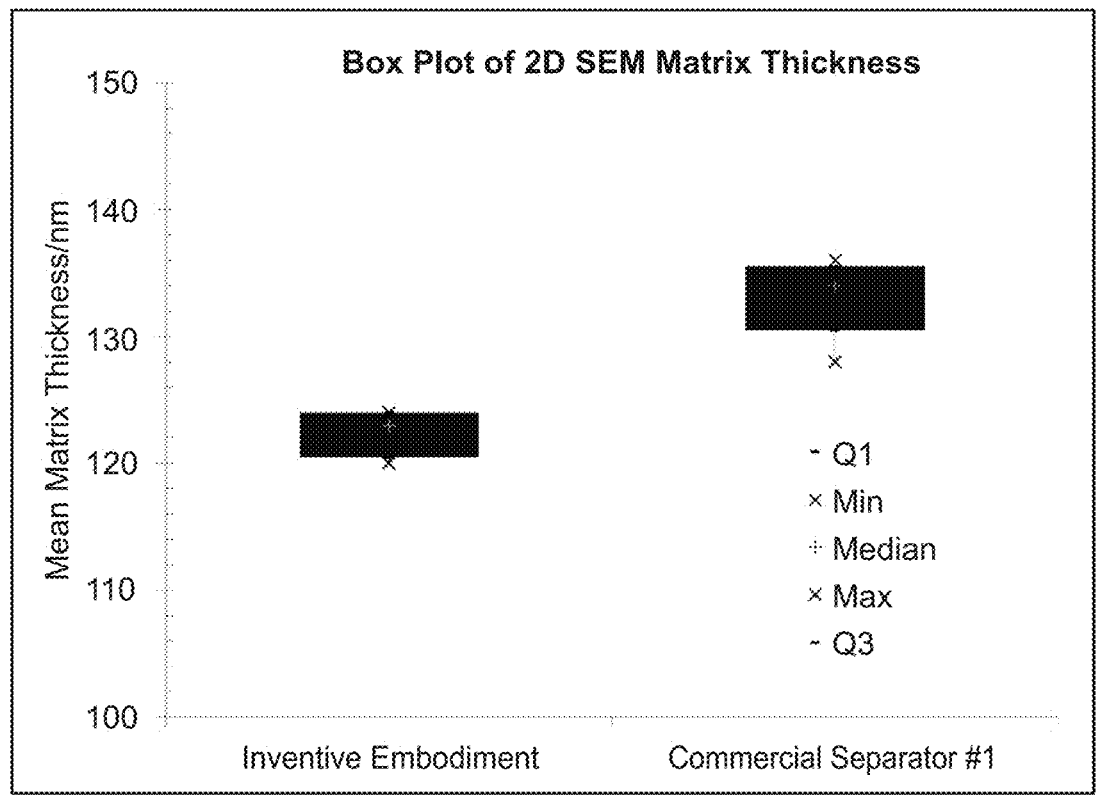
FIG. 31 is a chart that describes the dispersion of a new silica filler within an inventive embodiment separator and a standard silica within a commercially available separator.

FIG. 30 depicts the pore diameter distribution of an inventive embodiment separator. FIG. 31 illustrates a chart that describes the dispersion of a new silica filler within an inventive embodiment separator and a standard silica within a commercially separator #1. Where the box plot represents the distribution between the $25^{th}$ percentile (Q1) and the $75^{th}$ percentile ($Q_3$). In this chart, the lower the values, the better the silica distribution.

Friability

In certain select embodiments, exemplary separators may utilize a silica with a higher friability as compared to that used in commercially available separators. Silica with a high friability is believed to increase the dispersibility of the silica within the separator, which in turn allows for more oil to penetrate the separator during formation, and, upon oil extraction, leads to a better distribution of pores within the separator. Lower primary silica particle size is believed to result in greater particle aggregation, which leads to increased oil absorption. This leads to a lower average pore size and high pore volume with a low and narrow particle size distribution. A possibly preferred embodiment has a high silica modulus ($SiO_2/Na_2O$) and a greater concentration of sodium silicate during silica processing.

Figure 32A:
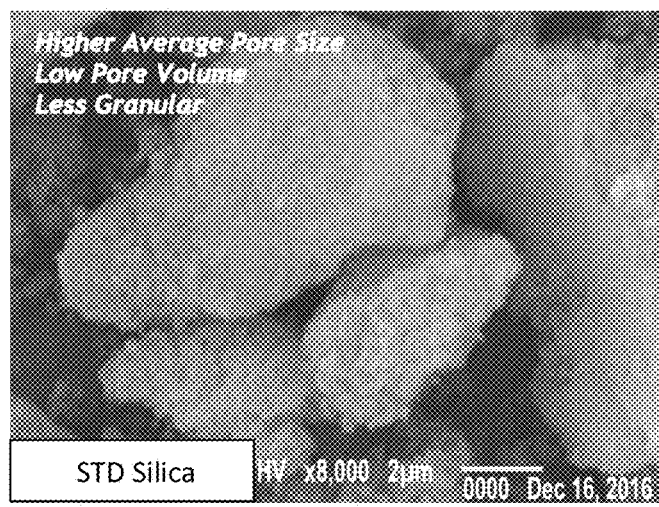
FIGS. 32A and 32B depict the size of a standard silica with that of a silica used in an inventive embodiment of the present invention.
Figure 32B:
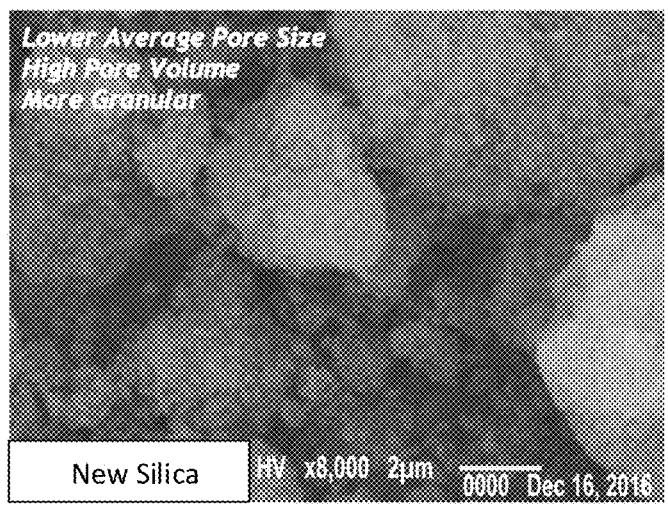
Figure 33:
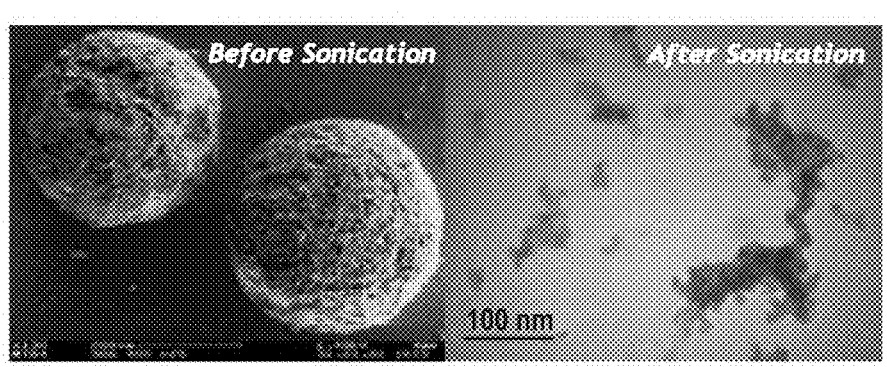
FIG. 33 shows the size of a new silica before and after sonication.

FIG. 32 depicts the size of a standard silica with that of a silica used in an inventive embodiment of the present invention. As can be seen, the new silica possesses a lower particle size. One way to determine the friability of the silica is to subject the silica to an ultrasonic frequency (over 20 kHz). FIG. 33 shows the silica size before and after sonication, and FIG. 34 depicts the particle size distribution of the new silica and standard silica before sonication and after 30 seconds and 60 seconds of sonication.

Exemplary separators in accordance with the present disclosure also show superior shrinkage values in $H_2SO_4$. Table 2, below, shows these values.

TABLE 2

| Sample | Average | Minimum | Maximum | Standard Deviation |
|---|---|---|---|---|
| Sample #1 | −1.4% | −2.1% | −0.6% | 0.3 |
| Sample #2 | −1.2% | −1.6% | −0.7% | 0.2 |

EXAMPLES

The following examples further illustrate at least selected separator embodiments of the instant invention.

In certain embodiments, the following precipitated silicas can be employed to obtain separators according to the invention:

Median particle size 20.48 μm, mean particle size, 24.87 μm (as measured using Coulter LS230)

Silica samples shown below in Table 3 having the following characteristics were employed in the preparation of separators:

TABLE 3

| | Oil Absorption ml/100 g | Surface Area $m^2/g$ | Tap Density g/l |
|---|---|---|---|
| Silica A | 225 | 180 | 170 |
| Silica B | 275 | 180 | 140 |

Polyethylene separators made using the above silica had the following properties shown below in Tables 4 and 5:

TABLE 4

| Product Properties | Unit | Separator 1 | Separator 2 |
|---|---|---|---|
| Backweb thickness | mm | 0.250 | 0.250 |
| Silica type | | Silica A | Silica B |
| Si/PE ratio | | 2.6:1 | 2.6:1 |
| Starting oil content | % | 64.0 | 67.0 |
| Final oil content | % | 15.5 | 16.5 |
| Basis weight | $g/m^2$ | 161 | 157 |
| Puncture resistance | N | 14.1 | 13.1 |
| Porosity | % | 61.5 | 65.1 |
| Wettability | Sec | 49 | 29 |
| ER 10 min boil | $m\Omega \cdot cm^2$ | 49 | 40 |
| ER 20 min soak | $m\Omega \cdot cm^2$ | 65 | 50 |
| Elongation - MD | % | 23 | 25 |
| Elongation - CMD | % | 430 | 484 |
| Perox 20 hrs | % | 388 | 350 |
| Perox 40 hrs | % | 333 | 283 |
| Acid shrinkage | % | −0.9 | −0.8 |
| Hg-Pore Size | μm | 0.099 | 0.126 |

TABLE 5

| Product Properties | Unit | Separator 3 (Corresponds to Example 3 in Table 9 Below) | Separator 4 | Separator 5 | Separator 6 |
|---|---|---|---|---|---|
| Profile | | Ribbed PE, greater than 12 major ribs, lower rib height | Ribbed PE, greater than 12 major ribs, lower rib height | Ribbed PE, fewer than 12 major ribs, higher rib height | Ribbed PE, fewer than 12 major ribs, higher rib height |

TABLE 5-continued

| Product Properties | Unit | Separator 3 (Corresponds to Example 3 in Table 9 Below) | Separator 4 | Separator 5 | Separator 6 |
|---|---|---|---|---|---|
| Backweb thickness | μm | 250 | 250 | 250 | 250 |
| Silica type | | B | A | B | A |
| Si/PE ratio | | 2.6:1 | 2.6:1 | 2.6:1 | 2.6:1 |
| Starting oil content | % | 67 | 64 | 67 | 64 |
| Final oil content | % | 16.0 | 16.3 | 15.0 | 16.7 |
| Coating | | NI (non-ionic) Surfactant | None | NI (non-ionic) Surfactant | None |
| Porosity | % | 63.8 | 61.7 | 64.4 | 60.6 |
| Electrical Resistance | mΩ·cm² | 42 | 50 | 45 | 62 |
| 20 minute soak ER | mΩ·cm² | 43 | 55 | 46 | 65 |
| Wettability | sec | 6 | 39 | 10 | 73 |
| Puncture Resistance | N | 12.9 | 14.7 | 12.2 | 13.9 |
| Elongation - CMD | % | 528 | 419 | 587 | 383 |
| Acid Shrinkage | % | −0.7 | −0.8 | −0.3 | −0.1 |

Additionally, in further embodiments, the following silica fillers, described below in Table 6, were employed in the separators described in Table 7, below:

TABLE 6

| | | Silica C | Silica D | Silica E | Silica F |
|---|---|---|---|---|---|
| Oil Absorption | ml/100 g | 245 | 215 | 270 | 210 |
| Surface Area | m²/g | 180 | 130 | 195 | 180 |
| Bulk Density | g/l | 100 | 125 | No data | No data |

TABLE 7

| | | Separator 7 | Separator 8 | Separator 9 | Separator 10 |
|---|---|---|---|---|---|
| Backweb Thickness | mm | 0.200 | 0.206 | 0.200 | 0.201 |
| Silica Type | | C | D | E | F |
| Si/PE ratio | | 2.6:1 | 2.6:1 | 2.6:1 | 2.6:1 |
| Starting oil content | % | 68.0 | 65.1 | 67.0 | 65.2 |

TABLE 7-continued

| | | Separator 7 | Separator 8 | Separator 9 | Separator 10 |
|---|---|---|---|---|---|
| Basis Weight | g/m² | 109.6 | 122.4 | 122.0 | 125.3 |
| Final oil content | % | 15.1 | 16.4 | 15.8 | 14.9 |
| Porosity | % | 65.9 | 63.6 | 65.7 | 63.4 |
| ER 10' Boil | mΩ·cm² | 36 | 46 | 33 | 48 |
| Wettability | sec | 2 | 2 | 4 | 3 |
| Elongation-CMD | % | 275 | 329 | 294 | 311 |
| Puncture Resistance | N | 12.4 | 13.0 | 10.8 | 13.9 |

Further Examples

In the following set of examples, inventive enhanced flooded separators were made according to various embodiments of the present invention and tested compared with a control separator. The results are shown just below in Table 8.

TABLE 8

| Property | Example A Enhanced Flooded Separator A | Control Separator A | Example B Enhanced Flooded Separator B | SPEC (BS-DA-961-4) |
|---|---|---|---|---|
| Profile | Ribbed PE, fewer than 12 major ribs | Ribbed PE, fewer than 12 major ribs | Ribbed PE, greater than 12 major ribs, lower rib height | — |
| Backweb thickness (mm) | 0.256 | 0.257 | 0.253 | 0.250 ± 0.040 |
| Puncture resistance (N) | 12.5 | 12.2 | — | Min. 10.0 |
| Total oil content (%) | 15.3 | 16.1 | 14.9 | 17.0 ± 3.0 |
| Backweb oil content (%) | 14.4 | 14.4 | — | Min. 8.0 |
| CMD elongation (%) | 530 (100%) | 482 (100%) | — | Min. 150 |
| Elongation after Perox 20 h (%) | 379 (72%) | 355 (74%) | — | Min. 100 |

TABLE 8-continued

| Property | Example A Enhanced Flooded Separator A | Control Separator A | Example B Enhanced Flooded Separator B | SPEC (BS-DA-961-4) |
|---|---|---|---|---|
| Elongation after Perox 40 h (%) | 165 (31%) | — | — | — |
| ER 10' boil (mΩ · cm$^2$) | 71 | 86 | 65 | Max. 140 |
| Wettability (sec) | 45 | 141 | 39 | — |
| Porosity (%) | 64.3 | 57.6 | 65.5 | 60.0 ± 7.5 |

The results above in Table 8 show that the separator of Example A exhibited almost 20% lower ER compared with the control separator A. Similarly, the separator of Example B exhibited more than 20% lower ER compared with the control separator A. These desirable lower ER results occurred despite the fact that the porosity percentages for the inventive separators A and B were within the tolerances (60%+/−7.5%) for the porosity of such a separator. Thus, the novel and unexpected pore structure of the separator contributed to the lowered ER combined with a porosity percentage for the separator that is in line with (not much more than) the porosity of a known separator.

Additional Examples

Several separators were formed according to the present invention. Those separators were compared to comparative separators. SEMs of the inventive separators were taken to image the shish-kebab formations of the inventive separators.

Example 1

In Example 1, an enhanced flooded separator having a backweb thickness of 250 μm was made according to the present invention using UHMWPE, silica, and oil, and the silica used was a high oil absorption silica. An SEM of the inventive, low ER separator, was taken, see FIG. 15A.

Figure 15A:
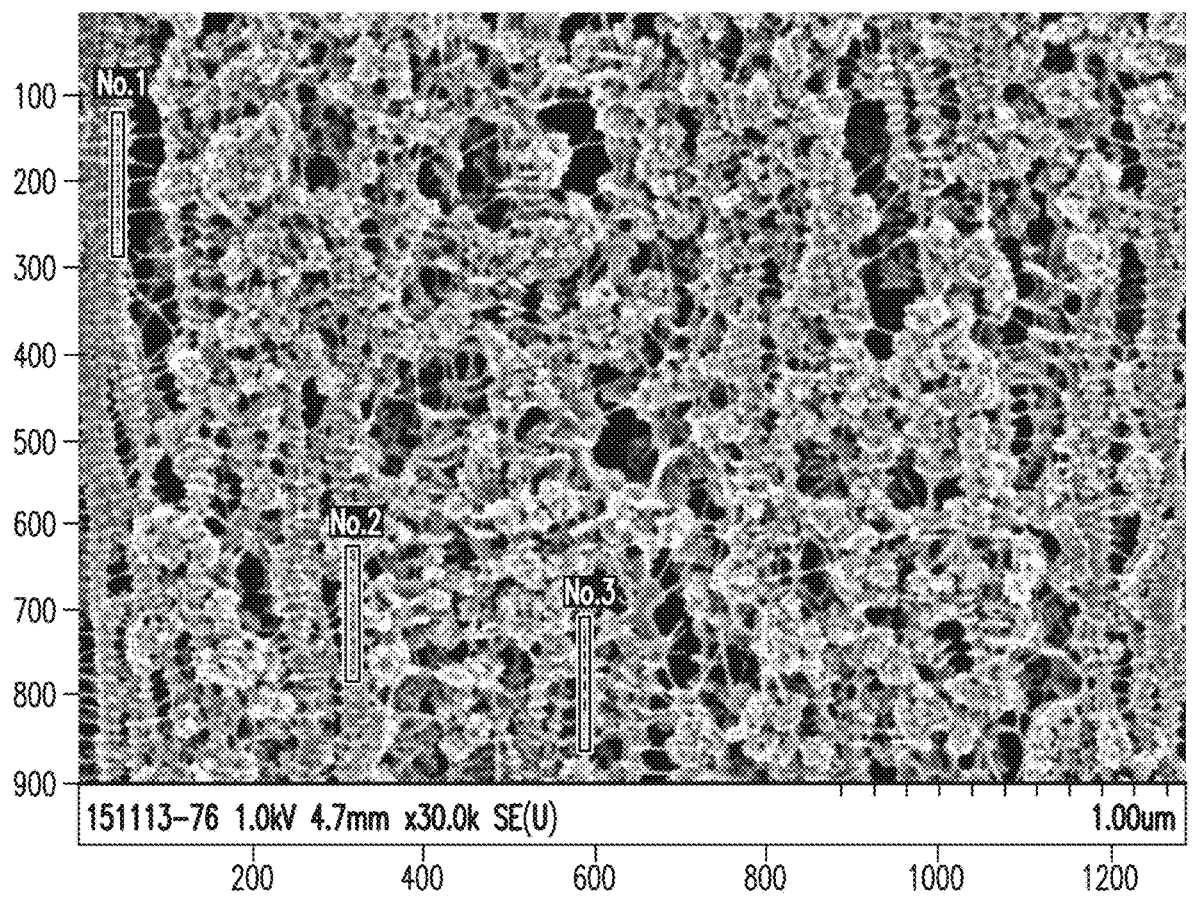
FIG. 15A includes an SEM of the inventive separator of Example 1.
Figure 15B:
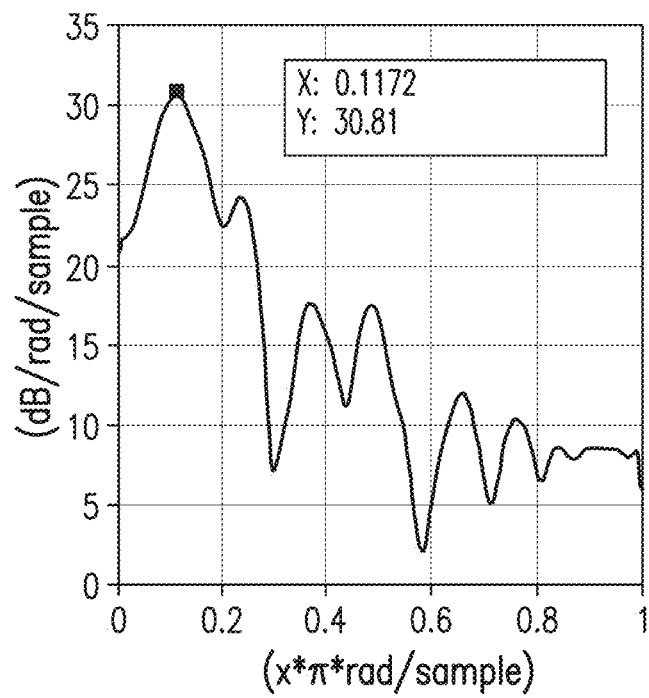
FIGS. 15B, 15C, and 15D include Welch Power Spectral Density Estimate graphs showing results from the FTIR spectral tests performed on the three shish-kebab regions (Nos. 1, 2, and 3), respectively, shown and marked in FIG. 15A, wherein the x-axis of the graphs in FIGS. 15B, 15C, and 15D is normalized frequency (x$\pi$rad/sample), and wherein the y-axis of those graphs=power/frequency (dB/rad/sample).
Figure 15C:
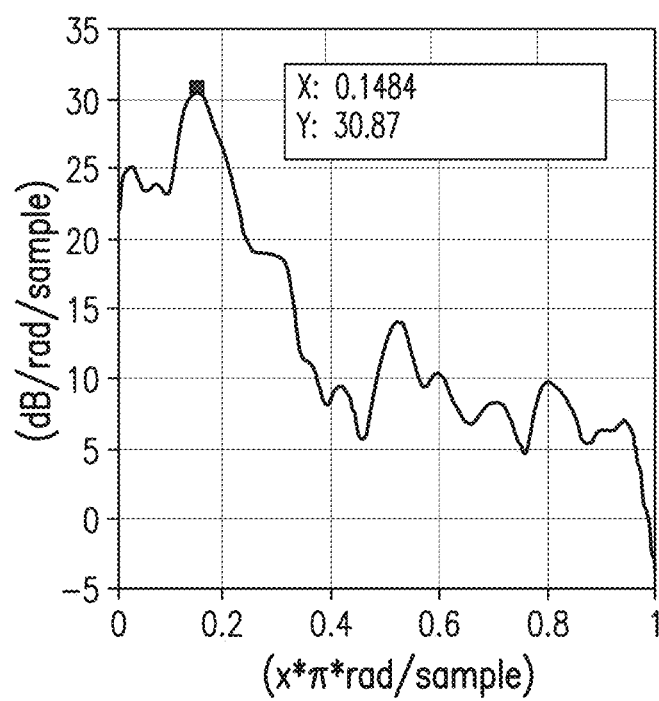
Figure 15D:
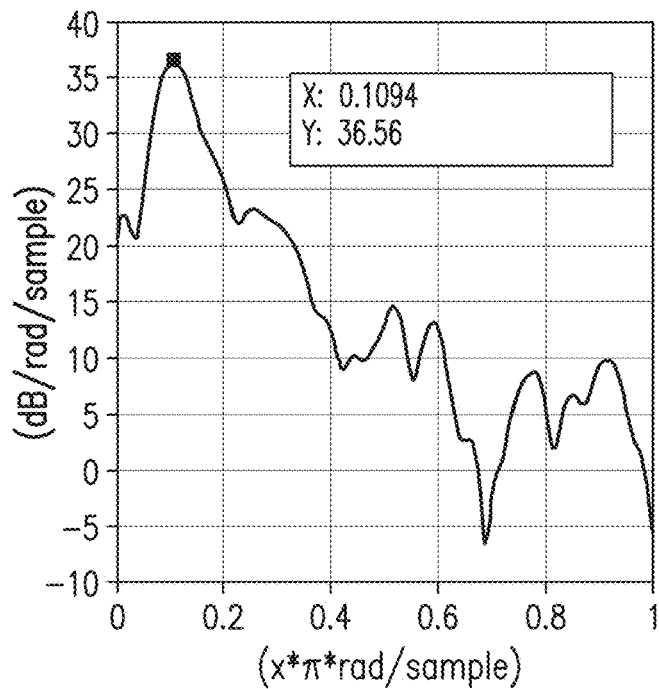

Three shish-kebab regions, numbered Nos. 1, 2 and 3 respectively, were identified on the SEM of FIG. 15A, the SEM of the separator of Example 1. Then, FTIR spectra profiles were taken of each of the three shish-kebab regions, see FIGS. 15B-15D. The FTIR spectra taken of each of the three shish-kebab regions (Nos. 1, 2, and 3) of the SEM of FIG. 15A of the separator of Example 1 revealed the following peak position information and periodicity or repetition of the shish-kebab formations or morphology, shown in Table 9, below.

TABLE 9

| | Shish-kebab region number | | |
|---|---|---|---|
| | No. 1 | No. 2 | No. 3 |
| Peak position | 0.1172 | 0.1484 | 0.1094 |
| Periodicity or repetition of the shish-kebab formation | 0.057 (57 nm) | 0.047 (47 nm) | 0.085 (85 nm) |

Ultimately, an average repetition or periodicity of the shish-kebab morphology or structure was obtained, of 63 nm.

Example 2

Further, for Example 2, an enhanced flooded separator having a backweb thickness of 200 μm was made according to the present invention, in the same manner as Example 1 above, using UHMWPE, silica, and oil, and the silica used was a high oil absorption silica. An SEM of the inventive, low ER separator, was taken, see FIG. 16A.

Figure 16A:
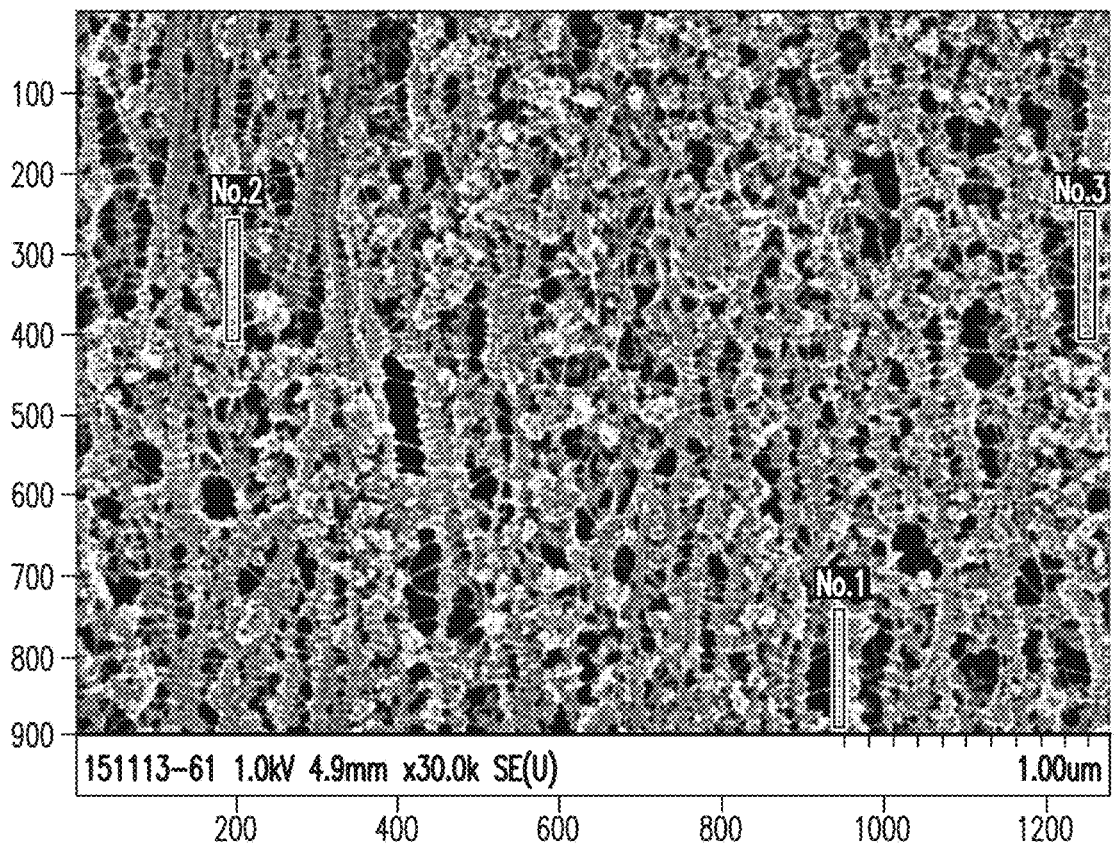
FIGS. 16A, 16B, 16C, and 16D are similar to FIGS. 15A-15D, respectively, but are representative of the inventive separator of Example 2.
Figure 16B:
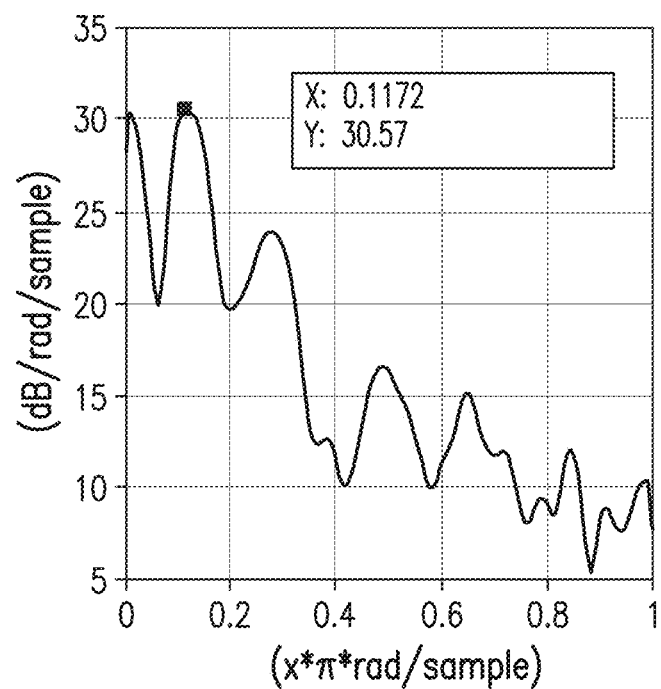
Figure 16C:
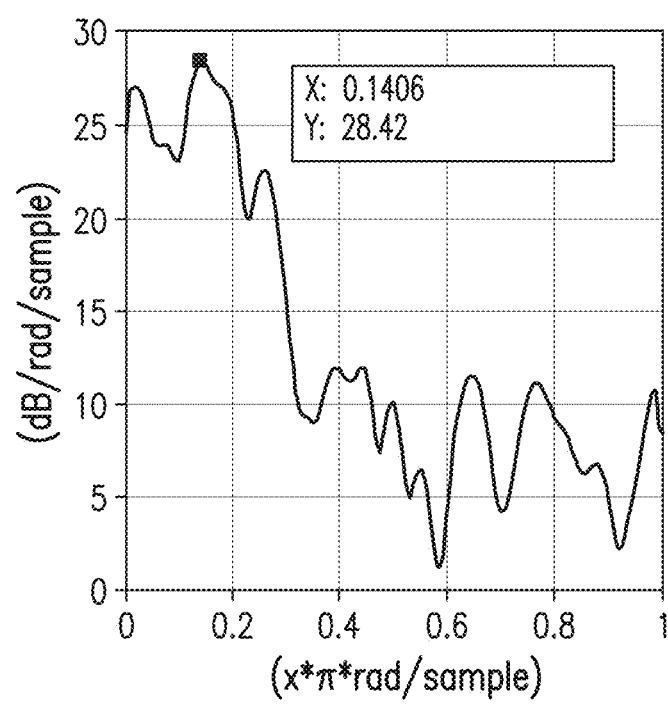
Figure 16D:
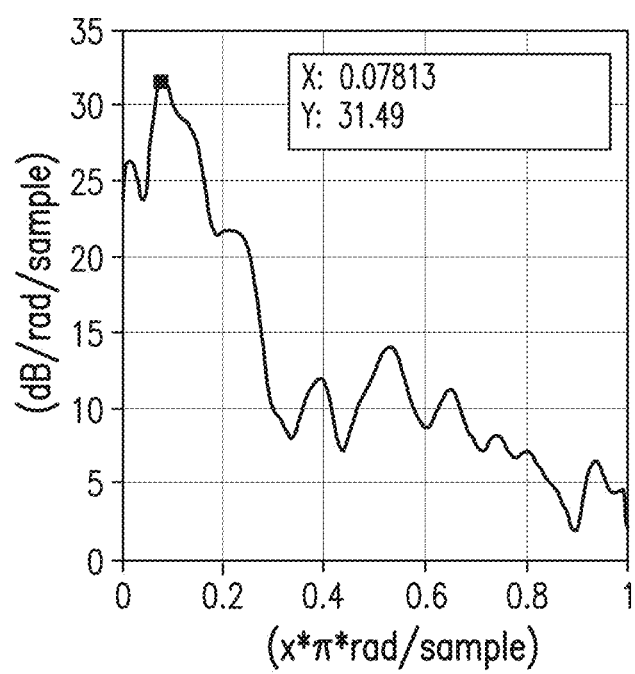

Three shish-kebab regions, numbered Nos. 1, 2 and 3 respectively, were identified on the SEM of FIG. 16A, the SEM of the separator of Example 2. Then, FTIR spectra profiles were taken of each of the three shish-kebab regions, see FIGS. 16B-16D. The FTIR spectra taken of each of the three shish-kebab regions (Nos. 1, 2, and 3) of the SEM of FIG. 16A of the separator of Example 2 revealed the following peak position information and periodicity or repetition of the shish-kebab formations or morphology, shown in Table 10 below.

TABLE 10

| | Shish-kebab region number | | |
|---|---|---|---|
| | No. 1 | No. 2 | No. 3 |
| Peak position | 0.1172 | 0.1406 | 0.07813 |
| Periodicity or repetition of the shish-kebab formation | 0.057 (57 nm) | 0.047 (47 nm) | 0.085 (85 nm) |

Ultimately, an average repetition or periodicity of the shish-kebab morphology or structure was obtained, of 63 nm.

Example 3

For Example 3, an enhanced flooded separator having a backweb thickness of 250 μm was made according to the present invention, in the same manner as Example 1 above, using UHMWPE, silica, and oil, and the silica used was a high oil absorption silica. An SEM of the inventive, low ER separator, was taken, see FIG. 17A.

Figure 17A:
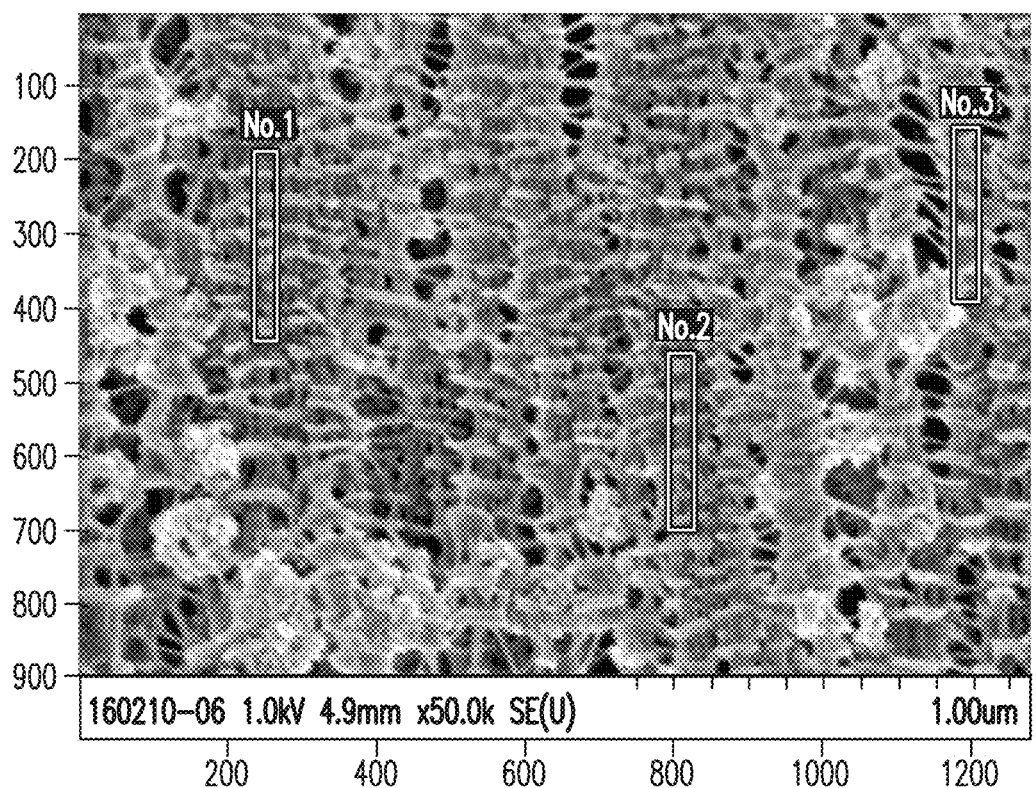
FIGS. 17A, 17B, 17C, and 17D are similar to FIGS. 15A-15D, respectively, but are representative of the inventive separator of Example 3.
Figure 17B:
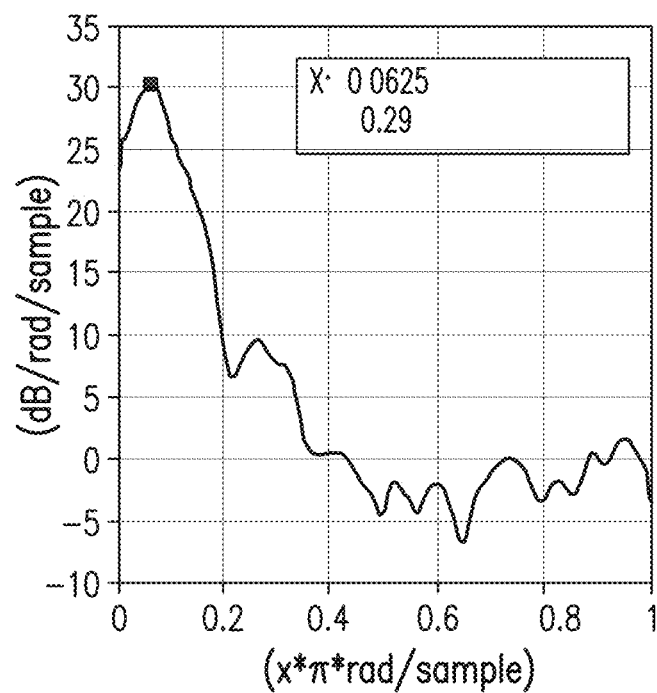
Figure 17C:
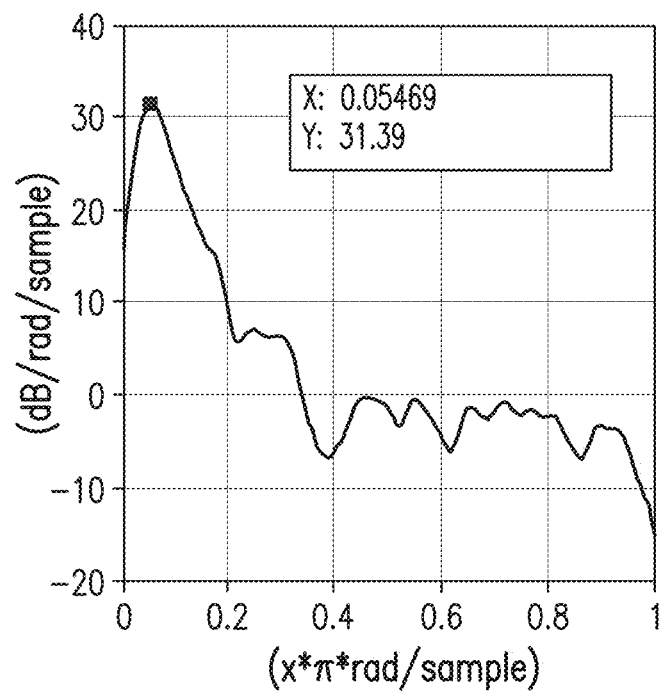
Figure 17D:
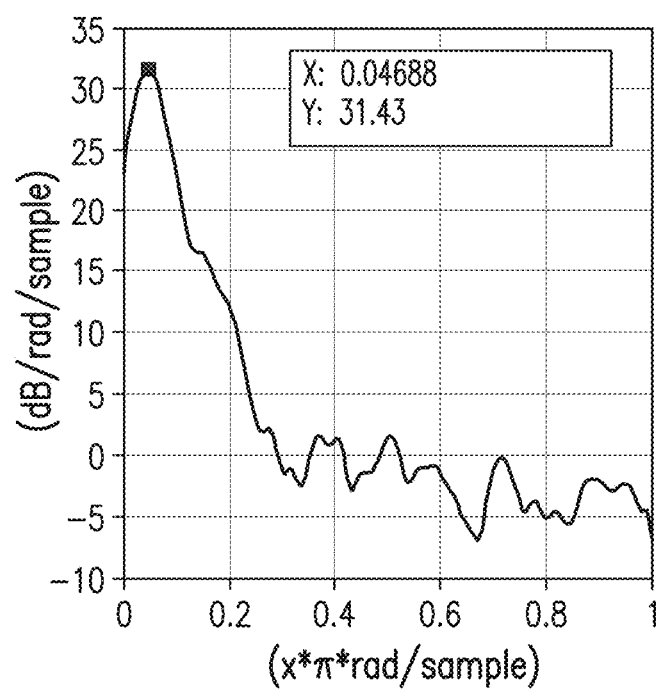

Three shish-kebab regions, numbered Nos. 1, 2 and 3 respectively, were identified on the SEM of FIG. 17A, the SEM of the separator of Example 3. Then, FTIR spectra profiles were taken of each of the three shish-kebab regions, see FIGS. 17B-17D. The FTIR spectra taken of each of the three shish-kebab regions (Nos. 1, 2, and 3) of the SEM of FIG. 17A of the separator of Example 3 revealed the following peak position information and periodicity or repetition of the shish-kebab formations or morphology, shown in Table 11 below.

TABLE 11

| | Shish-kebab region number | | |
|---|---|---|---|
| | No. 1 | No. 2 | No. 3 |
| Peak position | 0.0625 | 0.05469 | 0.04688 |
| Periodicity or repetition of the shish-kebab formation | 0.063 (63 nm) | 0.073 (73 nm) | 0.085 (85 nm) |

Ultimately, an average repetition or periodicity of the shish-kebab morphology or structure was obtained, of 74 nm.

Example 4

For Example 4, an enhanced flooded separator having a backweb thickness of 250 μm was made according to the present invention, in the same manner as Example 1 above, using UHMWPE, silica, and oil, and the silica used was a high oil absorption silica (a different high oil absorption silica from the silica used in Examples 1-3 above; each of the high oil absorption silicas used to make the separators of Examples 1-5 range from about 230 to about 280 ml/100 g). An SEM of the inventive, low ER separator, was taken, see FIG. 18A.

Figure 18A:
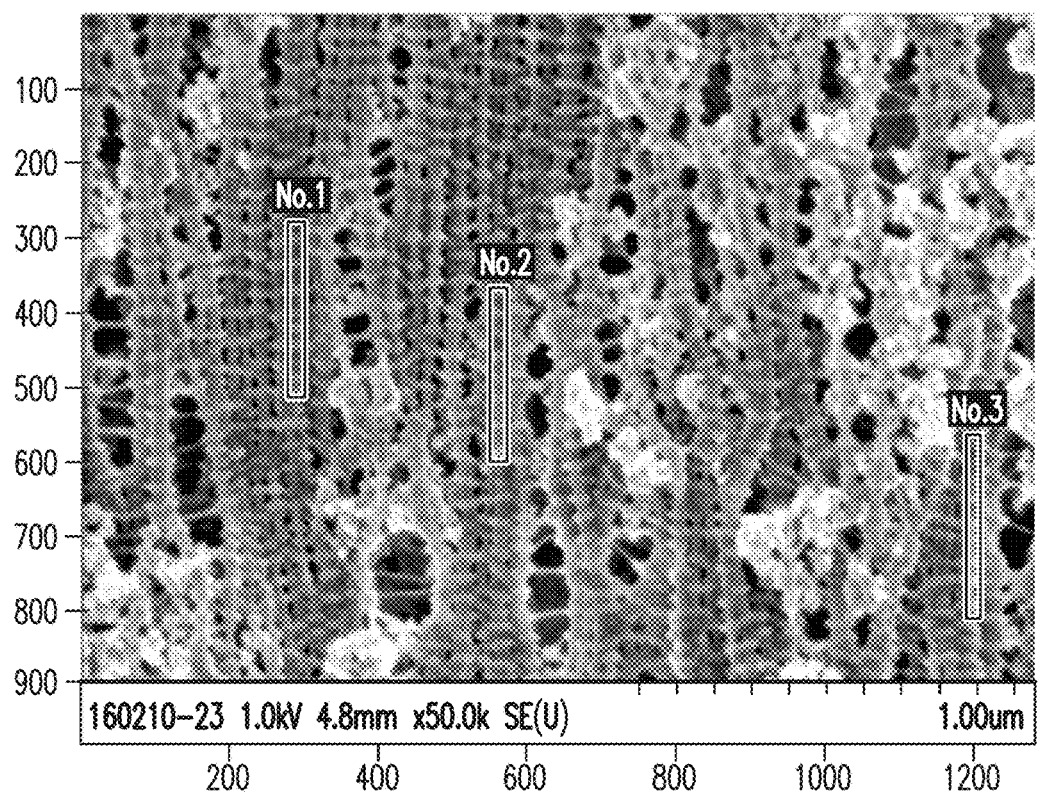
FIGS. 18A, 18B, 18C, and 18D are similar to FIGS. 15A-15D, respectively, but are representative of the inventive separator of Example 4.
Figure 18B:
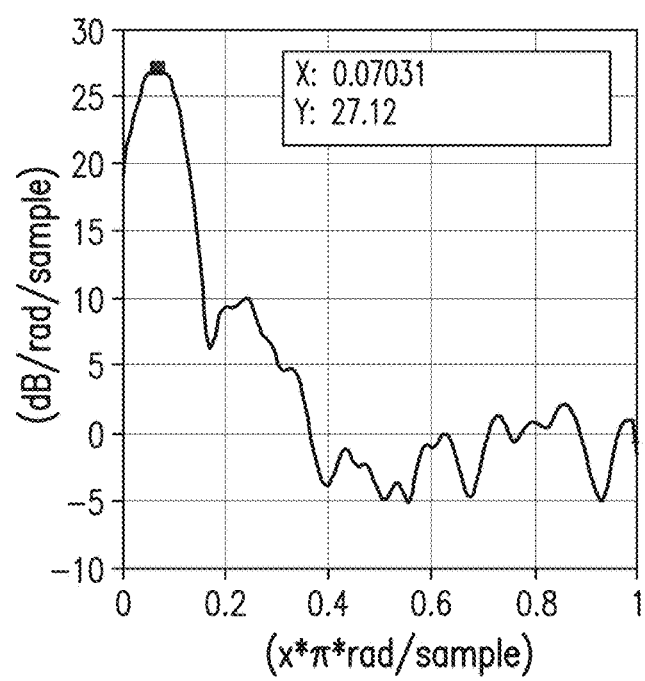
Figure 18C:
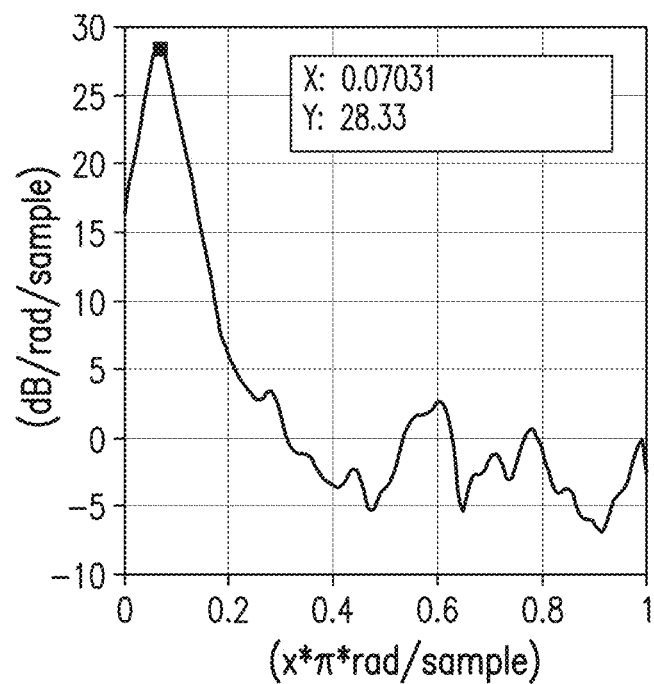
Figure 18D:
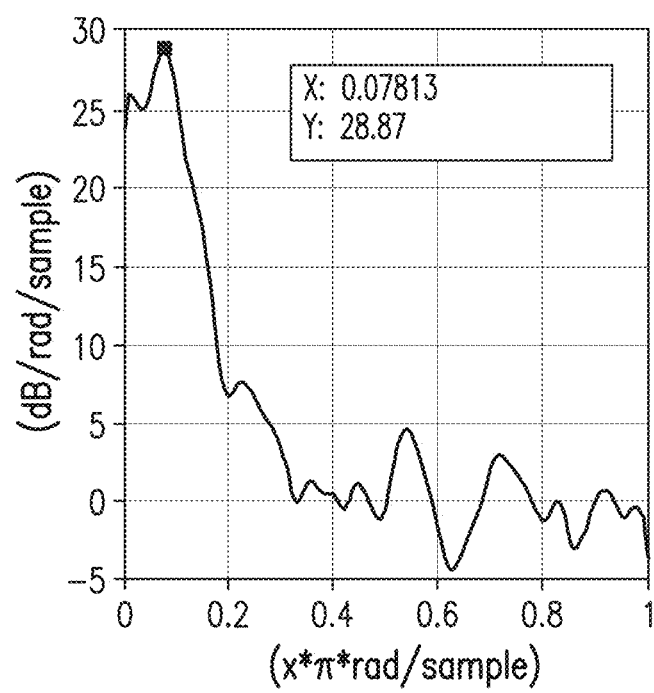

Three shish-kebab regions, numbered Nos. 1, 2 and 3 respectively, were identified on the SEM of FIG. 18A, the SEM of the separator of Example 4. Then, FTIR spectra profiles were taken of each of the three shish-kebab regions, see FIGS. 18B-18D. The FTIR spectra taken of each of the three shish-kebab regions (Nos. 1, 2, and 3) of the SEM of FIG. 18A of the separator of Example 4 revealed the following peak position information and periodicity or repetition of the shish-kebab formations or morphology, shown in Table 12 below.

TABLE 12

| | Shish-kebab region number | | |
|---|---|---|---|
| | No. 1 | No. 2 | No. 3 |
| Peak position | 0.07031 | 0.07031 | 0.07813 |
| Periodicity or repetition of the shish-kebab formation | 0.056 (56 nm) | 0.056 (56 nm) | 0.051 (51 nm) |

Ultimately, an average repetition or periodicity of the shish-kebab morphology or structure was obtained, of 55 nm.

Example 5

For this example, Example 5, an enhanced flooded separator having a backweb thickness of 250 μm was made according to the present invention, in the same manner as Example 1 above, using UHMWPE, silica, and oil, and the silica used was a high oil absorption silica (a different high oil absorption silica from the silica used in Examples 1-3 above and from the silica used in Example 4 above). An SEM of the inventive, low ER separator, was taken, see FIG. 19A.

Figure 19A:
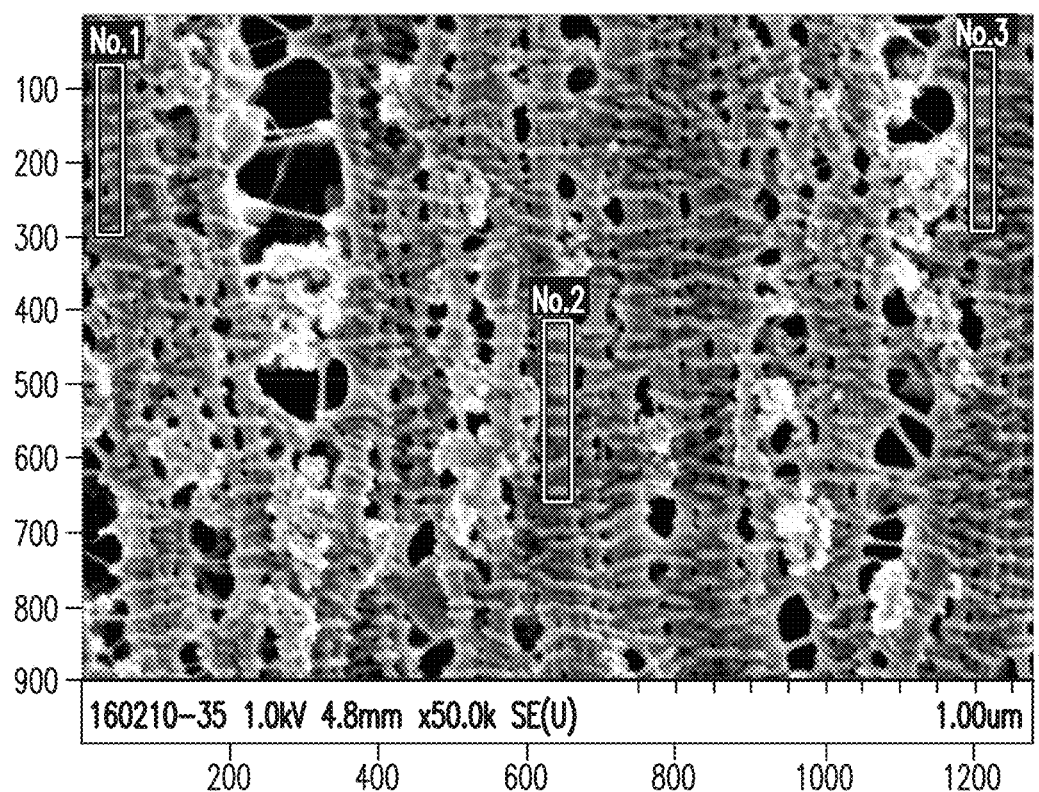
FIGS. 19A, 19B, 19C, and 19D are similar to FIGS. 15A-15D, respectively, but are representative of the inventive separator of Example 5.
Figure 19B:
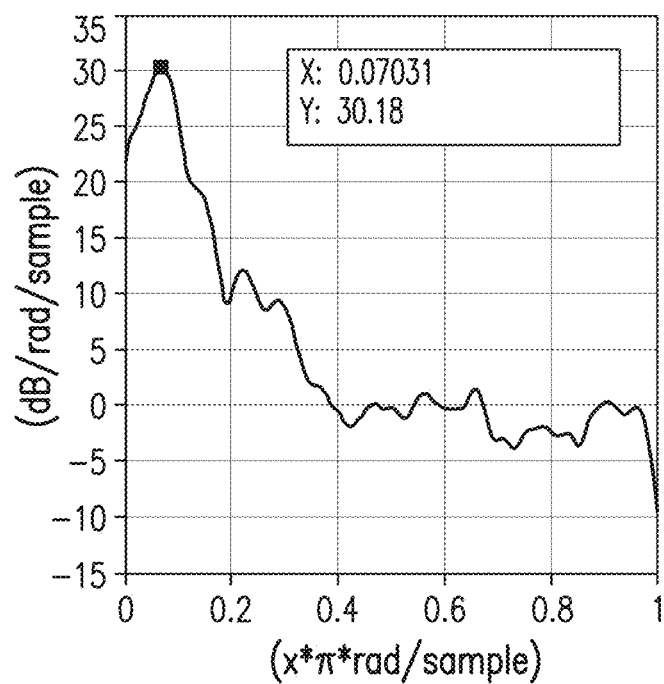
Figure 19C:
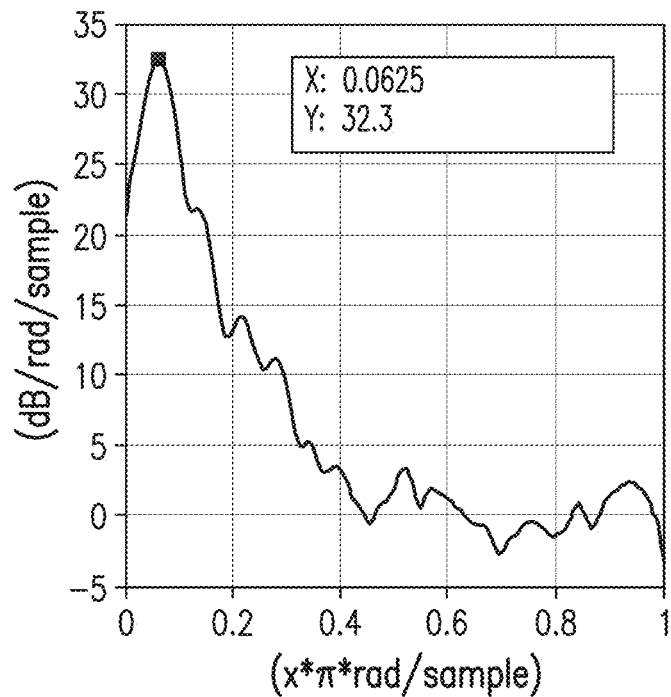
Figure 19D:
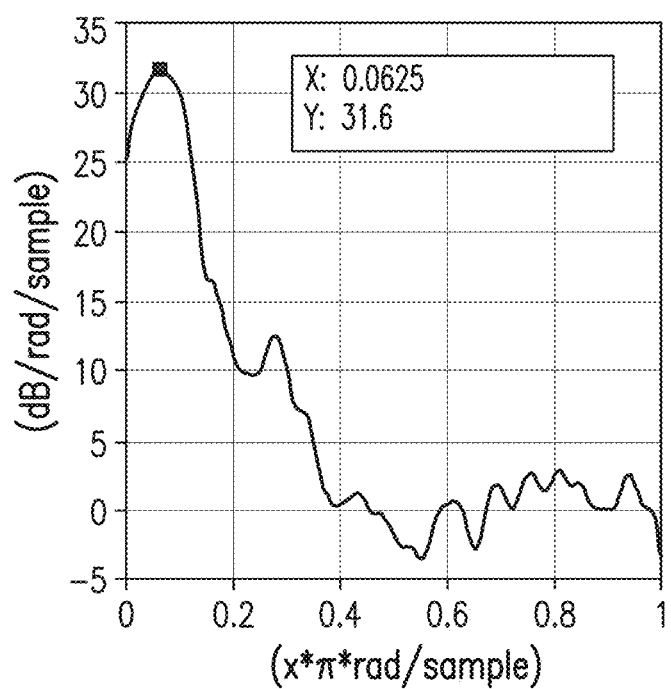

Three shish-kebab regions, numbered Nos. 1, 2 and 3 respectively, were identified on the SEM of FIG. 19A, the SEM of the separator of Example 5. Then, FTIR spectra profiles were taken of each of the three shish-kebab regions, see FIGS. 19B-19D. The FTIR spectra taken of each of the three shish-kebab regions (Nos. 1, 2, and 3) of the SEM of FIG. 19A of the separator of Example 5 revealed the following peak position information and periodicity or repetition of the shish-kebab formations or morphology, shown in Table 13 below.

TABLE 13

| | Shish-kebab region number | | |
|---|---|---|---|
| | No. 1 | No. 2 | No. 3 |
| Peak position | 0.07031 | 0.0625 | 0.0625 |
| Periodicity or repetition of the shish-kebab formation | 0.056 (56 nm) | 0.063 (63 nm) | 0.063 (63 nm) |

Ultimately, an average repetition or periodicity of the shish-kebab morphology or structure was obtained, of 61 nm.

Comparative Example 1

A comparative polyethylene lead acid battery separator was obtained, the separator having a backweb thickness of 250 μm. An SEM of the Comparative Example 1 separator was taken, see FIG. 20A.

Figure 20A:
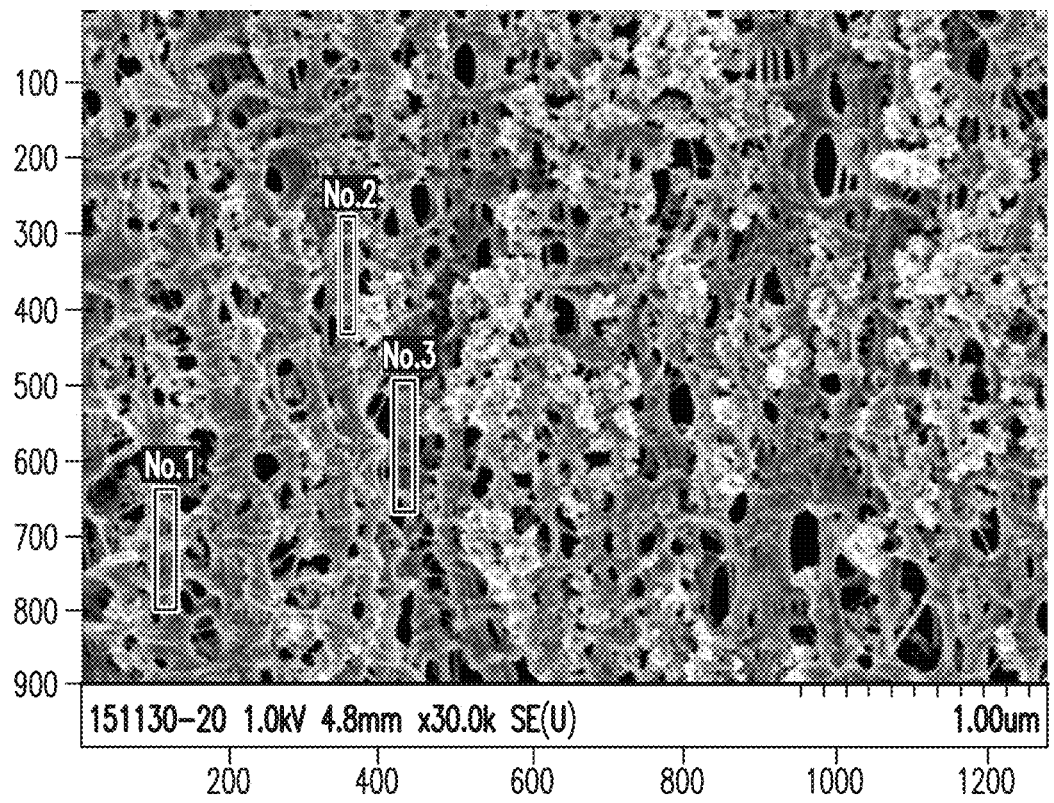
FIGS. 20A, 20B, 20C, and 20D are similar to FIGS. 15A-15D, respectively, but are representative of the separator of Comparative Example 1 (CE1).
Figure 20B:
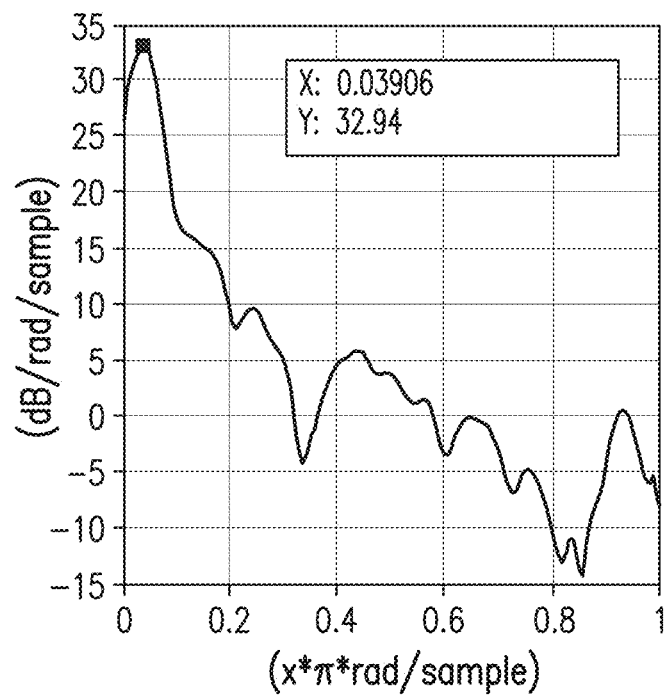
Figure 20C:
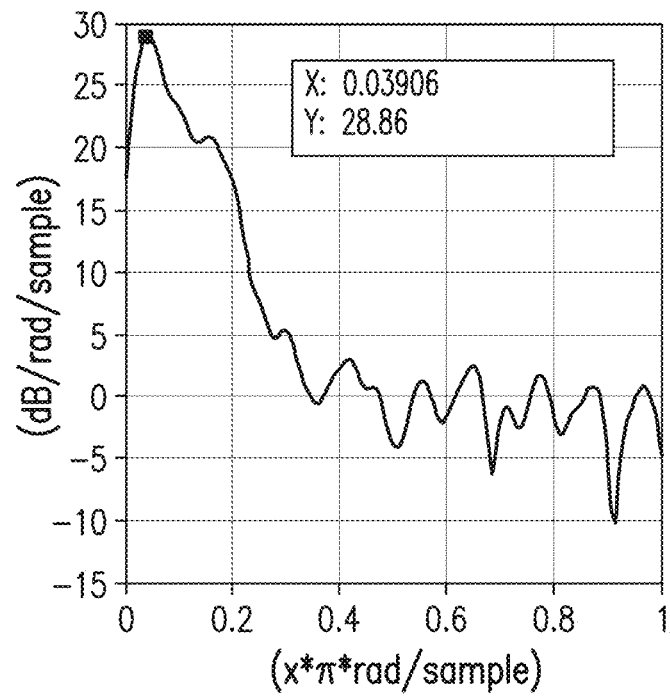
Figure 20D:
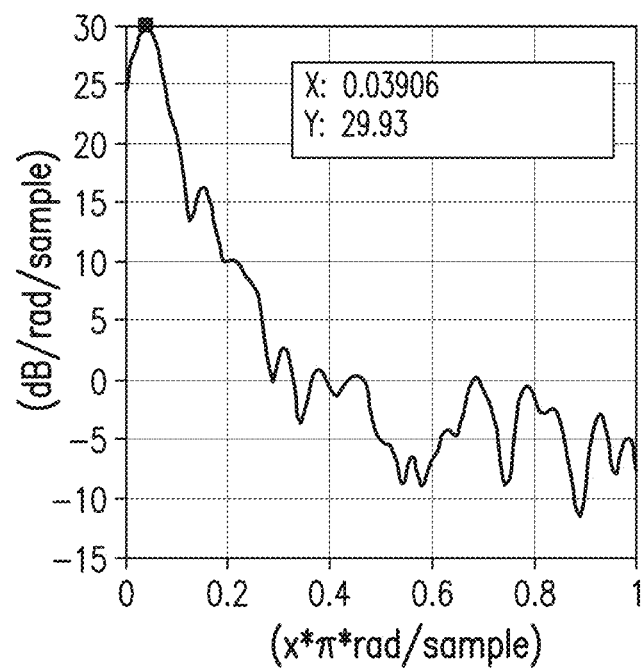

Three regions, numbered Nos. 1, 2 and 3 respectively, were identified on the SEM of FIG. 20A, the SEM of the separator of Comparative Example 1. Then, FTIR spectra profiles were taken of each of those three regions, see FIGS. 20B-20D. The FTIR spectra taken of each of the three numbered regions (Nos. 1, 2, and 3) of the SEM of FIG. 20A of the separator of Comparative Example 1 revealed the following peak position information and periodicity or repetition information regarding the crystalline structure and/or morphology of those three regions, shown in Table 14 below.

TABLE 14

| Region number | No. 1 | No. 2 | No. 3 |
|---|---|---|---|
| Peak position | 0.03906 | 0.03906 | 0.03906 |
| Periodicity or repetition of the crystalline structure of morphology of the region | 0.170 (170 nm) | 0.170 (170 nm) | 0.170 (170 nm) |

Ultimately, an average repetition or periodicity of the crystalline structure or morphology of the identified regions was obtained, of 170 nm.

Comparative Example 2

Another comparative polyethylene lead acid battery separator was obtained, the separator having a backweb thickness of 250 μm. An SEM of the Comparative Example 2 separator was taken, see FIG. 21A.

Figure 21A:
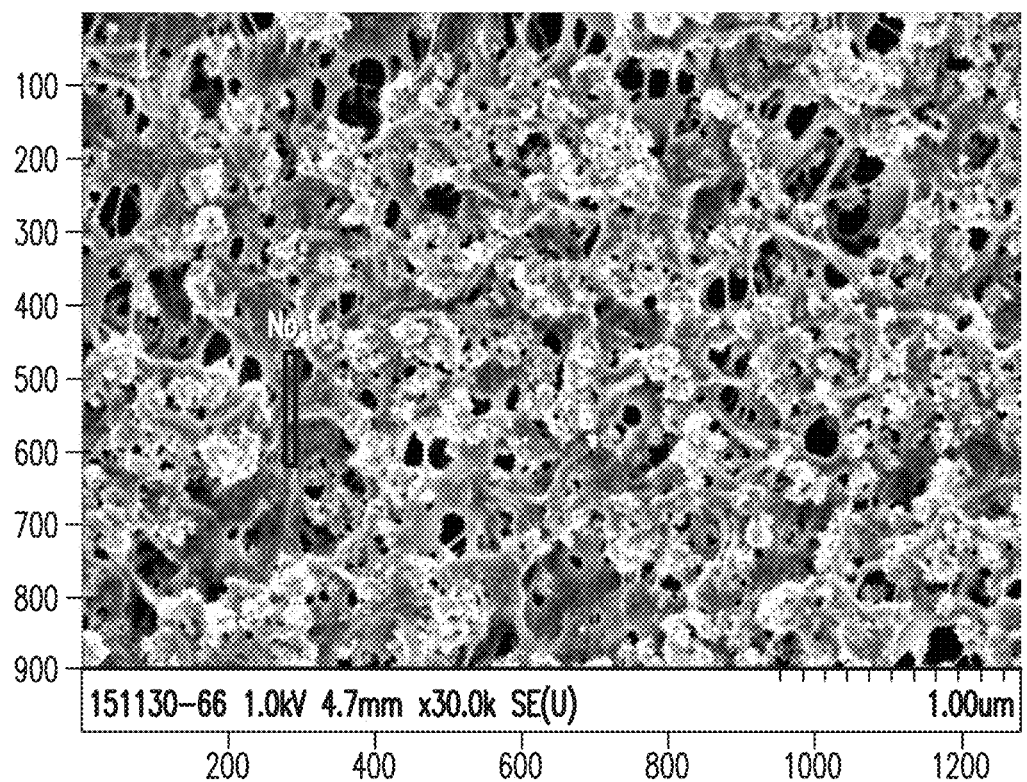
FIGS. 21A and 21B are similar to FIGS. 15A and 15B, respectively, but are representative of the separator of Comparative Example 2.
Figure 21B:
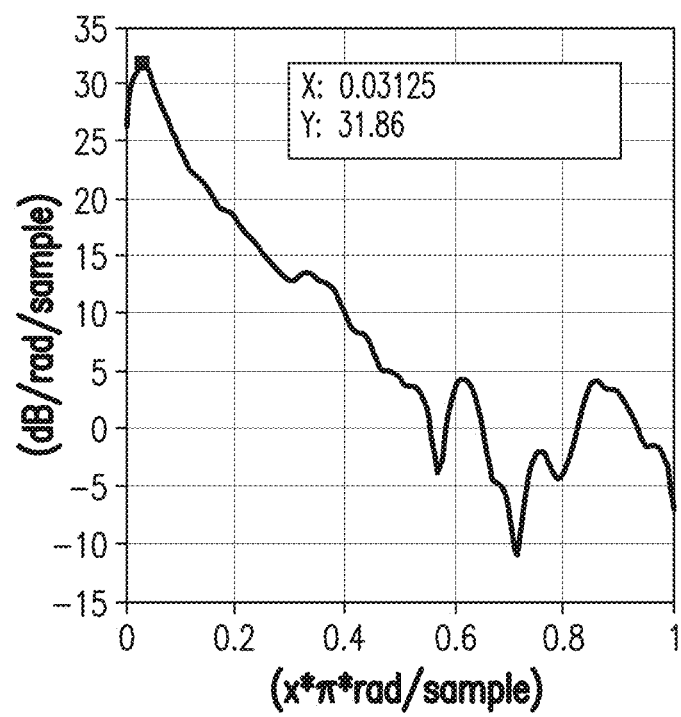

A region of the separator SEM image, numbered No. 1, was identified on the SEM of FIG. 21A, the SEM of the separator of Comparative Example 2. Then, an FTIR spectra profile was taken of that region, see FIG. 21B. The FTIR spectrum taken of the region (No. 1) of the SEM of FIG. 21A of the separator of Comparative Example 2 revealed the following peak position information and periodicity or repetition information regarding the crystalline structure and/or morphology of that region, shown in Table 15 below.

TABLE 15

| Region number | No. 1 |
|---|---|
| Peak position | 0.03125 |
| Periodicity or repetition of the crystalline structure of morphology of the region | 0.212 (212 nm) |

Thus, the repetition or periodicity of the crystalline structure or morphology of the identified region was 212 nm.

Comparative Example 3

Yet another comparative polyethylene lead acid battery separator was obtained, this one commercially available from Daramic, LLC. The separator had a backweb thickness of 250 μm. This separator was made similarly to the separators described in Examples 1-5 above, but the silica used to make this separator was not one with a high oil absorption value.

Figure 22:
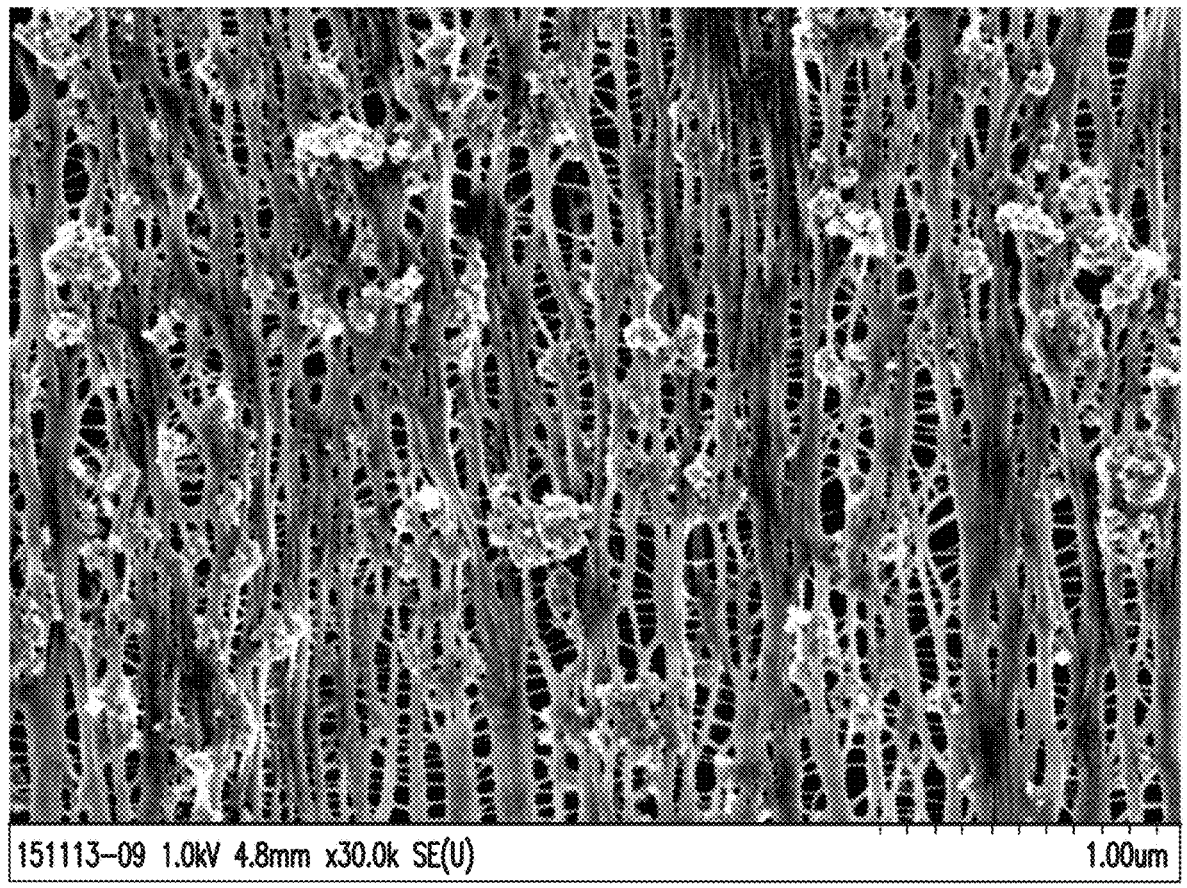
FIG. 22 is an SEM of the separator of Comparative Example 3.

An SEM of the Comparative Example 3 separator was taken, see FIG. 22. Observing FIG. 22, there were no shish-kebab formations which were continuously extending in the length of at least 0.5 μm or longer in this SEM image of the polyolefin microporous membrane. Therefore, no regions were marked on the SEM or further analyzed.

Table 16 below compares the results obtained for the periodicity or repetition of the shish-kebab regions of Examples 1-5 versus results obtained for Comparative Examples 1-3.

TABLE 16

| Region Number | Example | | | | | | | |
|---|---|---|---|---|---|---|---|---|
| | Ex. 1 | Ex. 2 | Ex. 3 | Ex. 4 | Ex. 5 | CE 1 | CE 2 | CE 3 |
| No. 1 | 57 nm | 57 nm | 63 nm | 56 nm | 56 nm | 170 nm | 212 nm | — |
| No. 2 | 47 nm | 47 nm | 73 nm | 56 nm | 63 nm | 170 nm | — | — |
| No. 3 | 85 nm | 85 nm | 85 nm | 51 nm | 64 nm | 170 nm | — | — |
| Average | 63 nm | 63 nm | 74 nm | 55 nm | 61 nm | 170 nm | 212 nm | — |

For Examples 1-5, the average repetition or periodicity of the shish-kebab formations and/or crystalline structures and/or morphologies was from 1 nm to 150 nm, preferably from 10 nm to 120 nm, and even more preferably from 20 nm to 100 nm. That type of structure was not observed for the separators of Comparative Examples 1-3.

Additional properties and features of the separators of Examples 1-2 and 4-5 are shown below in Table 17 (whereas Table 3 above includes properties of the separator of Example 3).

TABLE 17

| Product Properties | Unit | Example 1 | Example 2 | Example 4 | Example 5 |
|---|---|---|---|---|---|
| Profile | | Ribbed PE, greater than 12 major ribs, lower rib height | Ribbed PE, greater than 12 major ribs, lower rib height | Ribbed PE, fewer than 12 major ribs | Ribbed PE, fewer than 12 major ribs |
| Backweb thickness | μm | 250 | 200 | 250 | 250 |
| Final oil content | % | 17.1 | 14.3 | 17.0 | 11.3 |
| Porosity | % | 62.5 | 65.8 | 58.7 | 65.2 |
| Electrical Resistance | mΩ·cm$^2$ | 53 | 38 | 52 | 45 |
| 20 minute soak ER | mΩ·cm$^2$ | 57 | 36 | — | — |
| Puncture Resistance | N | 13.6 | 12.7 | 11.6 | 12.0 |
| Wettability | seconds | 25 | 8 | 6 | 6 |
| Elongation - CMD | % | 587 | 470 | 713 | 616 |
| Acid Shrinkage | % | −1.4 | −1.5 | −0.1 | −0.4 |

Solid State NMR Examples

For two separator samples, the ratio (Si—OH)/Si of silanol groups (Si—OH) to elemental silicon (Si) was measured using the $^{29}$Si solid-state NMR technique described in great detail above. A sample of the separator of Example 1 was prepared for this NMR testing as well as a sample of a comparative separator, Comparative Example 4, which was a commercially available polyethylene separator from Daramic, LLC, having a 250 μm backweb thickness, made with the same type of polyethylene polymer and silica as the separator described above as Comparative Example 3.

Figure 23A:
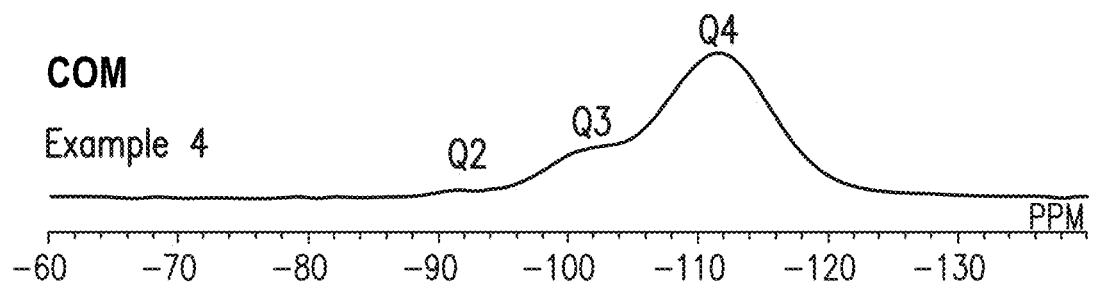
FIGS. 23A and 23B include $^{29}$Si-NMR spectra for Comparative Example 4 (FIG. 23A) and Example 1 (FIG. 23B), respectively.
Figure 23B:
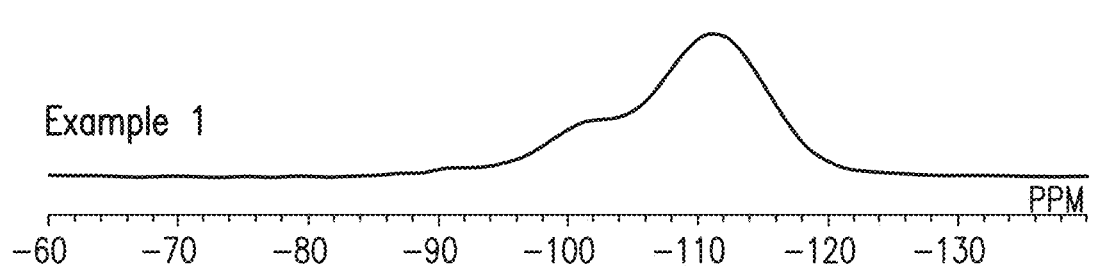

A $^{29}$Si-NMR spectrum of each sample was obtained, and these spectra are included as FIG. 23. The $Q_2$ signal was observed at ca. −93 ppm, while the $Q_3$ signal was observed at ca. −103 ppm, and the $Q_4$ signal was observed at ca. −111 ppm. Each component peak was deconvoluted as shown in FIG. 24, and the $Q_2$:$Q_3$:$Q_4$ molecular ratios were calculated using that information from FIG. 24, with results shown below in Table 18:

TABLE 18

| | Observed $^{29}$Si-NMR Signal Area Ratio | | | | Molecular Ratio | | |
|---|---|---|---|---|---|---|---|
| | $Q_1$ | $Q_2$ | $Q_3$ | $Q_4$ | OH | Si | OH/Si |
| CE4 | 0 | 2 | 16 | 82 | 20 | 100 | 0.20 |
| Example 1 | 0 | 5 | 17 | 78 | 27 | 100 | 0.27 |
| Number of OH Bonding | 3 | 2 | 1 | 0 | | | |

In the results shown above, the OH/Si ratio of the separator of Example 1 is 35% higher than the OH/Si ratio for the separator of Comparative Example 4, meaning that the additional hydroxyl and/or silanol groups present for the silica for the inventive separator may contribute to the improved features of the inventive separator such as its desirable pore structure and/or morphology and its low ER.

In accordance with at least selected embodiments, the separator may include or exhibit performance enhancing additives or coatings, increased porosity, increased void volume, amorphous silica, higher oil absorption silica, fillers or silica with increased friability, increased ionic diffusion, higher silanol group silica, silica with an OH to Si ratio of 21:100 to 35:100, reduced electrical resistance, a shish-kebab structure or morphology, a polyolefin microporous membrane containing particle-like filler in an amount of 40% or more by weight of the membrane and ultrahigh molecular weight polyethylene having shish-kebab formations with extended chain crystal (shish formation) and folded chain crystal (kebab formation) and the average repetition periodicity of the kebab formation from 1 nm to 150 nm, decreased sheet thickness, decreased tortuosity, and/or the like, or any combination thereof. Such inventive separators may be especially well suited for enhanced flooded batteries (EFB) built for higher performance and reliability than conventional flooded batteries, that support at least certain start-stop functionality, with enhanced starting power, that meet the ever-increasing electrical demands of many vehicles, that provide a longer lifespan of recovering from deep discharges, that power electrical loads during engine-off periods and that support a high number of starts per trip, with superior cycling capability, charge acceptance and/or the ability to operate at a low state of charge and/or a partial state of charge, with tight packed components, with battery vibration resistance, with reliable starting performance, excellent cycling ability, improved cycling of batteries operating in a low state and/or partial state of charge, and/or longer life than traditional lead-acid batteries, and/or the like.

In accordance with at least selected embodiments, aspects or objects, there is or are provided:

A separator for a lead acid battery comprising a polyolefin microporous membrane, wherein
 the polyolefin microporous membrane comprises:
 polyethylene, preferably, ultrahigh molecular weight polyethylene, a particle-like filler, and a processing plasticizer; wherein
 the particle-like filler is present in an amount of 40% or more by weight;
 the polyethylene comprises polymer in a shish-kebab formation comprising a plurality of extended chain crystals (the shish formations) and a plurality of folded chain crystals (the kebab formations) and wherein the average repetition or periodicity of the kebab formations is from 1 nm to 150 nm, preferably less than 120 nm.

The above separator for a lead acid battery, wherein
 the average repetition or periodicity of the kebab formations is defined by: taking an image of the surface of the polyolefin microporous membrane with a SEM, indicating at least three rectangular regions where the shish-kebab formation is continuously extended in the length of at least 0.5 μm or longer in the same SEM image, and specifying the repetition or periodicity by Fourier Transform of contrast profile projected in the vertical direction to the length direction of the each indicated rectangular region to calculate the average of the repetition periods.

The above separator for a lead acid battery, wherein
 the filler is selected from the group consisting of silica, precipitated silica, fumed silica, and precipitated amorphous silica; and wherein
 the molecular ratio of OH to Si groups within said filler, measured by $^{29}$Si-NMR, is within a range of from 21:100 to 35:100, preferably 27:100 or more.

The above separator for a lead acid battery, wherein
 the processing plasticizer is selected from the group consisting of: processing oil, paraffin-based oil, and mineral oil.

The above separator, wherein
 silica is present at the kebab formations of polymer.

A novel or improved enhanced flooded battery separator comprising at least one microporous thermoplastic sheet having at least one of an electrical resistance less than 200 mΩ·cm², said separator enhancing battery life, reducing internal resistance, increasing cold cranking amps, and/or improving uniformity in at least enhanced flooded batteries; has performance enhancing additives or coatings, improved fillers, decreased tortuosity, increased wettability, reduced final oil content, reduced thickness, decreased electrical resistance, and/or increased porosity and/or void volume.

The above separator, wherein the microporous thermoplastic sheet is characterized by at least one of the following:
 a) an average pore size of no greater than 1 μm;
 b) an electrical resistance less than 75 mΩ·cm², or less than 70 mΩ·cm², or less than 65 mΩ·cm², or less than 60 mΩ·cm², or less than 55 mΩ·cm², or less than 50 mΩ·cm², or less than 45 mΩ·cm², or less than 40 mΩ·cm², or less than 35 mΩ·cm², or even less;

c) an electrical resistance more than 20% less than an electrical resistance of a known separator for a flooded lead acid battery;
d) a porosity greater than 50%;
e) a final oil content of between about 10-20% by weight, in some embodiments, about 14-20% by weight; and
f) ribbing, serrated ribbing, embossed ribbing, and/or negative cross ribs.

The above separator, further comprising a filler having high structural morphology.

The above separator, wherein the filler is characterized by at least one of the following:
a) an average particle size of 5 μm or less;
b) a surface area of at least 100 m²/g; and
c) an oil absorption rate of at least 150 ml/100 mg.

The above separator, wherein the filler and thermoplastic polymer are present in a weight ratio of from 1.5:1 to 6:1.

The above separator, wherein the filler comprises a precipitated silica.

The above separator, wherein
the particle-like filler is friable to such a degree that after 30 seconds of ultrasonication, the median silica particle size is approximately 5.2 μm or less.

The above separator, wherein
the particle-like filler is friable to such a degree that after 60 seconds of ultrasonication, the median silica particle size is approximately 0.5 μm or less.

The above separator, comprising:
a mean pore size of at least approximately 120 nm.

The above separator, comprising:
a diffusion coefficient of at least approximately $1.6 \cdot 10^{-10}$ at $-5°$ C., and
an electrical resistance of approximately 40 mΩ·cm2 or lower.

The above separator, comprising:
a diffusion coefficient of at least approximately $8.8 \cdot 10^{-10}$ at $30°$ C., and
an electrical resistance of approximately 40 mΩ·cm2 or lower.

A separator for a lead acid battery comprising:
a polyolefin microporous membrane, wherein the polyolefin microporous membrane comprises polyethylene, a particle-like filler, and a processing plasticizer; wherein
the particle-like filler is friable to such a degree that after 30 seconds of ultrasonication, the median silica particle size is approximately 5.2 μm or less.

A separator for a lead acid battery comprising:
a polyolefin microporous membrane, wherein the polyolefin microporous membrane comprises polyethylene, a particle-like filler, and a processing plasticizer; wherein
the particle-like filler is friable to such a degree that after 60 seconds of ultrasonication, the median silica particle size is approximately 0.5 μm or less.

A separator for a lead acid battery comprising:
a polyolefin microporous membrane, wherein the polyolefin microporous membrane comprises polyethylene, a particle-like filler, and a processing plasticizer; wherein
the particle-like filler is friable to such a degree that after 60 seconds of ultrasonication, the median silica particle size is approximately 0.5 μm or less.

A separator for a lead acid battery comprising:
a polyolefin microporous membrane, wherein the polyolefin microporous membrane comprises polyethylene, a particle-like filler, and a processing plasticizer;
a diffusion coefficient of at least approximately $1.6 \cdot 10^{-10}$ at $-5°$ C., and
an electrical resistance of approximately 40 mΩ·cm² or lower.

A separator for a lead acid battery comprising:
a polyolefin microporous membrane, wherein the polyolefin microporous membrane comprises polyethylene, a particle-like filler, and a processing plasticizer;
a diffusion coefficient of at least approximately $8.8 \cdot 10^{-10}$ at $30°$ C., and
an electrical resistance of approximately 40 mΩ·cm² or lower.

A separator for a lead acid battery comprising:
a polyolefin microporous membrane, wherein the polyolefin microporous membrane comprises polyethylene, a particle-like filler, and a processing plasticizer;
a diffusion coefficient of at least approximately $1.6 \cdot 10^{-10}$ at $-5°$ C., and
the particle-like filler is friable to such a degree that after 30 seconds of ultrasonication, the median silica particle size is approximately 5 μm or less.

A separator for a lead acid battery comprising:
a polyolefin microporous membrane, wherein the polyolefin microporous membrane comprises polyethylene, a particle-like filler, and a processing plasticizer;
a diffusion coefficient of at least approximately $8.8 \cdot 10^{-10}$ at $30°$ C., and
the particle-like filler is friable to such a degree that after 60 seconds of ultrasonication, the median silica particle size is approximately 0.5 μm or less.

A separator for a lead acid battery comprising:
a polyolefin microporous membrane, wherein the polyolefin microporous membrane comprises polyethylene, a particle-like filler, and a processing plasticizer;
a diffusion coefficient of at least approximately $1.6 \cdot 10^{-10}$ at $-5°$ C., and
a mean pore size of at least approximately 120 nm.

A separator for a lead acid battery comprising:
a polyolefin microporous membrane, wherein the polyolefin microporous membrane comprises polyethylene, a particle-like filler, and a processing plasticizer;
a diffusion coefficient of at least approximately $8.8 \cdot 10^{-10}$ at $30°$ C., and
a mean pore size of at least approximately 120 nm.

The above separator, wherein the separator comprises one or more of a surfactant, coating, wetting agent, colorant, antistatic additive, antioxidant, agent for reducing oxidation, and combinations thereof.

The above battery separator, wherein the separator comprises at least one surfactant, wherein such surfactant is a non-ionic surfactant, an anionic surfactant, or a combination thereof.

A method of reducing internal resistance in a lead acid battery, preferably an enhanced flooded battery, comprising providing the above separator.

A novel or improved lead acid battery, preferably an enhanced flooded battery, comprising the above separator.

A novel or improved vehicle comprising the above battery or enhanced flooded battery.

An improved separator as shown and described herein, for a flooded lead acid battery, preferably, an enhanced flooded lead acid battery, the separator exhibiting lower electrical resistance (ER) in the battery, compared with a known separator for flooded lead acid batteries, the separator having a shish-kebab structure, as defined herein, and the separator exhibiting at least one of the following in the flooded lead acid battery, preferably enhanced flooded lead acid battery: lowered acid stratification in the battery, compared with the known separator; lowered voltage drop in the battery, compared with the known separator; increased cold cranking amps (CCA) in the battery, compared with the known separator; lowered water loss in the battery, compared with the known separator; increased charge acceptance in the battery, compared with the known separator; and/or overall improved battery performance, battery life, and/or battery cycling compared with a battery employing the known separator.

An improved battery separator for a flooded lead acid battery, or an improved flooded lead acid battery, or an improved vehicle comprising an improved flooded lead acid battery, wherein said battery separator or battery or vehicle approximates, meets, or exceeds the performance of an AGM battery separator and/or an AGM battery and/or a vehicle comprising an AGM battery and AGM battery separator.

Novel or improved separators, battery separators, enhanced flooded battery separators, batteries, cells, and/or methods of manufacture and/or use of such separators, battery separators, flow redox separators, cells, and/or batteries, novel or improved enhanced flooded battery separators for enhanced flooded batteries, an improved separator for enhanced flooded batteries and/or improved methods of using such batteries having such improved separators, methods, systems and battery separators for reducing internal resistance, enhancing battery life, reducing water loss, reducing internal resistance, increasing wettability, reducing acid stratification, improving acid diffusion, improving cold cranking amps and/or improving uniformity, separators that include or exhibit performance enhancing additives or coatings, increased porosity, increased void volume, amorphous silica, higher oil absorption silica, higher silanol group silica, silica with an OH to Si ratio of 21:100 to 35:100, reduced electrical resistance, a shish-kebab structure or morphology, a polyolefin microporous membrane containing particle-like filler in an amount of 40% or more by weight of the membrane and ultrahigh molecular weight polyethylene having shish-kebab formations with extended chain crystal (shish formation) and folded chain crystal (kebab formation) and the average repetition periodicity of the kebab formation from 1 nm to 150 nm, decreased sheet thickness, decreased tortuosity, and/or the like, separators especially well-suited for enhanced flooded batteries, and/or the like as shown or described herein.

In accordance with at least selected embodiments, aspects or objects, disclosed herein or provided are novel or improved separators, battery separators, enhanced flooded battery separators, batteries, cells, and/or methods of manufacture and/or use of such separators, battery separators, enhanced flooded battery separators, cells, and/or batteries. In accordance with at least certain embodiments, the present disclosure or invention is directed to novel or improved battery separators for enhanced flooded batteries. In addition, disclosed herein are methods, systems and battery separators for enhancing battery life, reducing internal electrical resistance, increasing cold cranking amps, and/or improving uniformity in at least enhanced flooded batteries. In accordance with at least particular embodiments, the present disclosure or invention is directed to an improved separator for enhanced flooded batteries wherein the separator has performance enhancing additives or coatings, improved fillers, decreased tortuosity, increased wettability, reduced oil content, reduced thickness, decreased electrical resistance, and/or increased porosity, and where the use of such a separator in a battery reduces the water loss of the battery, lowers acid stratification of the battery, lowers the voltage drop of the battery, and/or increases the CCA of the battery. In accordance with at least certain embodiments, separators are provided that include or exhibit performance enhancing additives or coatings, increased porosity, increased void volume, amorphous silica, higher oil absorption silica, fillers or silica with increased friability, increased ionic diffusion, higher silanol group silica, silica with an OH to Si ratio of 21:100 to 35:100, silica with an OH to Si ratio of at least 27:100, reduced electrical resistance, a shish-kebab structure or morphology, a polyolefin microporous membrane containing particle-like filler in an amount of 40% or more by weight of the membrane and ultrahigh molecular weight polyethylene having shish-kebab formations with extended chain crystal (shish formation) and folded chain crystal (kebab formation) and the average repetition periodicity of the kebab formation from 1 nm to 150 nm, an average repetition periodicity of the kebab formation of 150 nm or less, an average repetition periodicity of the kebab formation of 120 nm or less, an average repetition periodicity of the kebab formation of 100 nm or less, having shish-kebab formations with extended chain crystal (shish formation) and folded chain crystal (kebab formation) on at least the ribbed side and an average repetition periodicity of the kebab formation from 1 nm to 150 nm, decreased sheet thickness, decreased tortuosity, and/or the like, separators especially well-suited for enhanced flooded batteries, and/or the like.

The present invention may be embodied in other forms without departing from the spirit and the essential attributes thereof, and, accordingly, reference should be made to the appended claims, rather than to the foregoing specification, as indicating the scope of the invention.

The foregoing written description of structures and methods has been presented for purposes of illustration only. Examples are used to disclose exemplary embodiments, including the best mode, and also to enable any person skilled in the art to practice the invention, including making and using any devices or systems and performing any incorporated methods. These examples are not intended to be exhaustive or to limit the invention to the precise steps and/or forms disclosed, and many modifications and variations are possible in light of the above teaching. Features described herein may be combined in any combination. Steps of a method described herein may be performed in any sequence that is physically possible. The patentable scope of the invention is defined by the appended claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

As used in the specification and the appended claims, the singular forms "a," "an," and "the" include plural referents unless the context clearly dictates otherwise. Ranges may be expressed herein as from "about" or "approximately" one particular value, and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. "Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers, or steps. The terms "consisting essentially of" and "consisting of" can be used in place of "comprising" and "including" to provide for more specific embodiments of the invention and are also disclosed. "Exemplary" means "an example of" and is not intended to convey an indication of a preferred or ideal embodiment. Similarly, "such as" is not used in a restrictive sense, but for explanatory or exemplary purposes.

Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

Additionally, the invention illustratively disclosed herein suitably may be practiced in the absence of any element which is not specifically disclosed herein.

What is claimed is:

1. A lead acid battery separator for enhanced flooded batteries comprising 40% or more silica having an oil absorption from 250 ml/100 g to 350 ml/100 g and polypropylene and wherein the silica has a molecular ratio of OH to Si groups within a range of 21:100 to 35:100 and a bubble flow rate of from 0.015 to 0.02 l/min; and wherein the polypropylene comprises polymer in a shish-kebab formation comprising a plurality of extended chain crystals (shish formations) and a plurality of folded chain crystals (the kebab formations) and wherein an average repetition or periodicity of the kebab formations is from 20 nm to 100 nm.

2. The lead acid battery separator of claim 1, wherein the battery separator has an electrical resistance (ER) of 75 mΩ·cm$^2$ or less.

3. The lead acid battery separator of claim 1, wherein the battery separator further comprises polyethylene.

4. The lead acid battery separator of claim 1, wherein the battery separator further comprises ultra-high molecular weight (UHMW) polyethylene.

5. The lead acid battery separator of claim 1, wherein the average particle size of the silica is no greater than 25 microns.

6. The lead acid battery separator of claim 5, the silica having an average particle size from 15 to 25 microns.

7. The lead acid battery separator of claim 1, the silica having a surface area in the range of 100 m$^2$/g to 300 m$^2$/g.

8. The lead acid battery separator of claim 1, wherein the silica is a precipitated silica, a fumed silica, or a precipitated amorphous silica.

* * * * *